US012691796B2

(12) United States Patent
Mochizuki et al.

(10) Patent No.: US 12,691,796 B2
(45) Date of Patent: Jul. 28, 2026

(54) VEHICLE SEAT DEVICE

(71) Applicant: TS TECH CO., LTD., Asaka (JP)

(72) Inventors: Haruki Mochizuki, Tochigi (JP);
Satoshi Suzuki, Tochigi (JP);
Takayoshi Katori, Tochigi (JP);
Masato Watanabe, Tochigi (JP);
Tsukasa Meguro, Tochigi (JP); **Yoichi
Tachikawa**, Tochigi (JP)

(73) Assignee: TS TECH CO., LTD., Asaka (JP)

( * ) Notice: Subject to any disclaimer, the term of this
patent is extended or adjusted under 35
U.S.C. 154(b) by 163 days.

(21) Appl. No.: 18/695,604

(22) PCT Filed: Sep. 26, 2022

(86) PCT No.: PCT/JP2022/035662
§ 371 (c)(1),
(2) Date: Mar. 26, 2024

(87) PCT Pub. No.: WO2023/048279
PCT Pub. Date: Mar. 30, 2023

(65) Prior Publication Data

US 2024/0391364 A1 Nov. 28, 2024

Related U.S. Application Data

(60) Provisional application No. 63/313,434, filed on Feb.
24, 2022, provisional application No. 63/293,889,
(Continued)

(30) Foreign Application Priority Data

Mar. 25, 2022 (JP) ................................. 2022-050928
Mar. 25, 2022 (JP) ................................. 2022-050929

(51) Int. Cl.
*B60N 2/14* (2006.01)
*B60N 2/02* (2006.01)

(52) U.S. Cl.
CPC ......... *B60N 2/146* (2013.01); *B60N 2/02246*
(2023.08)

(58) Field of Classification Search
CPC ................................. B60N 2/14; B60N 2/146
See application file for complete search history.

(56) References Cited

U.S. PATENT DOCUMENTS 12,024,070 B2 7/2024 Nakane et al.

FOREIGN PATENT DOCUMENTS

EP 0830971 A2 3/1998
JP H08132936 5/1996
(Continued)

OTHER PUBLICATIONS

PCT International Search Report (with English translation) for
corresponding PCT Application No. PCT/JP2022/035662, mailed
Nov. 29, 2022, 7 pages.
(Continued)

*Primary Examiner* — Timothy D Collins
*Assistant Examiner* — Terri L Filosi
(74) *Attorney, Agent, or Firm* — Dority and Manning,
P.A.

(57) ABSTRACT

The vehicle seat device has a rotation device provided
between a floor and a seat cushion to rotatably support the
seat cushion relative to the floor. The rotation device com-
prises a base portion provided on the floor; a rotatable
portion provided on the seat cushion and rotatably supported
by the base portion; an electric actuator for rotating the
rotatable portion with respect to the base portion; and a
rotation lock device for selectively prohibiting rotation of
the rotatable portion with respect to the base portion. The
rotation lock device is configured to be manually switched
between a locked state and a released state. The electric
actuator is configured to allow rotation of the rotatable
(Continued)

portion with respect to the base portion when the rotation lock device is released and electric power is not supplied to the electric actuator.

10 Claims, 28 Drawing Sheets

Related U.S. Application Data filed on Dec. 27, 2021, provisional application No. 63/261,678, filed on Sep. 27, 2021.

(56) References Cited

FOREIGN PATENT DOCUMENTS

| | | |
|---|---|---|
| JP | H08216749 | 8/1996 |
| JP | H1076873 | 3/1998 |

| | | | | | |
|---|---|---|---|---|---|
| JP | H1076873 | A | * | 3/1998 | ............... B60N 2/14 |
| JP | 2003040000 | | | 2/2003 | |
| JP | 2013001347 | | | 1/2013 | |
| JP | 2013001347 | A | * | 1/2013 | ............... B60N 2/06 |
| JP | 2018187971 | | | 11/2018 | |
| JP | 2018187971 | A | * | 11/2018 | ............. B60N 2/005 |
| JP | 2020132093 | | | 8/2020 | |
| KR | 101826513 | B1 | | 2/2018 | |
| WO | WO 2021171667 | A1 | | 9/2021 | |

OTHER PUBLICATIONS

Written Opinion of the International Searching Authority for corresponding PCT Application No. PCT/JP2022/035662, dated Nov. 29, 2022, 4 pages.
Extended European Search Report received in corresponding Application No. EP 22873030.5, dated Sep. 26, 2025, 8 pages.

* cited by examiner front right — left rear

*Fig.14*

*Fig.16* rear right ← → left front

VEHICLE SEAT DEVICE

CROSS-REFERENCE TO RELATED APPLICATIONS

This application is the U.S. National Stage entry of International Application No. PCT/JP2022/035662, filed on Sep. 26, 2022, which, in turn, claims priority to U.S. Provisional Patent Application No. 63/261,678, filed on Sep. 27, 2021; U.S. Provisional Patent Application No. 63/293,889, filed on Dec. 27, 2021; U.S. Provisional Patent Application No. 63/313,434, filed on Feb. 24, 2022; Japanese Patent Application No. 2022-050929, filed on Mar. 25, 2022; and Japanese Patent Application No. 2022-050928, filed on Mar. 25, 2022, all of which are hereby incorporated herein by reference in their entireties for all purposes.

TECHNICAL FIELD

The present invention relates to a vehicle seat device.

BACKGROUND ART

Patent Document 1 discloses a vehicle seat device that is rotatable about a vertical axis with respect to the floor. The vehicle seat device includes a base portion provided on a floor via a slide device, a rotatable portion rotatably supported by the base portion and provided with a seat cushion, and an electric actuator for rotating the rotatable portion with respect to the base portion.

PRIOR ART DOCUMENT(S)

Patent Document(s)

Patent Document 1: JP2020-132093A

The power source may fail to supply electric power to the electric actuator, or the electric actuator may malfunction. In such a case, it is desirable for the occupant to be able to manually adjust the rotational position of the seat cushion.

In view of the background described above, an object of the present invention is to provide a vehicle seat that allows the rotational position of the seat cushion thereof to be manually adjusted by the occupant of the seat device.

To accomplish such an object, one aspect of the present invention provides a vehicle seat device (1) having a rotation device (2) provided between a floor (5) and a seat cushion (11) to rotatably support the seat cushion relative to the floor, the rotation device comprising, a base portion (51) provided on the floor; a rotatable portion (52) provided on the seat cushion and rotatably supported by the base portion; an electric actuator (53) for rotating the rotatable portion with respect to the base portion; and a rotation lock device (54) for selectively prohibiting rotation of the rotatable portion with respect to the base portion, wherein the rotation lock device is configured to be manually switched between a locked state and a released state, and the electric actuator is configured to allow rotation of the rotatable portion with respect to the base portion when the rotation lock device is released and electric power is not supplied to the electric actuator.

According to this aspect, when the lock device is released and power is not supplied to the electric actuator, the occupant can manually rotate the rotatable portion with respect to the base portion. As a result, it becomes possible for the occupant to adjust the rotational position of the seat cushion by manual operation.

In this aspect of the present invention, preferably, the electric actuator does not include a worm reduction gear.

According to this aspect, when a load is applied to the rotatable portion, the electric actuator can allow the rotatable portion to rotate with respect to the base portion.

In this aspect of the present invention, preferably, the rotation lock device is movably supported by one of the base portion and the rotatable portion, and is provided with a lock claw (121) that is movable between a lock position for engaging another of the base portion and the rotatable portion and a release position for disengaging from the other of the base portion and the rotatable portion, and one of the base portion and the rotatable portion is provided with a lock claw sensor (156) that detects a position of the lock claw, the electric actuator being configured to be driven when the lock claw is at the release position.

According to this aspect, the electric actuator is prevented from being overloaded.

In this aspect of the present invention, preferably, the lock claw sensor is provided with a lever (157) configured to be displaced by being pushed by the lock claw, and detect a position of the lock claw based on a position of the lever.

According to this aspect, the configuration of the lock claw sensor can be simplified.

In this aspect of the present invention, preferably, the base portion is provided with a base plate (56) having a vertically facing major plane, and a fixing member (66) having a ring-shape and extending upward from the base plate, and the rotatable portion is provided with a rotatable plate (71) rotatably supported on an upper surface of the base plate, the fixing member extending above an outer peripheral part of the rotatable plate, a slidable member (85) being positioned between an upper surface of the rotatable plate and the fixing member.

According to this aspect, since the outer peripheral part of the rotatable plate contacts the fixing member via the slidable member, tilting and rattling of the rotatable plate can be minimized.

In this aspect of the present invention, preferably, the fixing member presses the rotatable plate toward the base plate via the slidable member.

According to this aspect, tilting and rattling of the rotatable plate can be further minimized.

In this aspect of the present invention, preferably, a first bearing hole (62) is formed in a central part of the base plate, a second bearing hole (75) is formed in a central part of the rotatable plate, a vertically extending support tube (87) is passed through the first bearing hole and the second bearing hole, and an outer circumference of the support tube is provided with a radially outwardly bulging annular ribs (88, 89) that prevent a vertical movement of the rotatable plate.

According to this aspect, the support tube maintains the base portion and the rotatable plate in a coaxial relationship. In addition, the support tube prevents a relative vertical movement between the base portion and the rotatable plate.

In this aspect of the present invention, preferably, an enlarged diameter portion (93) is provided in a lower end of the support tube, and the base plate is restricted from vertical movement by one of the annular ribs and the enlarged diameter portion.

According to this aspect, the position of the base plate relative to the support tube can be stabilized.

In this aspect of the present invention, preferably, one of the rotatable portion and the base portion is provided with a detecting piece (173) made of a magnetic material, and another of the rotatable portion and the base portion is provided with a magnetic proximity sensor (174) that outputs a signal corresponding to a distance from the detecting piece.

According to this aspect, the magnetic proximity sensor can be used to detect the rotational position of the rotatable portion with respect to the base portion.

In this aspect of the present invention, preferably, a stopper (176, 177, 178) is provided between the base portion and the rotatable portion for limiting a rotational range of the rotatable portion with respect to the base portion so that the rotatable portion is rotatable relative to the base portion between an inner rotational limit which is displaced by 180 degrees or less in an inboard direction from a reference rotational position defined as a position of the seat cushion facing forward and an outer rotational limit which is displaced by 90 degrees or less in an outboard direction from the reference rotational position.

According to this aspect, the seat cushion is prevented from facing in an unnecessary direction.

In the conventional vehicle seat device, the pressure receiving member and the actuator are positioned relatively close to each other one on top of the other. Therefore, when the pressure receiving member receives a large downward load from the occupant via the seat cushion pad and undergoes a large bending deformation, the pressure receiving member may interfere with the actuator. Another aspect of the present invention provides a vehicle seat device that can solve the above problem of the conventional device with a simple structure.

This aspect of the present invention provides a vehicle seat device, comprising: a base (330) configured to be secured to a floor portion (312) of a vehicle body, a rotatable disk connected to a seat main body(S) to support the seat main body in an integrally rotatable manner and positioned on the base (330); a bearing (B1, B2) supporting the rotatable disk (320) on the base (330) so as to be rotatable around a vertical axis; a drive device (D) configured to rotationally drive the rotatable disk (320) with respect to the base (330), the drive device (D) including an actuator (340) fixedly secured on the rotatable disk (320) and having an output shaft (343) extending downward beyond the rotatable disk (320), and a gear transmission mechanism (GT) that converts a rotational movement of the output shaft (343) into a rotational movement of the rotatable disk (320) with respect to the base (330), the seat main body(S) including a seat cushion (Sc) for supporting buttocks of an occupant which includes a seat cushion frame (SFc) providing a skeletal frame structure thereof and a seat cushion pad (Pc) supported by the seat cushion frame (SFc) via an elastically deformable pressure receiving member (318), wherein the actuator (340) is positioned so as to at least partly overlap with the pressure receiving member (318) in top view and not to interfere with the pressure receiving member (318) when the pressure receiving member (318) is deflected downward under a load applied by an occupant via the seat cushion pad (Pc).

According to this aspect, since the actuator that drives the rotatable disk to rotate is positioned so that at least a part thereof overlaps with the pressure receiving member of the seat main body in top view, radial protrusion of the actuator can be minimized so that the size of the seat device in the radial direction can be minimized. Further, since the actuator is positioned so as not to interfere with the pressure receiving member even when the pressure receiving member deflects under the downward load received from the occupant, although the pressure receiving member and the actuator overlap each other in top view, the pressure receiving member is prevented from interfering with the actuator.

In this aspect of the present invention, preferably, the front end of the pressure receiving member (318) is engaged and supported by a front cross member (311f) of the seat frame (SFc), and at least a part of the actuator (340) overlaps with the front cross member (311f) in top view.

According to this aspect, since the front end of the pressure receiving member is engaged and supported by the front cross member of the seat frame, and at least a part of the actuator is positioned so as to overlap with the front cross member in top view, the actuator can be positioned directly under a part of the pressure receiving member near the front cross member (i.e., a part where the amount of bending deformation is comparatively small when the pressure receiving member receives a downward load from an occupant), the height of the pressure receiving member (hence, the height of the seat main body) is not required to be made particularly high.

In this aspect of the present invention, preferably, the actuator (340) is positioned on the rotatable disk (320) such that a longitudinal direction thereof is substantially aligned with the front cross member (311f).

According to this aspect, since the actuator is positioned on the rotatable disk so that the longitudinal direction of the actuator substantially extends along the front cross member, even when the actuator is long, a most part of the actuator can be positioned directly under the part of the pressure receiving member near the front cross member (or where the bending deformation is comparatively small when the pressure receiving member is subjected to a downward load from the occupant), and the effect of the above mentioned configuration can be adequately achieved.

In this aspect of the present invention, preferably, the gear transmission mechanism (GT) is provided with a fixed gear (336) having teeth (336g) projecting radially outward on an outer periphery thereof and is fixed to the base (330) concentrically with the rotatable disk (320), and a drive gear (346) that meshes with the fixed gear (336) and is concentrically fixed to the output shaft (343).

According to this aspect, since the gear transmission mechanism includes a fixed gear having teeth projecting radially outward on the outer periphery thereof and fixed to the base concentrically with the rotatable disk, and the drive gear meshing with the fixed gear and fixed to the output shaft, the fixed gear consisting of an external tooth gear meshes with the drive gear at a radially outer position. Therefore, the actuator can be positioned directly under a part of the pressure receiving member which undergoes a comparatively small deformation when the pressure receiving member receives a downward load from the occupant, and the height of the pressure receiving member (hence, the height of the seat main body) is not required to be particularly great in order for the actuator to avoid interference from the pressure receiving member which undergoes a bending deformation under the load of the occupant.

In this aspect of the present invention, preferably, the rotatable disk (320) is formed with a first annular recess (320a) concentric therewith and recessed downward, the base (330) is formed with a second annular recess (330a) recessed downward so as to correspond to the first annular recess (320a), the actuator (340) is fixed on the bottom surface of the first annular recess (320a), and the gear transmission mechanism (GT) is positioned between the rotatable disk (320) and the second annular recess (330a).

According to this aspect, since the rotatable disk is formed with the first annular recess concentric therewith and recessed downward, the base is provided with a second annular recess that is recessed downward so as to correspond to the first annular recess, an actuator is fixed on the bottom surface of the first annular recess, and a gear transmission mechanism is positioned between the rotatable disk and the second annular recess, the heights of the actuator and the gear transmission mechanism which are positioned above and below the rotatable disk, respectively, can be minimized without causing any part of the gear transmission mechanism to project below the base. As a result, mutual interference between the actuator and the pressure receiving member which deforms under the downward load from the occupant can be easily avoided, and the gear transmission mechanism can be accommodated between the rotatable disk and the base (particularly, the second annular recess) so that the gear meshing noise is made less likely to reach the ears of the occupant.

In this aspect of the present invention, preferably, a left and right fore and aft slide mechanism (SL) is interposed between the floor portion (312) and the base (330) to support the base (330) on the floor portion so that the base may be adjusted in position in a fore and aft direction, and the second annular recess (330a) is located between the left and right fore and aft slide mechanisms (SL) so as to partly overlap with the fore and aft slide mechanisms (SL) in side view.

According to this aspect, since the left and right fore and aft slide mechanisms (SL) are interposed between the floor portion (312) and the base (330) to support the base (330) on the floor portion so that the base may be adjusted in position in the fore and aft direction, and the second annular recess (330a) is located between the left and right fore and aft slide mechanisms (SL) so as to partly overlap with the fore and aft slide mechanisms (SL) in side view, an adequate depth can be given to the second annular recess by making use of the dead space created between the left and right fore and aft slide mechanisms. As this allows the gear transmission mechanism to be placed at a lower position between the rotatable disk and the second annular recess without difficulty, the gear meshing noise is made less likely to reach the ears of the occupant.

In this aspect of the present invention, preferably, the actuator (340) is fixed to the bottom surface of the first annular recess (320a) so that a longitudinal direction thereof is substantially aligned with a tangential direction of the first annular recess (320a).

According to this aspect, the actuator is fixed on the bottom surface of the second annular recess so that the longitudinal direction of the actuator substantially extends along the tangential direction of the first annular recess. As a result, even if the actuator is long, by orienting the longitudinal direction of the actuator substantially along the tangential direction of the first annular recess, the actuator can be placed compactly on the bottom surface of the first annular recess without causing any excessive upward protrusion so that mutual interference between the actuator and the pressure receiving member can be easily avoided.

In this aspect of the present invention, preferably, a bearing tubular portion (331) formed concentrically with the rotatable disk (320) and open at both upper and lower ends thereof is fixed to a central part of the base (330), and the bearing includes a first bearing (B1) that rotatably supports an outer peripheral edge part of the rotatable disk (320) on an outer peripheral edge part of the base (330) and a second bearing (B2) that is retained by the bearing tubular portion (331) and rotatably supports an inner peripheral part of the rotatable disk (320).

According to this aspect, since the bearing tubular portion formed concentrically with the rotatable disk and open at both upper and lower ends thereof is fixed to a central part of the base, and the bearing includes a first bearing that rotatably supports an outer peripheral edge part of the rotatable disk on an outer peripheral edge part of the base and a second bearing that is retained by the bearing tubular portion and rotatably supports an inner peripheral part of the rotatable disk, not only the outer peripheral edge part of the rotatably disk can be supported on the base via the first bearing, but also the rotatable disk can be supported on the base in a more stable manner owing to the simple structure using the bearing tubular portion for supporting the inner peripheral part of the rotatable disk. As a result, the rotatable disk can be smoothly supported on the base in a stable and smooth manner so that the durability of the gear transmission mechanism can be improved, and the meshing noise can be reduced.

In this aspect of the present invention, preferably, the bearing tubular portion (331) is formed in a hollow tubular shape with open upper and lower ends, and electric wire (333) for energizing electrical components in the seat main body(S) including the actuator (340) is passed through a hollow interior thereof.

According to this aspect, since the bearing tubular portion is formed in a hollow tubular shape with open upper and lower ends, and an electric wire (333) for energizing electrical components in the seat main body(S) including the actuator (340) is passed through the hollow interior thereof, even if the seat main body is rotated, the electric wire can be extended without any excessive stretching or twisting so that the durability of the electric wire can be improved.

In this aspect of the present invention, preferably, with the seat main body(S) fixed to the base (330) in a normal forward-facing position with respect to the base (30), a pair of fixing brackets (350) are fixed to upper surfaces of side parts of the rotatable disk (320), respectively, the two side parts of the rotatable disk (320) are fastened to the seat main body(S) via the respective fixing brackets (350), and the actuator (340) is positioned between the fixing brackets (350) along the circumferential direction.

According to this aspect, since with the seat main body fixed to the normal forward-facing position with respect to the base, a pair of fixing brackets are fixed to the upper surfaces of the side parts of the rotatable disk, respectively, the two side parts of the rotatable disk are fastened to the seat main body via the respective fixing brackets, and the actuator is positioned between the fixing brackets along the circumferential direction, the actuator can be positioned favorably on the rotatable disk at a very low position while avoiding the interference between the actuator and the fixing brackets fixed to the rotatable disk to secure the rotatable disk to the seat main body.

In this aspect of the present invention, preferably, an upper surface of an outer peripheral edge part of the rotatable disk (320) is retained to a lower surface of an upper fixing member (360) which extends under the fixing brackets (350) and is fixed to the outer peripheral part of the base (330) via a slider (370).

According to this aspect, since an upper surface of an outer peripheral edge part of the rotatable disk is retained to a lower surface of an upper fixing member which extends under the fixing brackets and is fixed to the outer peripheral part of the base via a slider, the rotatable disk is ensured of a smooth rotating performance, and is held against a lifting movement by being held downward by the fixed upper fixing member which is fixed to the outer peripheral part of the base.

In this aspect of the present invention, preferably, the upper fixing member (360) is composed of a plurality of individual fixing member elements (361, 362) arranged in a circumferential direction of the rotatable disk (320).

According to this aspect, since the upper fixing member is composed of a plurality of individual fixing member elements arranged in a circumferential direction of the rotatable disk, the individual fixing member elements can be made more compact and light-weight, and easier to handle as compared to the case where the upper fixing member is composed of as an integral single-piece annular member. Furthermore, when other functional components such as peeling preventing members are added to the upper fixing member, the manufacturing process is prevented from becoming unduly complex.

In this aspect of the present invention, preferably, a rotating-side peeling preventing portion (353) is fixed to the fixing bracket (350), and a fixed-side peeling preventing portion (363) is attached to the upper fixing member (360) so as to correspond to the rotating-side peeling preventing portion (353) so that the seat main body(S) is prevented from being peeled away from the base (330) owing to an engagement between the rotating-side peeling preventing portion (353) and the fixed-side peeling preventing portion (363) even when an excessive load is applied to the seat main body(S).

According to this aspect, since a rotating-side peeling preventing portion is fixed to the fixing bracket, and a fixed-side peeling preventing portion is attached to the upper fixing member so as to correspond to the rotating-side peeling preventing portion so that the seat main body is prevented from being peeled away from the base owing to an engagement between the rotating-side peeling preventing portion and the fixed-side peeling preventing portion even when an excessive load is applied to the seat main body, the fixing bracket that fastens the rotatable disk to the seat main body and the upper fixing member preventing the lifting of the rotatable disk can be additionally utilized for preventing the peeling of the seat main body so that the peeling preventing structure can be simplified, and the manufacturing cost can be reduced.

In the conventional device, since the gear transmission mechanism is exposed under the rotatable disk and the base so that the meshing noise of the gears generated when the actuator operates (that is, when the seat main body is rotated) leaks out of the seat main body, and reaches the ears of the occupant. The resulting lack of quietness of the cabin therefore creates an issue. Thus, another object of the present invention is to provide a vehicle seat device that resolves this issue of the prior art with a simple structure.

To achieve such an object, another aspect of the present invention provides a vehicle seat device, comprising: a base (330) configured to be fixed to a floor portion (312) of a vehicle body; a rotatable disk (320) supporting a seat main body(S) for integral rotation therewith and positioned on the base (330); a bearing (B1, B2) supporting the rotatable disk (320) on the base (330) so as to be rotatable around a vertical axis; a drive device (D) for rotationally drive the rotatable disk (320) with respect to the base (330), the drive device (D) including an actuator (340) fixed to the rotatable disk (320) and having an output shaft extending downward beyond the rotatable disk (320), and a gear transmission mechanism (GT) that converts a rotation of the output shaft into a rotation of the rotatable disk (320) relative to the base (330), wherein the bearing includes a first bearing (B1) that rotatably supports an outer peripheral edge part of the rotatable disk (320) on an outer peripheral edge part of the base (330), and gear transmission mechanism (GT) is received in a space (C) defined by the rotatable disk (320) from above, the base (330) from below, and the first bearing (B1) from a radially outer side.

According to this aspect, in this vehicle seat device, the drive device includes an actuator fixed to the rotatable disk and having an output shaft extending downward beyond the rotatable disk, and a gear transmission mechanism that converts a rotation of the output shaft into a rotation of the rotatable disk relative to the base, and the gear transmission mechanism is received in a space defined by the rotatable disk from above, the base from below, and the first bearing from a radially outer side. Therefore, the gear transmission mechanism is received in the space surrounded by the first bearing and interposed between the rotatable disk and the base so that the gear meshing noise that is created by the operation of the actuator (or during the rotation of the seat main body) is prevented from leaking to the outside so that a favorable noise control for the gear transmission mechanism can be achieved. Furthermore, since the rotatable disk, the base and the first bearing can be additionally utilized as a noise reduction means for the gear transmission mechanism, the structure of the seat device can be simplified and the manufacturing cost can be reduced.

In this aspect of the present invention, preferably, the rotatable disk (320) is formed with a first annular recess (320*a*) recessed downward concentrically with the rotatable disk (320) while the base (330) is formed with a second annular recess (330*a*) recessed downward so as to correspond to the first annular recess (320*a*), the actuator (340) is fixed on the bottom surface of the first annular recess (320*a*), and the gear transmission mechanism (GT) is positioned between the rotatable disk (320) and the second annular recess (330*a*).

According to this aspect, since the rotatable disk is formed with a first annular recess recessed downward concentrically with the rotatable disk while the base is formed with a second annular recess recessed downward so as to correspond to the first annular recess, the actuator is fixed on the bottom surface of the first annular recess, and the gear transmission mechanism is positioned between the rotatable disk and the second annular recess, the actuator and gear transmission mechanism that are positioned above and below the rotatable disk, respectively, can be reduced in height without requiring a part of the gear transmission mechanism to protrude downward beyond the base. As a result, the interference between the actuator and the bottom of the seat cushion can be easily avoided, while the gear meshing noise is prevented from reaching the ears of the occupant owing to the positioning of the gear transmission mechanism in the space.

In this aspect of the present invention, preferably, a left and a right fore and aft slide mechanism (SL) is interposed between the floor portion (312) and the base (330) to support the base (330) on the floor portion so that the fore and aft position thereof can be adjusted, and the second annular recess (330*a*) is positioned between the left and right fore and aft slide mechanisms (SL) so as to partly overlap with the fore and aft slide mechanisms (SL) in side view.

According to this aspect, the left and right fore and aft slide mechanisms (SL) are interposed between the floor portion and the base to support the base on the floor portion so that the fore and aft position thereof can be adjusted, and the second annular recess is positioned between the left and right fore and aft slide mechanisms so as to partly overlap with the fore and aft slide mechanisms in side view, the second annular recess having a sufficient depth can be safely accommodated by making use of the dead space created between the left and right fore and aft slide mechanisms. As a result, the gear transmission mechanism can be placed at a lower position between the rotatable disk and the second annular recess so that the gear meshing noise can be made less likely to reach the ears of the occupant combined with the advantageous positioning of the gear transmission mechanism in the space.

In this aspect of the present invention, preferably, the gear transmission mechanism (GT) includes a fixed gear (336) having external teeth (336g) along an outer periphery thereof and fixed to the base (330) concentrically to the rotatable disk (320), and a drive gear (346) that meshes with the fixed gear (336) within the space (C) and is concentrically fixed to the output shaft (343).

According to this aspect, since the gear transmission mechanism includes a fixed gear having external teeth along an outer periphery thereof and fixed to the base concentrically to the rotatable disk, and a drive gear that meshes with the fixed gear within the space and is concentrically fixed to the output shaft, although the meshing point between the fixed gear and the drive gear is positioned in a comparatively radially outer point, the gear meshing noise can be made less likely to reach the ears of the occupant owing to the fact that the gear transmission mechanism is positioned within the space.

In this aspect of the present invention, preferably, a bearing tubular portion (331) formed concentrically with the rotatable disk (320) and extending upward is fixed to a central part of the base (330), and the bearing includes a second bearing (B2) that is retained by the bearing tubular portion (331) and rotatably supports an inner peripheral part of the rotatable disk (320), a radially inner side of the space (C) being closed by the bearing tubular portion (331).

According to this aspect, since a bearing tubular portion formed concentrically with the rotatable disk and extending upward is fixed to a central part of the base, and the bearing includes a second bearing that is retained by the bearing tubular portion and rotatably supports an inner peripheral part of the rotatable disk, a radially inner side of the space being closed by the bearing tubular portion, not only the outer peripheral edge part of the rotatably disk can be supported on the base via the first bearing, but also the rotatable disk can be supported on the base in a more stable manner owing to the simple structure using the bearing tubular portion for supporting the inner peripheral part of the rotatable disk. Furthermore, the radially inner side of the space can be closed by using a simple structure that uses the bearing tubular portion so that the meshing noise of the gear transmission mechanism can be made less likely to reach the ears of the occupant.

In this aspect of the present invention, preferably, the bearing tubular portion (331) is formed in a hollow tubular shape with open upper and lower ends, and an electric wire (333) for energizing electrical components in the seat main body(S) including the actuator (340) is passed through a hollow interior of the bearing tubular portion (331).

According to this aspect, since the bearing tubular portion is formed in a hollow tubular shape with open upper and lower ends, and an electric wire for energizing electrical components in the seat main body including the actuator is passed through a hollow interior of the bearing tubular portion, even when the seat main body is rotated, the electric wire can be extended without any excessive stretching or twisting so that the durability of the electric wire can be improved.

In this aspect of the present invention, preferably, the gear transmission mechanism (GT) includes a fixed gear (336) fixed to the base (330) concentrically with the rotatable disk (320), and a drive gear (346) concentrically fixed to the output shaft (343) and meshing with the fixed gear (336) within the space (C), and a lower end portion (343a) of the output shaft (343) extending downward beyond the drive gear (346) is rotatably supported by a bearing member (347) which is fixed to a lower surface of the rotatable disk (320) and facing the space (C).

According to this aspect, since the gear transmission mechanism includes a fixed gear fixed to the base concentrically with the rotatable disk, and a drive gear fixed concentrically to the output shaft and meshing with the fixed gear within the space, and a lower end portion of the output shaft extending downward beyond the drive gear is rotatably supported by a bearing member which is fixed to a lower surface of the rotatable disk and facing the space, the meshing reaction force that is applied to the drive gear due to the meshing with the fixed gear can be firmly supported by the bearing member during the operation of the gear transmission mechanism so that the two gears can be meshed with each other both smoothly and quietly.

In this aspect of the present invention, preferably, the base (330) is formed with a second annular recess (330a) formed concentric with the rotatable disk (320) and recessed downward, and the bearing member (347) is positioned in the second annular recess (330a) and extends in a circumferential direction of the fixed gear (336) with both circumferential ends thereof fixed to the lower surface of the rotatable disk (320).

According to this aspect, since the base is formed with a second annular recess formed concentric with the rotatable disk and recessed downward, and the bearing member is positioned in the second annular recess and extends in a circumferential direction of the fixed gear with both circumferential ends thereof fixed to the lower surface of the rotatable disk, the bearing member (and hence the output shaft of the actuator) can be stably and firmly fixed to the lower surface of the rotatable disk while ensuring a long support span for the fixed gear in the circumferential direction.

In this aspect of the present invention, preferably, a damping member (348) surrounding the output shaft (343) is interposed between the rotatable disk (320) and the fixed gear (336).

According to this aspect, since a damping member surrounding the output shaft is interposed between the rotatable disk and the fixed gear, the vibration of the actuator can be damped by the damping member so that the vibration of the actuator due to the operation of the actuator is prevented from being transmitted to the base and the rotatable disk.

In this aspect of the present invention, preferably, the base (330) comprises a plate-like base main body (330m) and a radially inner part (336i) of the fixed gear (336), connected to an inner peripheral edge part (330mi) of the base main body (330m), which is more radially inwardly located than a connecting portion (336w) between the fixed gear (336) and the base main body (330m).

According to this aspect, since the base comprises a plate-like base main body and a radially inner part of the fixed gear, connected to an inner peripheral edge part of the base main body, which is more radially inwardly located than a connecting portion between the fixed gear and the base main body, a part of the fixed gear (or, the radially inner part) is utilized as a part of the base so that the structure can be simplified.

In this aspect of the present invention, preferably, the fixed gear (336) is formed to be thicker than a plate thickness of the base main body (330*m*), and an inner peripheral edge part (336*ie*) of the fixed gear (336) is fitted on a bearing tubular portion (331) retaining a second bearing (B2) rotatably supporting an inner peripheral part of the rotatable disk (320).

According to this aspect, since the fixed gear is formed to be thicker than a plate thickness of the base main body, and an inner peripheral edge part of the fixed gear is fitted on a bearing tubular portion retaining a second bearing rotatably supporting an inner peripheral part of the rotatable disk, the inner peripheral edge part of the base is fitted on the bearing tubular portion while the relatively thick inner peripheral edge part of the fixed gear is connected to the bearing tubular portion so that a high connecting strength can be achieved.

In this disclosure, the term "outer peripheral edge part of the rotatable disk" covers a region located radially outside of a radially intermediate point of the rotatable disk and includes the outer peripheral edge as can be readily appreciated. Similarly, the term "outer peripheral edge part of the base" covers a region located radially outside of a radially intermediate point of the base and includes the outer peripheral edge as can be readily appreciated.

Effect of the Invention

Yet another aspect of the present invention provides a vehicle seat device (1) comprising a rotation device (2) provided between a floor (5) and a seat cushion (11) to rotatably support the seat cushion with respect to the floor, wherein the rotation device (2) includes a base portion (51) provided on the floor, a rotatable portion (52) provided on the seat cushion and rotatably supported by the base portion, an electric actuator (53) for rotating the rotating part with respect to the base part, and a rotation lock device (54) for selectively prohibiting rotation of the rotating part with respect to the base portion, and the rotation lock device is manually switchable between a lock state and release state, and configured to permit rotation of the rotatable portion relative to the base portion when the lock device is released and electric power is not supplied to the electric actuator.

According to this aspect, when the lock device is released and electric power is not supplied to the electric actuator, the occupant can manually rotate the rotatable portion with respect to the base portion. As a result, it becomes possible for the occupant to manually adjust the rotational position of the seat cushion.

In this aspect of the present invention, preferably, the electric actuator is not provided with a worm reduction gear.

According to this aspect, when a load is applied to the rotatable portion, the electric actuator can allow the rotatable portion to rotate with respect to the base portion.

In this aspect of the present invention, preferably, the rotation lock device is movably supported by one of the base portion and the rotatable portion, and has a lock claw (121) that is movably supported by one of the base portion and the rotatable portion so as to be movable between a lock position in which the lock claw (121) is engaged with the other of the base portion and the rotatable portion and a release position in which the lock claw (121) is disengaged from the other of the base portion and the rotatable portion, and a lock claw sensor (156) that detects a position of the lock claw is provided on one of the base part and the rotating part, the electric actuator being permitted to be driven when the lock claw is at the release position.

According to this aspect, an overload is prevented from being applied to the electric actuator.

In this aspect of the present invention, preferably, the lock claw sensor is provided with a lever (157) configured to be displaced by being pushed by the lock claw and is configured to detect the position of the lock claw based on a position of the lever.

According to this aspect, the configuration of the lock claw sensor can be simplified.

In this aspect of the present invention, preferably, the base portion is provided with a base plate (56) having a vertically facing major plane and a ring-shaped fixing member (66) extending upward from the base plate, the rotatable portion is provided with a rotatable plate (71) rotatably supported on an upper surface of the base plate, the fixing member extends above the outer peripheral portion of the rotatable plate, and a slidable member (85) is interposed between an upper surface of the outer peripheral portion of the rotatable plate and the fixing member.

According to this aspect, since the outer peripheral portion of the rotatable plate comes into contact with the fixing member via the slidable member, tilting and rattling of the rotatable plate are suppressed.

In this aspect of the present invention, preferably, the fixing member presses the rotatable plate toward the base plate via the slidable member.

According to this aspect, tilting and rattling of the rotatable plate are further suppressed.

In this aspect of the present invention, preferably, a first bearing hole (62) is formed centrally in the base plate, a second bearing hole (75) is formed centrally in the rotatable plate, a vertically extending support tube (87) is inserted into the holes of the first bearing hole and the second bearing hole, and a plurality of outwardly bulging annular ribs (88, 89) are formed on an outer circumference of the support tube so that a vertical movement of the rotatable plate is restricted by the ribs.

According to this aspect, the tubular portion maintains the base portion and the rotatable plate in a coaxial relationship. In addition, the tubular portion can prevent relative displacement between the base portion and the rotatable plate in the vertical direction.

In this aspect of the present invention, preferably, an enlarged diameter portion (93) is provided at a lower end of the support tube so that a vertical movement of the base plate is restricted by one of the annular ribs and the enlarged diameter portion.

According to this aspect, the position of the base plate relative to the support tube is stabilized.

In this aspect of the present invention, preferably, one of the rotatable portion and the base portion is provided with a detecting piece (173) made of a magnetic material, and another of the rotatable portion and the base portion is provided with a magnetic proximity sensor (174) that outputs a signal corresponding to a distance from the detecting piece.

According to this aspect, the magnetic proximity sensor can be used to detect the rotational position of the rotatable portion with respect to the base portion.

In this aspect of the present invention, preferably, stoppers (176, 177, 178) are provided between the base portion and the rotatable portion for restricting a rotational range of the rotatable portion with respect to the base portion so that the rotatable portion is rotatable with respect to the base portion between an inner rotation limit set at 180 degrees or less toward a vehicle inner side from a reference rotational position where the seat cushion faces forward, and an outer rotation limit set at 90 degrees or less toward a vehicle outer side from the reference rotational position.

According to this aspect, the seat cushion is prevented from facing in any unnecessary directions.

Yet another aspect of the present invention provides a vehicle seat device (1) comprising a base (330) fixable to a floor portion (312) of a vehicle body, a rotatable disk (320) arranged on the base (330) and integrally connected to a seat main body(S) for integral rotation therewith to support the seat main body(S), a bearing (B1, B2) supporting the rotatable disk (320) on the base (330) so as to be rotatable around a vertical axis, and a drive device (D) for rotating the rotatable disk (320) with respect to the base (330), wherein the drive device (D) includes an actuator (340) fixed on the rotatable disk (320) and having an output shaft (343) extending downward beyond the rotatable disk (320), a gear transmission mechanism (GT) that converts a rotation of the output shaft (343) to a rotational motion of the rotatable disk (320) relative to the base (330), wherein the seat main body(S) is provided with a seat cushion (Sc) for supporting occupant's buttocks, the seat cushion (Sc) including a seat frame (SFc) that serves as a skeletal structure, and a seat pad (Pc) supported by the seat frame (SFc) via an elastically deformable pressure receiving member (318), and wherein the actuator (340) is positioned so as to partly overlap with the pressure receiving member (318) in top view, and not to interfere with the pressure receiving member (318) even when the pressure receiving member (318) has deflected downward by a downward load received from the occupant via the seat pad (Pc).

According to this aspect, since the actuator that rotationally drives the rotatable disk is positioned so that at least a part thereof overlaps with the pressure receiving member of the seat main body in top view, radial projection of the actuator can be restricted, and this contributes to the size reduction of the seat device in the radial direction. Further, since the actuator is positioned such that the pressure receiving member does not interfere with the actuator even when the pressure receiving member has deflected downward due to the downward load received from the occupant, the interference between the pressure receiving member and the actuator can be avoided although the pressure receiving member and the actuator overlap each other in top view.

In this aspect of the present invention, preferably, a front end of the pressure receiving member (318) is engaged and supported by the front cross member (311f) of the seat frame (SFc), and at least a part of the actuator (340) overlaps with the front cross member (311f) in top view.

According to this aspect, since the front end of the pressure receiving member is engaged by and supported by the front cross member of the seat frame, and at least part of the actuator is positioned so as to overlap with the front cross member in top view, the actuator can be positioned directly under a part of the pressure receiving member near the front cross member (i.e., a part where the amount of bending deformation is comparatively small when the pressure receiving member receives a downward load from the occupant). As a result, the height of the pressure receiving member (and hence the height of the seat main body) is not required to be particularly high to avoid the interference due to the bending deformation of the pressure receiving member.

In this aspect of the present invention, preferably, the actuator (340) is positioned on the rotatable disk (320) such that a longitudinal direction thereof extends substantially along the front cross member (311f).

According to this aspect, since the actuator is positioned on the rotatable disk so that a longitudinal direction thereof extends substantially along the front cross member, even when the actuator is long, a large part of the actuator can be positioned directly under a part of the pressure receiving member near the cross member (or a part where the amount of the bending deformation of the pressure receiving member is comparatively small when subjected to a downward load from an occupant) so that the advantage of the above mentioned aspect will be adequately obtained.

In this aspect of the present invention, preferably, the gear transmission mechanism (GT) includes a fixed gear (336) having external teeth (336g) on an outer periphery thereof and is fixed to the base (330) concentrically with the rotatable disk (320), and a drive gear (346) that meshes with the fixed gear (336) and is concentrically fixed to the output shaft (343).

According to this aspect, since the gear transmission mechanism includes a fixed gear having external teeth on an outer periphery thereof and is fixed to the base concentrically with the rotatable disk, and a drive gear that meshes with the fixed gear and is concentrically fixed to the output shaft, the fixed gear meshes with the drive gear at a radially outer point on account of the fact that the fixed gear is an external gear. Therefore, the actuator can be placed directly under the part of the pressure receiving member where the amount of bending deformation is comparatively small so that the height of the pressure receiving member (and hence the height of the seat main body) is not required to be particularly high in order to avoid the interference with the actuator.

In this aspect of the present invention, preferably, the rotatable disk (320) is formed with a first annular recess (320a) formed concentrically with the rotatable disk (320) and recessed downward, the base (330) is formed with a second annular recess (330a) recessed downward so as to correspond to the first annular recess (320a), the actuator (340) is fixed on a bottom surface of the first annular recess (320a), and the gear transmission mechanism (GT) is positioned between the rotatable disk (320) and the second annular recess (330a).

According to this aspect, since the rotatable disk is formed with a first annular recess formed concentrically with the rotatable disk and recessed downward, the base is formed with a second annular recess recessed downward so as to correspond to the first annular recess, the actuator is fixed on a bottom surface of the first annular recess, and the gear transmission mechanism is positioned between the rotatable disk and the second annular recess, the heights of the actuator and gear transmission mechanism positioned above and below the rotatable disk, respectively, can be minimized without requiring a part of the gear transmission mechanism to project downward from the base. As a result, the actuator is prevented from interfering with the pressure receiving member that flexibly deforms under the downward load from the passenger, and the gear transmission mechanism can be accommodated in a space defined between the rotatable disk and the base (particularly, the second annular recess thereof) so that the gear meshing noise is prevented from reaching the ears of the occupant.

In this aspect of the present invention, preferably, a pair of fore and aft slide mechanisms (SL) which are laterally spaced apart from each other are positioned vertically between the floor portion (312) and the base (330) to support the base (330) on the floor portion so that a fore and aft position thereof can be adjusted, and the second annular recess (330a) is positioned laterally between the fore and aft slide mechanisms (SL) and partly overlaps with the fore and aft slide mechanisms (SL) in side view.

According to this aspect, since a pair of fore and aft slide mechanisms which are laterally spaced apart from each other are positioned vertically between the floor portion and the base to support the base on the floor portion so that a fore and aft position thereof can be adjusted, and the second annular recess is positioned laterally between the fore and aft slide mechanisms and partly overlaps with the fore and aft slide mechanisms in side view, the second annular recess with an adequate depth can be ensured by making use of the dead space located between the left and right fore and aft slide mechanisms. As a result, the gear transmission mechanism can be accommodated at a lower position between the rotatable disk and the second annular recess without difficulty, so that gear meshing noise can be made more unlikely to reach the ears of the occupants.

In this aspect of the present invention, preferably, the actuator (340) is fixed on the bottom surface of the first annular recess (320a) so that a longitudinal direction thereof is substantially aligned with a tangential direction of the first annular recess (320a).

According to this aspect, since the actuator is fixed on the bottom surface of the first annular recess so that a longitudinal direction thereof is substantially aligned with a tangential direction of the first annular recess, even if the actuator is long, the longitudinal direction of the actuator extends substantially along the tangential direction of the first annular recess, the actuator can be positioned compactly on the bottom surface of the first annular recess without significant upward protrusion, and interference between the actuator and the pressure receiving member can be easily avoided.

In this aspect of the present invention, preferably, a bearing tubular portion (331) having open upper and lower ends is fixed centrally to the base (330) concentrically with the rotatable disk (320), and the bearing includes a first bearing (B1) that rotatably supports an outer peripheral edge part of the rotatable disk (320) on an outer peripheral edge part of the base (330) and a second bearing (B2) that is retained by the bearing tubular portion (331) and rotatably supports an inner peripheral part of the rotatable disk (320).

According to this aspect, since a bearing tubular portion having open upper and lower ends is fixed centrally to the base concentrically with the rotatable disk, and the bearing includes a first bearing that rotatably supports an outer peripheral edge part of the rotatable disk on an outer peripheral edge part of the base and a second bearing that is retained by the bearing tubular portion and rotatably supports an inner peripheral part of the rotatable disk, not only the outer peripheral edge part of the rotatable disk can be supported on the base via the first bearing but also the inner peripheral part of the rotatable disk is supported on the base via a simple structure using the bearing tubular portion. Therefore, the rotatable disk can be rotatably supported on the base in a stable attitude and in a smooth manner so that the durability of the gear transmission mechanism can be improved and the meshing noise can be reduced.

In this aspect of the present invention, preferably, the bearing tubular portion (331) is formed in a hollow tubular shape with open upper and lower ends, and an electric wire (333) for supplying electricity to electric equipment in the seat main body including the actuator (340) is passed through a hollow interior of the bearing tubular portion.

According to this aspect, since the bearing tubular portion is formed in a hollow tubular shape with open upper and lower ends, and an electric wire for supplying electricity to electric equipment in the seat main body including the actuator is passed through a hollow interior of the bearing tubular portion, even when the seat main body is rotated, the electric wire is prevented from being excessively stretched or twisted so that the durability of the electric wire can be improved.

In this aspect of the present invention, preferably, with the seat main body(S) fixed to the base (330) in a forward-facing reference position, a left and a right fixing bracket (350) is fixedly secured to an upper surface of either side of the rotatable disk (320), and the seat main body(S) is fastened to side parts of the rotatable disk (320) via the respective fixing brackets (350), and the actuator (340) is positioned between the left and right fixing brackets (350) along the circumferential direction.

According to this aspect, since, with the seat main body fixed to the base in a forward-facing reference position, a left and a right fixing bracket is fixedly secured to an upper surface of either side of the rotatable disk, and the seat main body is fastened to side parts of the rotatable disk via the respective fixing brackets, and the actuator is positioned between the left and right fixing brackets along the circumferential direction, the actuator is prevented from being interfered by the fixing brackets that are secured to the rotatable disk to attach the rotatable disk to the seat main body, and the actuator can be appropriately fixed to the rotatable disk at a comparatively low position.

In this aspect of the present invention, preferably, an upper surface of the outer peripheral edge part of the rotatable disk (320) is retained to a lower surface of the upper fixing member (360) via a slider (370), the upper fixing member (360) extending under the left and right fixing brackets (350) and fixed to an outer peripheral part of the base (330).

According to this aspect, since an upper surface of the outer peripheral edge part of the rotatable disk is retained to a lower surface of the upper fixing member via a slider, the upper fixing member extending under the left and right fixing brackets and fixed to an outer peripheral part of the base, the rotatable disk is enabled to rotate smoothly, and is prevented from being lifted upward on account of the upper fixing member fixed to the outer peripheral part of the base pressing the rotatable disk from above.

In this aspect of the present invention, preferably, the upper fixing member (360) is composed of a plurality of fixing member elements (361, 362) arranged in a circumferential direction of the rotatable disk (320).

According to this aspect, since the upper fixing member is composed of a plurality of fixing member elements arranged in a circumferential direction of the rotatable disk, the individual fixing member elements can be made more compact and light-weight, and easier to handle as compared to the case where the upper fixing member is composed of as an integral one-piece annular member. Furthermore, when other functional components (such as peeling preventing members) are added to the upper fixing member, the manufacturing process is prevented from becoming unduly complex.

In this aspect of the present invention, preferably, a rotating-side peeling preventing portion (353) is fixed to the fixing bracket (350), and a fixed-side peeling preventing portion (363) is attached to the upper fixing member (360) so as to correspond to the rotating-side peeling preventing portion (353) so that the seat main body(S) is prevented from being peeled off from the base (330) because the rotating-side peeling preventing portion (353) and the fixed-side peeling preventing portion (363) are engaged with each other when an excessive load acts on the seat main body(S).

According to this aspect, since a rotating-side peeling preventing portion is fixed to the fixing bracket, and a fixed-side peeling preventing portion is attached to the upper fixing member so as to correspond to the rotating-side peeling preventing portion so that the seat main body is prevented from being peeled off from the base because the rotating-side peeling preventing portion and the fixed-side peeling preventing portion are engaged with each other when an excessive load acts on the seat main body, the fixing bracket that secures the rotatable disk to the seat main body and the upper fixing member that prevents the lifting of the rotatable disk are also utilized for preventing the peeling of the seat main body so that the peeling preventing mechanism can be simplified and the manufacturing cost can be reduced.

To achieve such an object, another aspect of the present invention provides a vehicle seat device, comprising: a base (330) configured to be fixed to a floor portion (312) of a vehicle body; a rotatable disk (320) supporting a seat main body(S) for integral rotation therewith and positioned on the base (330); a bearing (B1, B2) supporting the rotatable disk (320) on the base (330) so as to be rotatable around a vertical axis; a drive device (D) for rotationally drive the rotatable disk (320) with respect to the base (330), the drive device (D) including an actuator (340) fixed to the rotatable disk (320) and having an output shaft extending downward beyond the rotatable disk (320), and a gear transmission mechanism (GT) that converts a rotation of the output shaft into a rotation of the rotatable disk (320) relative to the base (330), wherein the bearing includes a first bearing (B1) that rotatably supports an outer peripheral edge part of the rotatable disk (320) on an outer peripheral edge part of the base (330), and the gear transmission mechanism (GT) is received in a space (C) defined by the rotatable disk (320) from above, the base (330) from below, and the first bearing (B1) from a radially outer side.

According to this aspect, in this vehicle seat device, the drive device includes an actuator fixed to the rotatable disk and having an output shaft extending downward beyond the rotatable disk, and a gear transmission mechanism that converts a rotation of the output shaft into a rotation of the rotatable disk relative to the base, and the gear transmission mechanism is received in a space defined by the rotatable disk from above, the base from below, and the first bearing from a radially outer side. Therefore, the gear transmission mechanism is received in the space surrounded by the first bearing and interposed between the rotatable disk and the base so that the gear meshing noise that is created by the operation of the actuator (or during the rotation of the seat main body) is prevented from leaking to the outside so that a favorable noise control for the gear transmission mechanism can be achieved. Furthermore, since the rotatable disk, the base and the first bearing can be additionally utilized as a noise reduction means for the gear transmission mechanism, the structure of the seat device can be simplified and the manufacturing cost can be reduced.

In this aspect of the present invention, preferably, the rotatable disk (320) is formed with a first annular recess (320a) recessed downward concentrically with the rotatable disk (320) while the base (330) is formed with a second annular recess (330a) recessed downward so as to correspond to the first annular recess (320a), the actuator (340) is fixed on the bottom surface of the first annular recess (320a), and the gear transmission mechanism (GT) is positioned between the rotatable disk (320) and the second annular recess (330a).

According to this aspect, since the rotatable disk is formed with a first annular recess recessed downward concentrically with the rotatable disk while the base is formed with a second annular recess recessed downward so as to correspond to the first annular recess, the actuator is fixed on the bottom surface of the first annular recess, and the gear transmission mechanism is positioned between the rotatable disk and the second annular recess, the actuator and gear transmission mechanism that are positioned above and below the rotatable disk, respectively, can be reduced in height without requiring a part of the gear transmission mechanism to protrude downward beyond the base. As a result, the interference between the actuator and the bottom of the seat cushion can be easily avoided, while the gear meshing noise is prevented from reaching the ears of the occupant owing to the positioning of the gear transmission mechanism in the space.

In this aspect of the present invention, preferably, a left and a right fore and aft slide mechanism (SL) is interposed between the floor portion (312) and the base (330) to support the base (330) on the floor portion so that the fore and aft position thereof can be adjusted, and the second annular recess (330a) is positioned between the left and right fore and aft slide mechanisms (SL) so as to partly overlap with the fore and aft slide mechanisms (SL) in side view.

According to this aspect, the left and right fore and aft slide mechanisms (SL) are interposed between the floor portion and the base to support the base on the floor portion so that the fore and aft position thereof can be adjusted, and the second annular recess is positioned between the left and right fore and aft slide mechanisms so as to partly overlap with the fore and aft slide mechanisms in side view, the second annular recess having a sufficient depth can be safely accommodated by making use of the dead space created between the left and right fore and aft slide mechanisms. As a result, the gear transmission mechanism can be placed at a lower position between the rotatable disk and the second annular recess so that the gear meshing noise can be made less likely to reach the ears of the occupant combined with the advantageous positioning of the gear transmission mechanism in the space.

In this aspect of the present invention, preferably, the gear transmission mechanism (GT) includes a fixed gear (336) having external teeth (336g) along an outer periphery thereof and fixed to the base (330) concentrically to the rotatable disk (320), and a drive gear (346) that meshes with the fixed gear (336) within the space (C) and is concentrically fixed to the output shaft (343).

According to this aspect, since the gear transmission mechanism includes a fixed gear having external teeth along an outer periphery thereof and fixed to the base concentrically to the rotatable disk, and a drive gear that meshes with the fixed gear within the space and is concentrically fixed to the output shaft, although the meshing point between the fixed gear and the drive gear is positioned in a comparatively radially outer point, the gear meshing noise can be made less likely to reach the ears of the occupant owing to the fact that the gear transmission mechanism is positioned within the space.

In this aspect of the present invention, preferably, a bearing tubular portion (331) formed concentrically with the rotatable disk (320) and extending upward is fixed to a central part of the base (330), and the bearing includes a second bearing (B2) that is retained by the bearing tubular portion (331) and rotatably supports an inner peripheral part of the rotatable disk (320), a radially inner side of the space (C) being closed by the bearing tubular portion (331).

According to this aspect, since a bearing tubular portion formed concentrically with the rotatable disk and extending upward is fixed to a central part of the base, and the bearing includes a second bearing that is retained by the bearing tubular portion and rotatably supports an inner peripheral part of the rotatable disk, a radially inner side of the space being closed by the bearing tubular portion, not only the outer peripheral edge part of the rotatably disk can be supported on the base via the first bearing, but also the rotatable disk can be supported on the base in a more stable manner owing to the simple structure using the bearing tubular portion for supporting the inner peripheral part of the rotatable disk. Furthermore, the radially inner side of the space can be closed by using a simple structure that uses the bearing tubular portion so that the meshing noise of the gear transmission mechanism can be made less likely to reach the ears of the occupant.

In this aspect of the present invention, preferably, the bearing tubular portion (331) is formed in a hollow tubular shape with open upper and lower ends, and an electric wire (333) for energizing electrical components in the seat main body(S) including the actuator (340) is passed through a hollow interior of the bearing tubular portion (331).

According to this aspect, since the bearing tubular portion is formed in a hollow tubular shape with open upper and lower ends, and an electric wire for energizing electrical components in the seat main body including the actuator is passed through a hollow interior of the bearing tubular portion, even when the seat main body is rotated, the electric wire can be extended without any excessive stretching or twisting so that the durability of the electric wire can be improved.

In this aspect of the present invention, preferably, the gear transmission mechanism (GT) includes a fixed gear (336) fixed to the base (330) concentrically with the rotatable disk (320), and a drive gear (346) concentrically fixed to the output shaft (343) and meshing with the fixed gear (336) within the space (C), and a lower end portion (343*a*) of the output shaft (343) extending downward beyond the drive gear (346) is rotatably supported by a bearing member (347) which is fixed to a lower surface of the rotatable disk (320) and facing the space (C).

According to this aspect, since the gear transmission mechanism includes a fixed gear fixed to the base concentrically with the rotatable disk, and a drive gear fixed concentrically to the output shaft and meshing with the fixed gear within the space, and a lower end portion of the output shaft extending downward beyond the drive gear is rotatably supported by a bearing member which is fixed to a lower surface of the rotatable disk and facing the space, the meshing reaction force that is applied to the drive gear due to the meshing with the fixed gear can be firmly supported by the bearing member during the operation of the gear transmission mechanism so that the two gears can be meshed with each other both smoothly and quietly.

In this aspect of the present invention, preferably, the base (330) is formed with a second annular recess (330*a*) formed concentric with the rotatable disk (320) and recessed downward, and the bearing member (347) is positioned in the second annular recess (330*a*) and extends in a circumferential direction of the fixed gear (336) with both circumferential ends thereof fixed to the lower surface of the rotatable disk (320).

According to this aspect, since the base is formed with a second annular recess formed concentric with the rotatable disk and recessed downward, and the bearing member is positioned in the second annular recess and extends in a circumferential direction of the fixed gear with both circumferential ends thereof fixed to the lower surface of the rotatable disk, the bearing member (and hence the output shaft of the actuator) can be stably and firmly fixed to the lower surface of the rotatable disk while ensuring a long support span for the fixed gear in the circumferential direction.

In this aspect of the present invention, preferably, a damping member (348) surrounding the output shaft (343) is interposed between the rotatable disk (320) and the fixed gear (336).

According to this aspect, since a damping member surrounding the output shaft is interposed between the rotatable disk and the fixed gear, the vibration of the actuator can be damped by the damping member so that the vibration of the actuator due to the operation of the actuator is prevented from being transmitted to the base and the rotatable disk.

In this aspect of the present invention, preferably, the base (330) comprises a plate-like base main body (330*m*) and a radially inner part (336*i*) of the fixed gear (336), connected to an inner peripheral edge part (330*mi*) of the base main body (330*m*), which is more radially inwardly located than a connecting portion (336*w*) between the fixed gear (336) and the base main body (330*m*).

According to this aspect, since the base comprises a plate-like base main body and a radially inner part of the fixed gear, connected to an inner peripheral edge part of the base main body, which is more radially inwardly located than a connecting portion between the fixed gear and the base main body, a part of the fixed gear (or, the radially inner part) is utilized as a part of the base so that the structure can be simplified.

In this aspect of the present invention, preferably, the fixed gear (336) is formed to be thicker than a plate thickness of the base main body (330*m*), and an inner peripheral edge part (336*ie*) of the fixed gear (336) is fitted on a bearing tubular portion (331) retaining a second bearing (B2) rotatably supporting an inner peripheral part of the rotatable disk (320).

According to this aspect, since the fixed gear is formed to be thicker than a plate thickness of the base main body, and an inner peripheral edge part of the fixed gear is fitted on a bearing tubular portion retaining a second bearing rotatably supporting an inner peripheral part of the rotatable disk, the inner peripheral edge part of the base is fitted on the bearing tubular portion while the relatively thick inner peripheral edge part of the fixed gear is connected to the bearing tubular portion so that a high connecting strength can be achieved.

BRIEF DESCRIPTION OF THE DRAWINGS

FIG. 14 is a perspective view of a side part of a seat cushion;

FIG. 16 is a perspective view of an essential part of the rotation device;

DETAILED DESCRIPTION OF THE PREFERRED EMBODIMENT(S)

A vehicle seat device as applied to an automobile seat according to an embodiment of the present invention will be described in the following with reference to the appended drawings.

Figure 1:
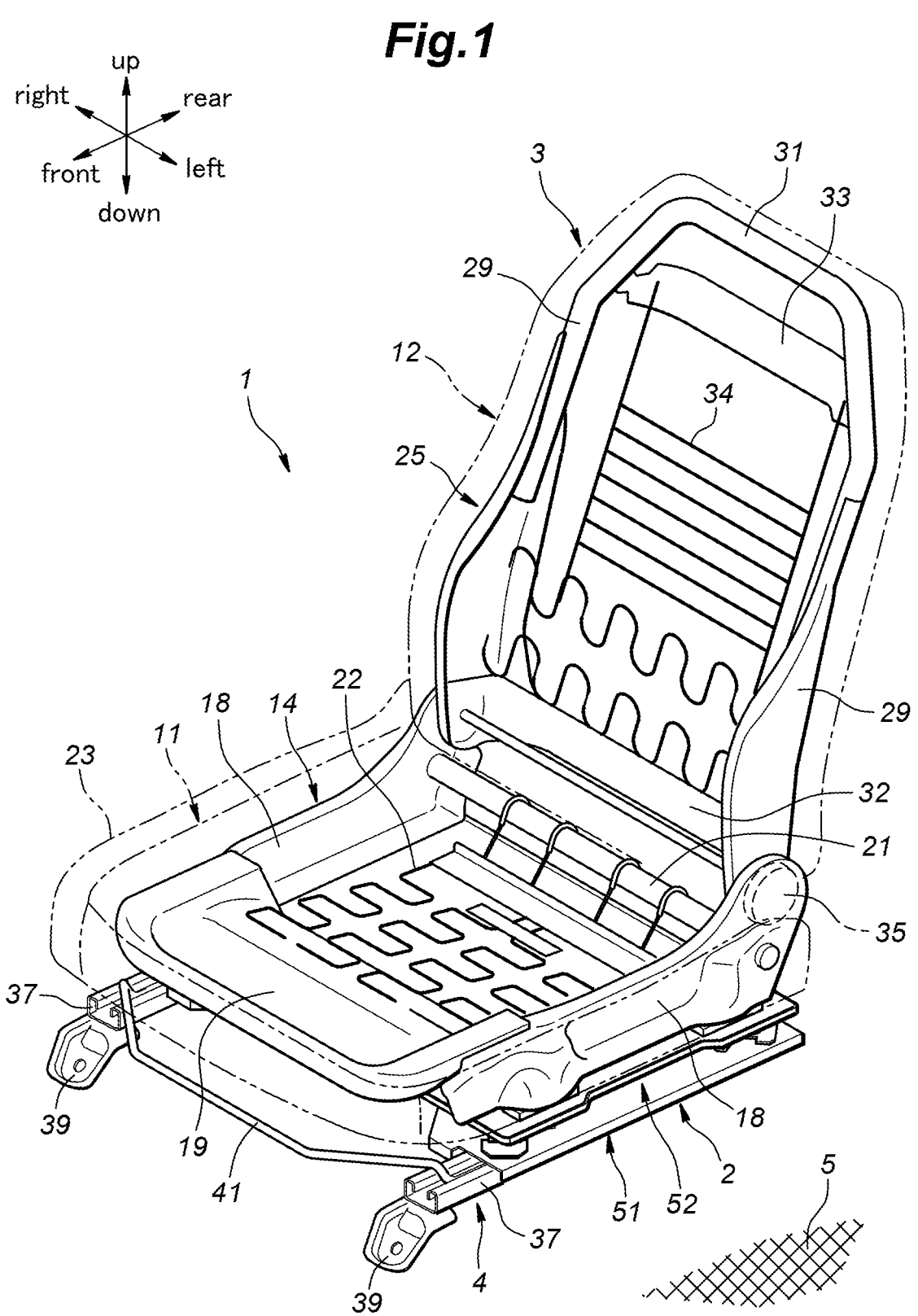
FIG. 1 is a perspective view of a seat device according to an embodiment of the present invention.
Figure 2:
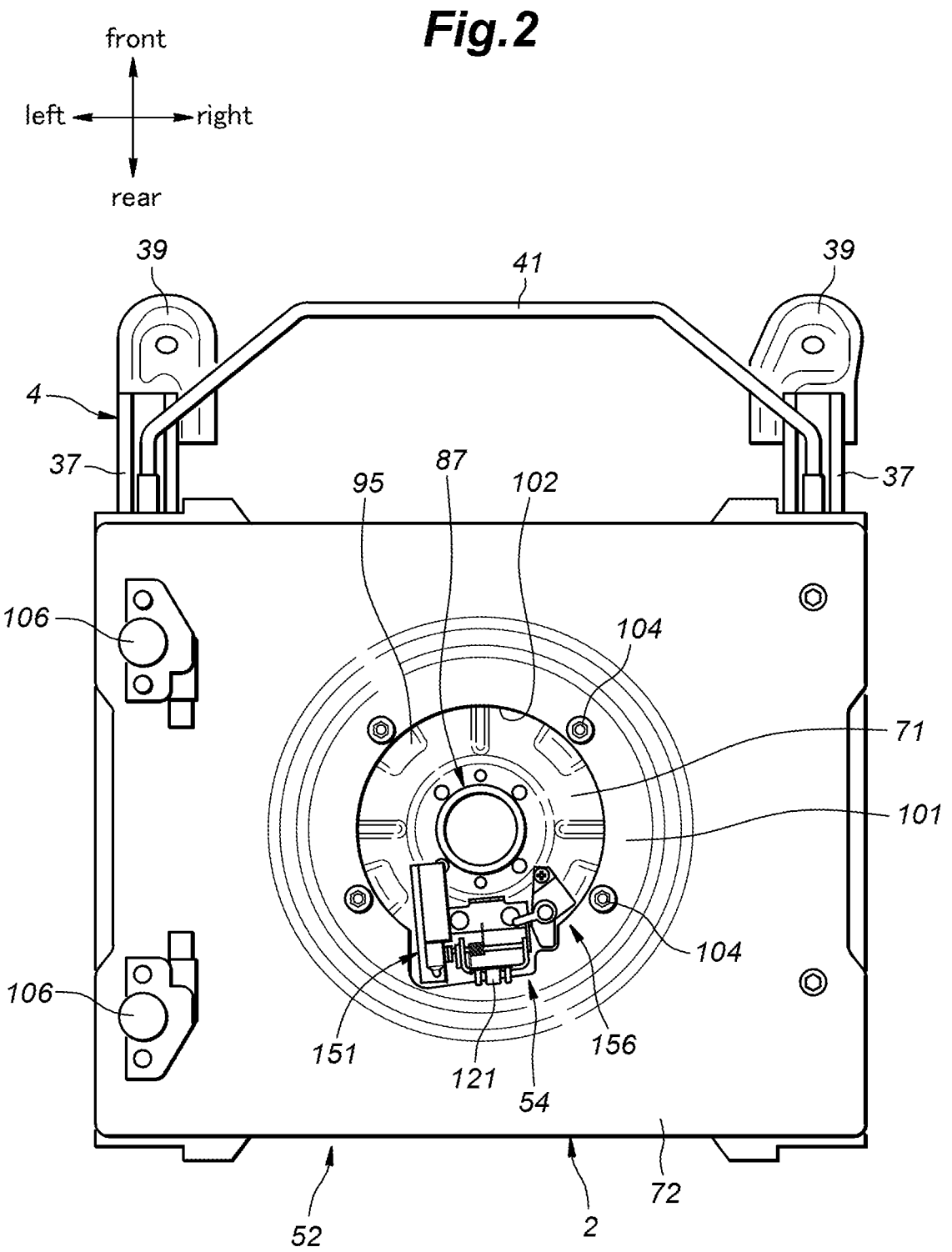
FIG. 2 is a top view of a rotation device.

As shown in FIG. 1, the vehicle seat device 1 is provided with a rotation device 2. The vehicle seat device 1 also includes a seat main body 3 and a slide device 4. The rotation device 2 is provided on the floor 5 via the slide device 4. The seat main body 3 is provided with a seat cushion 11 and a seat back 12. The seat cushion 11 supports the occupant's buttocks from below. The seat back 12 extends upward from a rear part of the seat cushion 11. The seat back 12 supports the occupant's back from behind.

Figure 16:
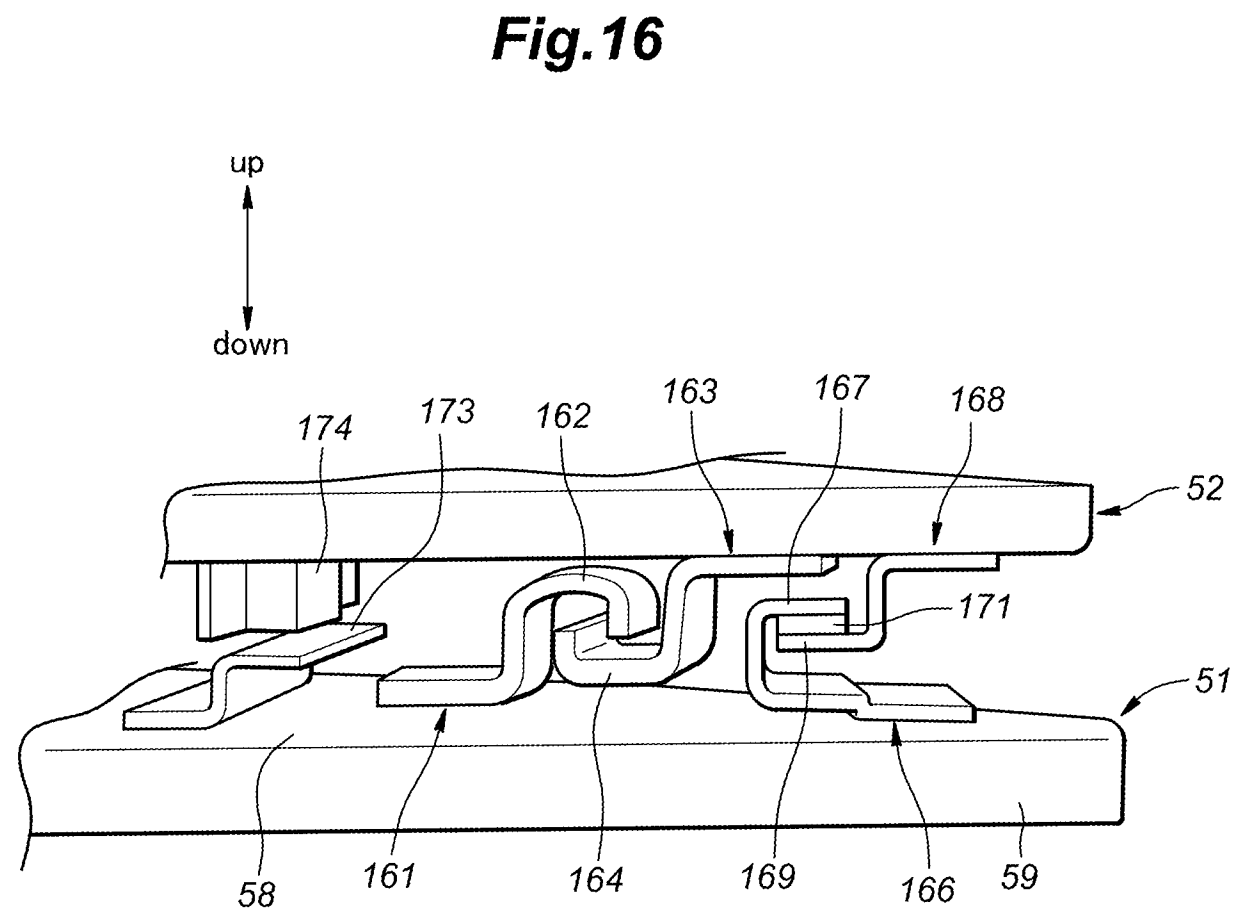

The seat cushion 11 is provided with a seat cushion frame 14 forming a skeletal framework, a pad supported by the seat cushion frame 14, and a skin material covering the surface of the pad. The seat cushion frame 14 includes a pair of seat cushion side members 18 extending longitudinally on either side, a front member 19 extending laterally between the front ends of the seat cushion side members 18, and a rear member 21 extending laterally between the rear ends of the seat cushion side members 18. A flexible support member 22 extends between the front member 19 and the rear member 21 to support the occupant's buttocks. The support member 22 preferably has a plurality of metal wires and a flexible resin sheet connected to the wires. As shown in FIGS. 1 and 16, a pair of side covers 23 are provided on either side part of the seat cushion 11. Each side cover 23 is supported by the corresponding seat cushion side member 18 and conceals the edges of the pad and skin material. The side covers 23 are preferably made of a resin material.

As shown in FIG. 1, the seat back 12 is provided with a seatback frame 25 forming a skeletal framework, a pad supported by the seatback frame 25, and a skin material covering the surface of the pad. The seatback frame 25 includes a pair of seatback side members 29 extending vertically on either side, an upper member 31 extending laterally between the upper ends of the seatback side members 29, a lower member 32 extending laterally between the lower ends of the seatback side members 29, and an intermediate member 33 extending laterally between the seatback side members 29 intermediately between the upper member 31 and the lower member 32. The seatback side members 29, the upper member 31, the lower member 32, and the intermediate member 33 are formed by bending sheet metal. A flexible support member 34 that supports the occupant's back extends across the left and right seatback side members 29, the intermediate member 33, and the lower member 32. The support member 34 is preferably formed of a plurality of metal wires. The lower ends of the left and right seatback side members 29 are connected to the corresponding rear ends of the seat cushion side members 18 via a reclining device 35.

Figure 6:
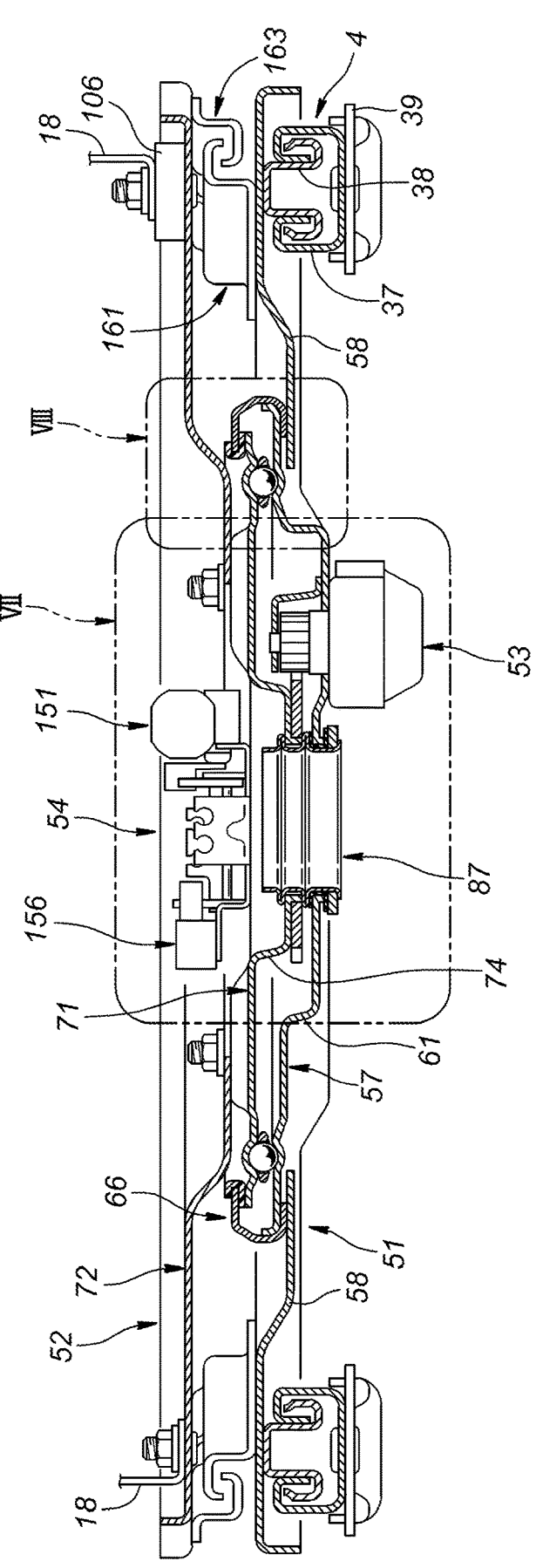
FIG. 6 is a sectional view of the rotation device (taken along line VI-VI of FIG. 4)

As shown in FIGS. 1 and 6, the slide device 4 has a pair of lower rails 37 extending in the fore and aft direction on either side, and a pair of upper rails 38 supported by the respective lower rails 37 so as to be slidable in the fore and aft direction. Each lower rail 37 is connected to the floor 5 via a front and a rear foot 39. A slide lock device (not shown in the drawings) is provided between each lower rail 37 and the corresponding upper rail 38. The left and right slide lock devices are connected to each other by a slide operation lever 41 extending laterally. The occupant can cause the upper rails 38 to be slidable relative to the lower rails 37 by operating the slide operation lever 41.

As shown in FIGS. 1 to 6, the rotation device 2 is provided between the floor 5 and the seat cushion 11 to support the seat cushion 11 so as to be rotatable with respect to the floor 5. The rotation device 2 includes a base portion 51, a rotatable portion 52, an electric actuator 53 and a rotation lock device 54.

The base portion 51 is positioned on the floor 5. In this embodiment, the base portion 51 is provided on the floor 5 via the slide device 4. The base portion 51 is provided with a base plate 56 having a vertically facing major plane and extending laterally. In this embodiment, the base plate 56 consists of a centrally located, disk-shaped center plate 57 and a pair of side plates 58 connected to either side edge of the center plate 57. The base plate 56 is preferably made of sheet metal. In another embodiment, the center plate 57 and the left and right side plates 58 are formed by a continuous single piece of sheet metal.

Each side plate 58 has a longitudinal dimension that progressively increases toward either side edge thereof. The inner edge of each side plate 58 is formed in an arcuate shape corresponding to the outer contour of the center plate 57. Preferably, each side plate 58 is fastened to the center plate 57 by using bolts and nuts.

The left end of the base plate 56 extends above and laterally beyond the left slide device 4, and is connected to the left upper rail 38. The right end of the base plate 56 extends above and laterally beyond the right slide device 4, and is connected to the right upper rail 38. The slide device 4 supports the base plate 56 so as to be movable in the fore and aft direction with respect to the floor 5. The edge part of each side plate 58 is provided with an edge wall 59 extending downward. The edge walls 59 increase the rigidity of the left and right side plates 58.

Figure 7:
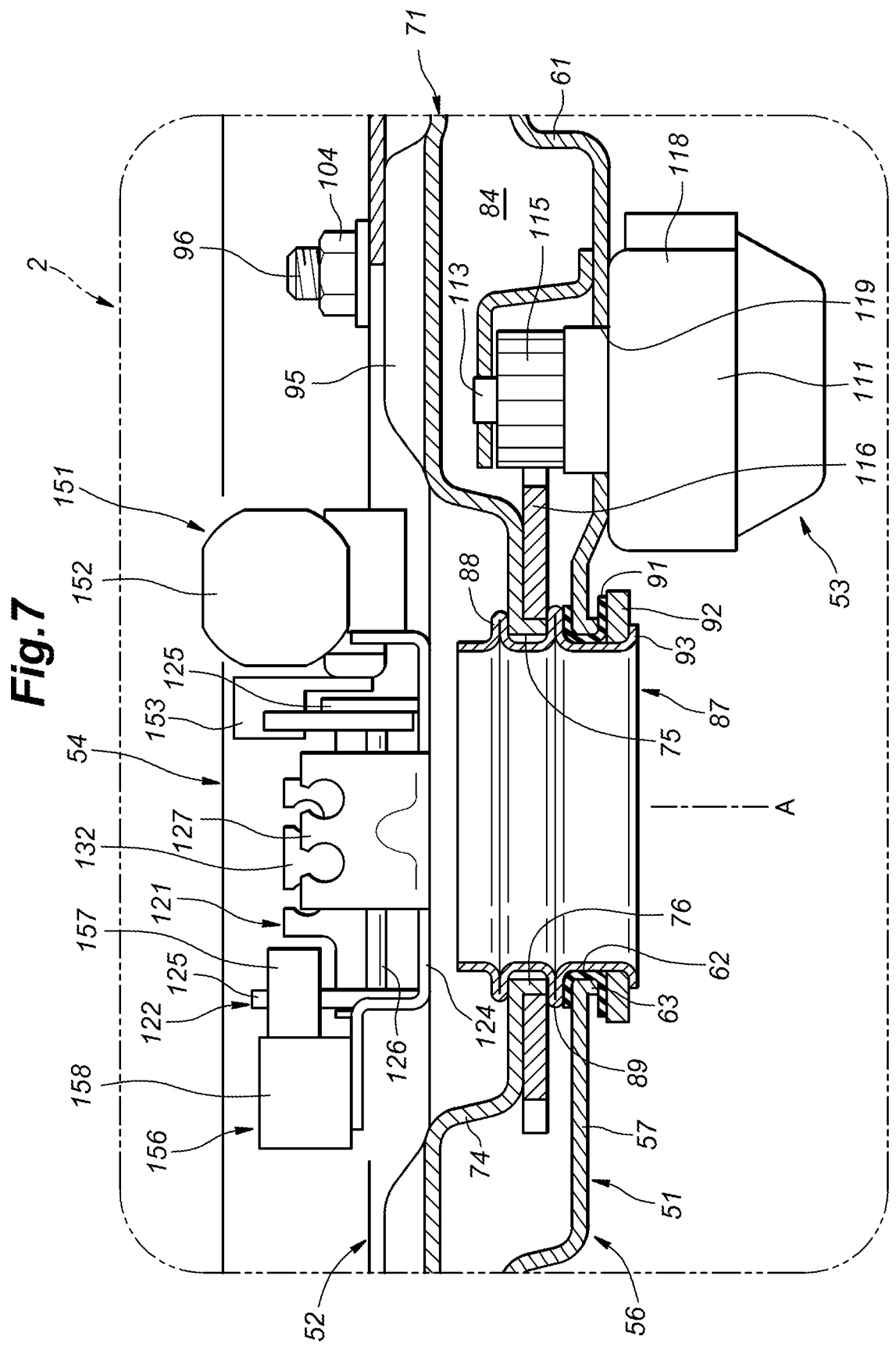
FIG. 7 is a magnified view of a part of FIG. 6 indicated by VII.

As shown in FIGS. 6 and 7, the center plate 57 is centrally formed with a first bulging portion 61 that bulges downward. The first bulging portion 61 is formed in a cylindrical shape and has a bottom. The first bulging portion 61 extends downward beyond the left and right side plates 58. The first bulging portion 61 is positioned so as to overlap with the left and right slide devices 4 in side view. A circular first bearing hole 62 is passed through the center of the bottom wall of the first bulging portion 61. The first bearing hole 62 is centered on an axis A extending vertically. An annular edge wall 63 projecting upward or downward is preferably formed along the edge of the first bearing hole 62.

Figure 5:
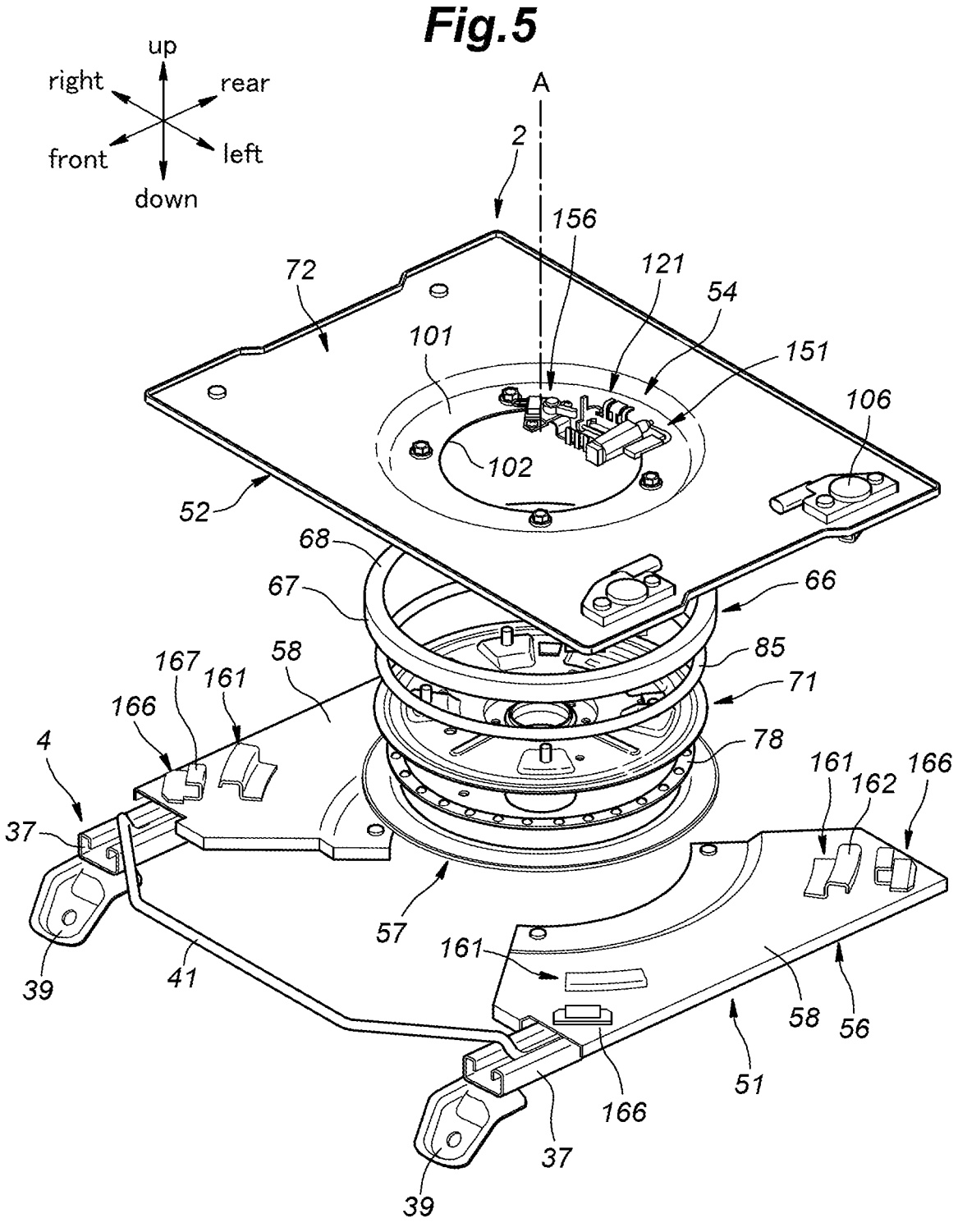
FIG. 5 is an exploded perspective view of the rotation device.
Figure 8:
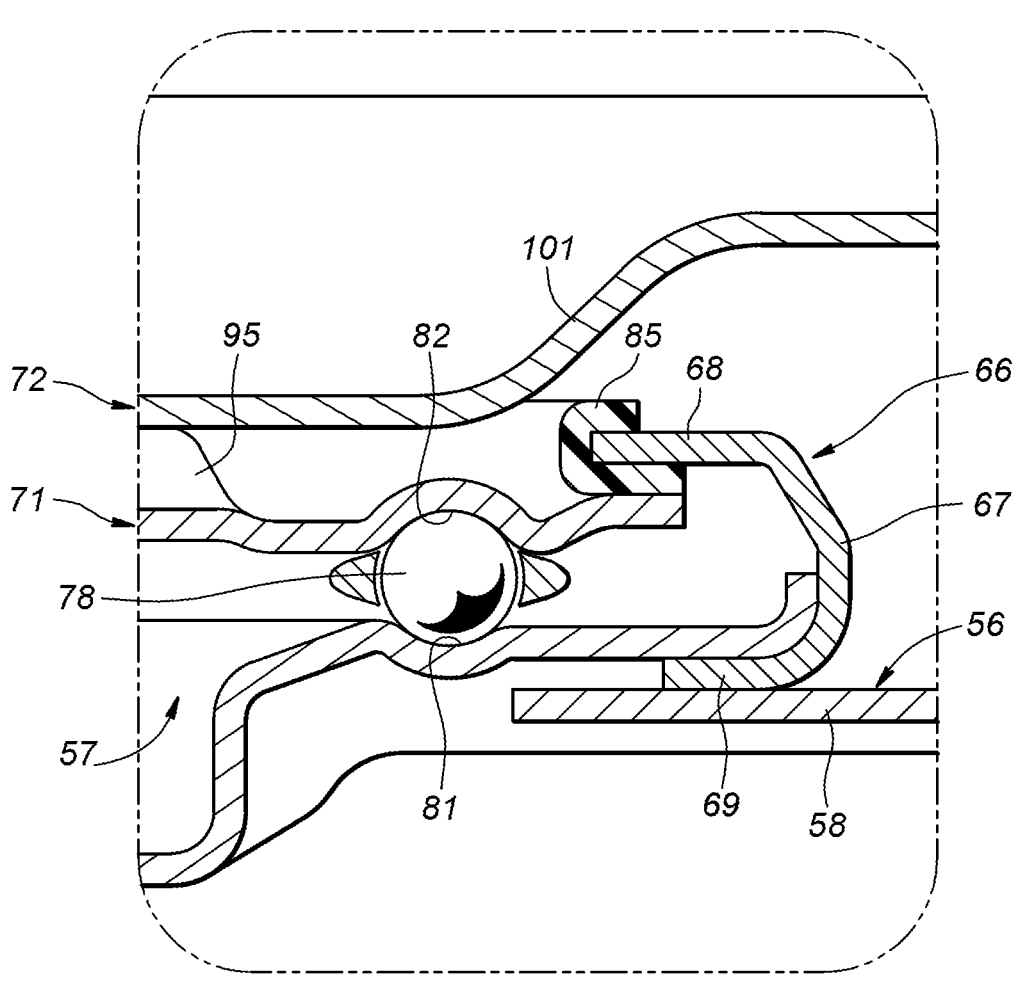
FIG. 8 is a magnified view of a part of FIG. 6 indicated by VIII.

As shown in FIGS. 5, 6, and 8, the base portion 51 is provided with a ring-shaped fixing member 66 extending upward from the base plate 56 and along the outer peripheral portion of the center plate 57. The fixing member 66 includes a cylindrical peripheral wall 67 that extends along the outer peripheral edge part of the center plate 57 and extends upward, an inner flange 68 that extends radially inward from the upper end of the peripheral wall 67, and a plurality of connecting pieces 69 connected to the lower end of the peripheral wall 67. The inner flange 68 is formed in an annular shape and has a vertically facing surface. The connecting pieces 69 are bent from the material of the fixing member 66 during assembly and extend along the lower surface of the center plate 57. The outer peripheral edge part of the center plate 57 is positioned between the inner flange 68 and the connecting pieces 69 in the vertical direction. Some of the connecting pieces 69 are interposed between the center plate 57 and the side plates 58 in the vertical direction. The fixing member 66 is preferably welded to at least one of the center plate 57 and the side plates 58. In this case, the connecting pieces 69 may be omitted. Also, the fixing member 66 may be formed by combining a plurality of members. A plurality of reinforcing structures may be provided at the interface between the peripheral wall 67 and the inner flange 68. The reinforcing structures may include, for example, recesses, ribs, or the like.

Figure 4:
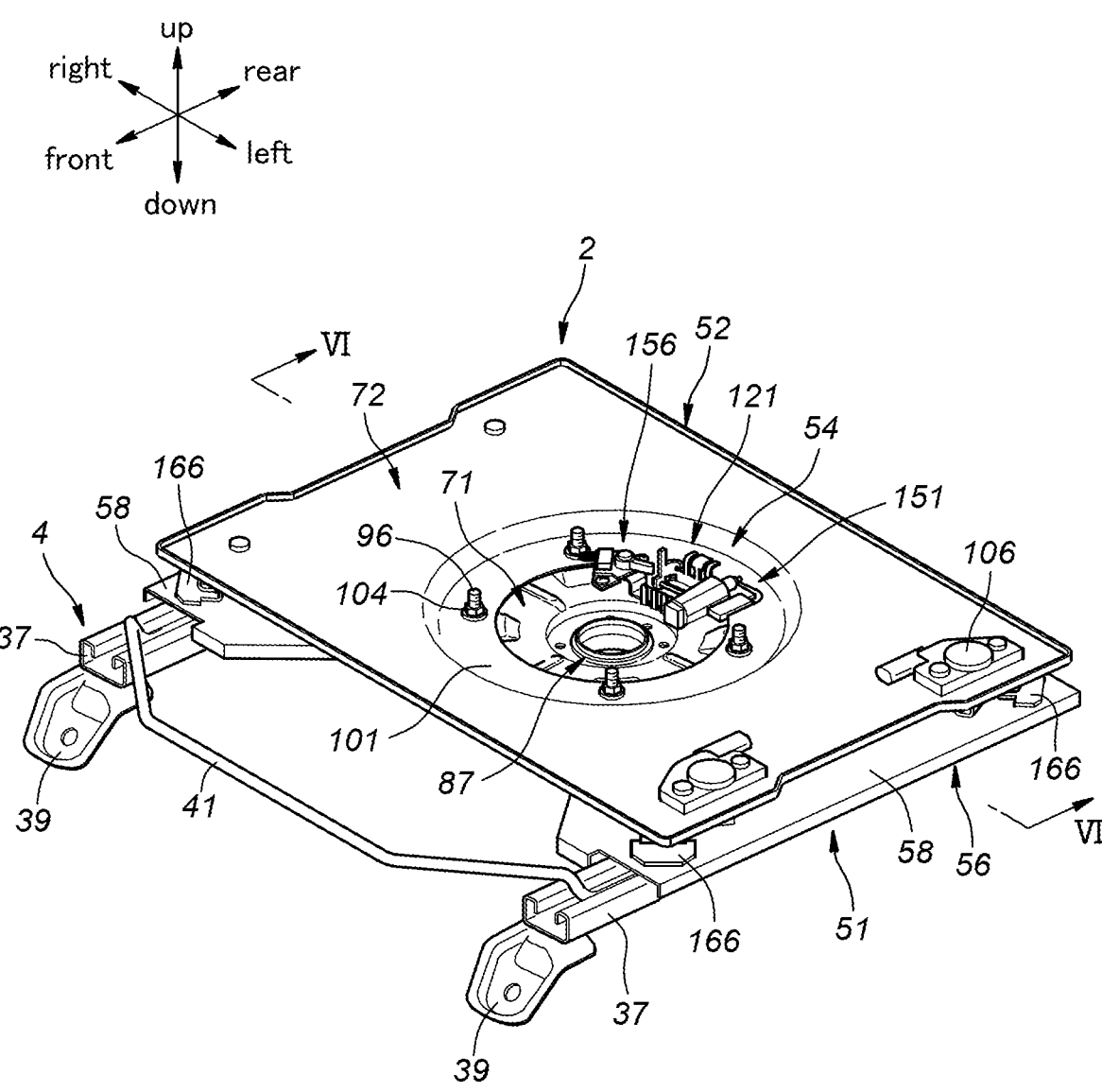
FIG. 4 is a perspective view of the rotation device.

As shown in FIGS. 4 to 6, the rotatable portion 52 is provided in the seat cushion 11 and rotatably supported by the base portion 51. The rotatable portion 52 is provided with a rotatable plate 71 rotatably supported on the upper surface of the base plate 56. Further, the rotatable portion 52 has a fixing bracket 72 that connects the rotatable plate 71 to the seat cushion frame 14. The rotatable plate 71 and the fixing bracket 72 are made of sheet metal.

As shown in FIGS. 4 to 7, 9, and 10, the rotatable plate 71 is formed by a disk having a major plane facing vertically. The central part of the rotatable plate 71 is formed with a second bulging portion 74 that bulges downward. The second bulging portion 74 is formed in a cylindrical shape with a bottom. A circular second bearing hole 75 is passed centrally through the thickness of the second bulging portion 74. The second bearing hole 75 is centered on the axis A. The peripheral edge part of the second bearing hole 75 is provided with an annular edge wall 76 projecting upward or downward.

As shown in FIG. 8, the rotatable plate 71 is supported on the upper surface of the center plate 57 via a bearing 78. The bearing 78 is formed in an annular shape around the axis A. The bearing 78 is positioned between the upper surface of the outer peripheral part of the center plate 57 and the lower surface of the outer peripheral part of the rotatable plate 71. The bearing 78 may be a thrust bearing. In this embodiment, the bearing 78 is a ball bearing which includes a plurality of balls and an annular retainer that rotatably retain the balls. A first bearing groove 81 for receiving the lower part of the bearing 78 is formed on the upper surface of the outer peripheral part of the center plate 57. A second bearing groove 82 for receiving the upper part of the bearing 78 is formed on the lower surface of the outer peripheral part of the rotatable plate 71.

As shown in FIG. 6, the diameter of the second bulging portion 74 is smaller than the diameter of the first bulging portion 61. The second bulging portion 74 is positioned inside the first bulging portion 61 when viewed from above. A space 84 is created between the rotatable plate 71 and the center plate 57.

As shown in FIG. 8, the fixing member 66 extends above the outer peripheral part of the rotatable plate 71. More specifically, the inner flange 68 of the fixing member 66 extends above the outer peripheral part of the rotatable plate 71. A slidable member 85 is provided between the upper surface of the outer peripheral part of the rotatable plate 71 and the fixing member 66. The outer peripheral part of the rotatable plate 71 is in sliding contact with the inner flange 68 via the slidable member 85. The fixing member 66 preferably presses the rotatable plate 71 toward the base plate 56 via the slidable member 85. The slidable member 85 is in sliding contact with a part of the rotatable plate 71 located radially outward of the second bearing groove 82. The slidable member 85 is preferably in sliding contact with the outer peripheral edge part of the rotatable plate 71.

The slidable member 85 is made of a resin material having a smaller coefficient of friction than metal. The slidable member 85 is preferably formed in an annular shape and provided on the lower surface of the inner flange 68. The slidable member 85 may have an engagement portion that engages the inner peripheral edge part of the inner flange 68. The slidable member 85 may be divided into a plurality of pieces.

As shown in FIG. 7, a vertically extending support tube 87 is passed through the first bearing hole 62 and the second bearing hole 75. The support tube 87 is a cylindrical member having an open upper end and an open lower end. The support tube 87 is made of metal. A plurality of annular ribs 88, 89 protruding radially outward are formed on the outer periphery of the support tube 87. In this embodiment, the annular ribs 88 and 89 consist of a first annular rib 88 and a second annular rib 89 that are provided on the outer peripheral portion of the support tube 87. The second annular rib 89 is spaced downwardly from the first annular rib 88.

The vertical movement of the rotatable plate 71 is restricted by the annular ribs 88 and 89. The edge of the second bearing hole 75 of the rotatable plate 71 is interposed between the first annular rib 88 and the second annular rib 89. A tubular bush 91 is attached to the edge of the first bearing hole 62 of the base plate 56. The bush 91 is supported by a part of the support tube 87 located below the second annular rib 89. A retaining ring 92 is provided in a lower part of the bush 91. The lower end of the support tube 87 is formed as an enlarged diameter portion 93 by crimping. The bush 91 and the retaining ring 92 are clamped between the second annular rib 89 and the enlarged diameter portion 93. The support tube 87 is rotatably supported in the first bearing hole 62 of the base plate 56 via the bush 91. The rotatable plate 71 is preferably connected to the support tube 87 by welding or the like. The rotatable plate 71 may also be rotatably supported by the support tube 87. The base plate 56 and the rotatable plate 71 are centrally positioned on the axis A by the support tube 87.

Figure 9:
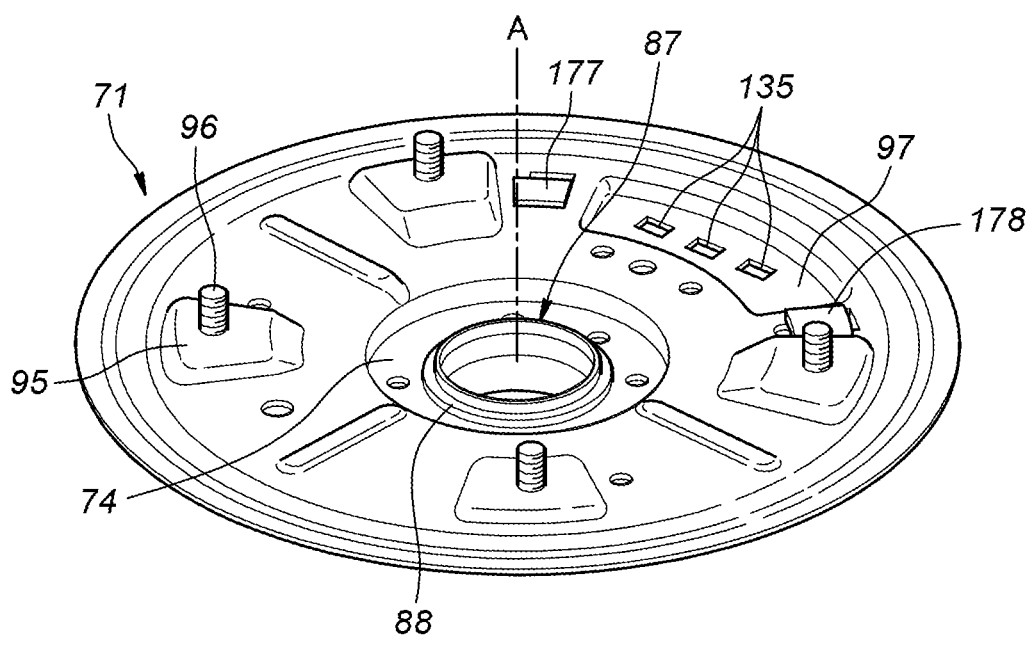
FIG. 9 is a perspective view of a rotatable plate.

As shown in FIG. 9, a plurality of protrusions 95 that project upward are formed in parts of the rotatable plate 71 located between the second bulging portion 74 and the second bearing groove 82. Each projection 95 is fixedly fitted with a bolt 96 projecting upward. The bolts 96 may be stud bolts. A third bulging portion 97 that is recessed downward is formed in a part of the rotatable plate 71 located between the second bulging portion 74 and the second bearing groove 82.

As shown in FIGS. 4 and 5, the fixing bracket 72 is formed in a plate shape having a vertically facing major plane. The fixing bracket 72 is preferably formed in a rectangular shape when viewed from above. A downwardly recessed fourth recess 101 is formed in the center of the fixing bracket 72. An opening 102 is passed through the center of the fourth recess 101. A plurality of fastening holes 103 are formed in the bottom of the fourth recess 101, and a bolt 96 is passed through each of these fastening holes 103. The rotatable plate 71 and fixing bracket 72 are fastened to each other by threading nuts 104 to the respective bolts 96. The fixing bracket 72 is larger than the rotatable plate 71 when viewed from above. The fixing bracket 72 vertically opposes the left and right side plates 58.

The fixing bracket 72 is connected to the left and right seat cushion side members 18 with fasteners such as bolts and nuts. A load cell 106 may be interposed between the fixing bracket 72 and one of the seat cushion side members 18.

The electric actuator 53 rotates the rotatable portion 52 with respect to the base portion 51. As shown in FIGS. 6 and 7, the electric actuator 53 includes an electric motor 111 and a speed reduction gear mechanism 112. The electric actuator 53 does not include a worm speed reduction mechanism. In this embodiment, the reduction gear mechanism 112 includes a first gear 115 coupled to the output shaft 113 of the electric motor 111 and a second gear 116 coupled to the rotatable plate 71. The first gear 115 and the second gear 116 are spur gears. The second gear 116 is centered on the axis A. The second gear 116 is coupled to the lower surface of the second bulging portion 74 of the rotatable plate 71 and positioned within the space 84. The number of teeth of the second gear 116 is greater than the number of teeth of the first gear 115.

The motor case 118 of the electric motor 111 is coupled to the lower surface of the center plate 57. The output shaft 113 of the electric motor 111 extends upward from the motor case 118 into the space 84 via a through hole 119 formed in the center plate 57. The first gear 115 coupled to the output shaft 113 is positioned in the space 84 and meshes with the second gear 116.

Figure 11:
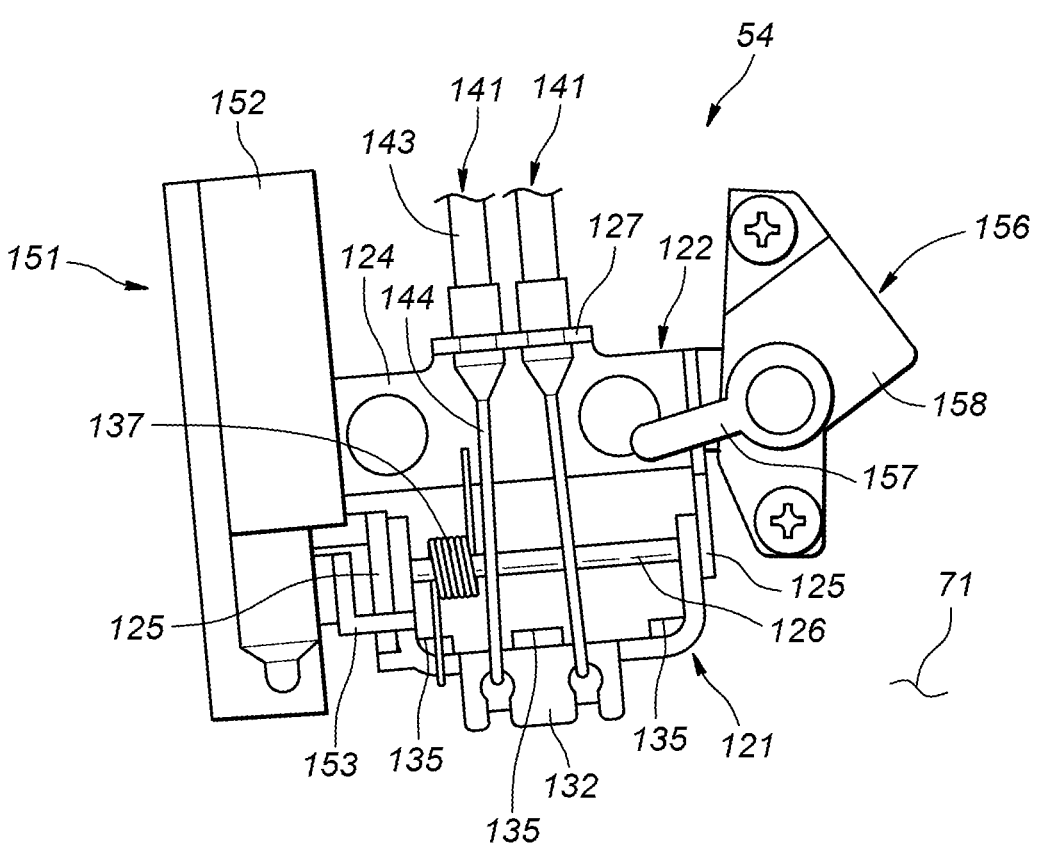
FIG. 11 is a top view of the rotation lock device.
Figure 12:
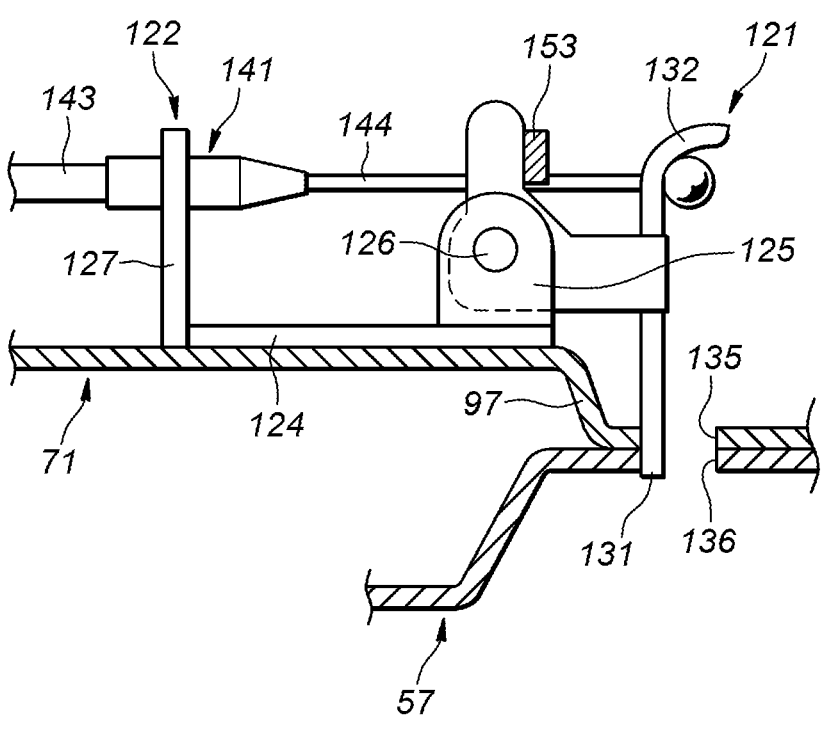
FIG. 12 is an explanatory view showing a locked state of the rotation lock device.
Figure 13:
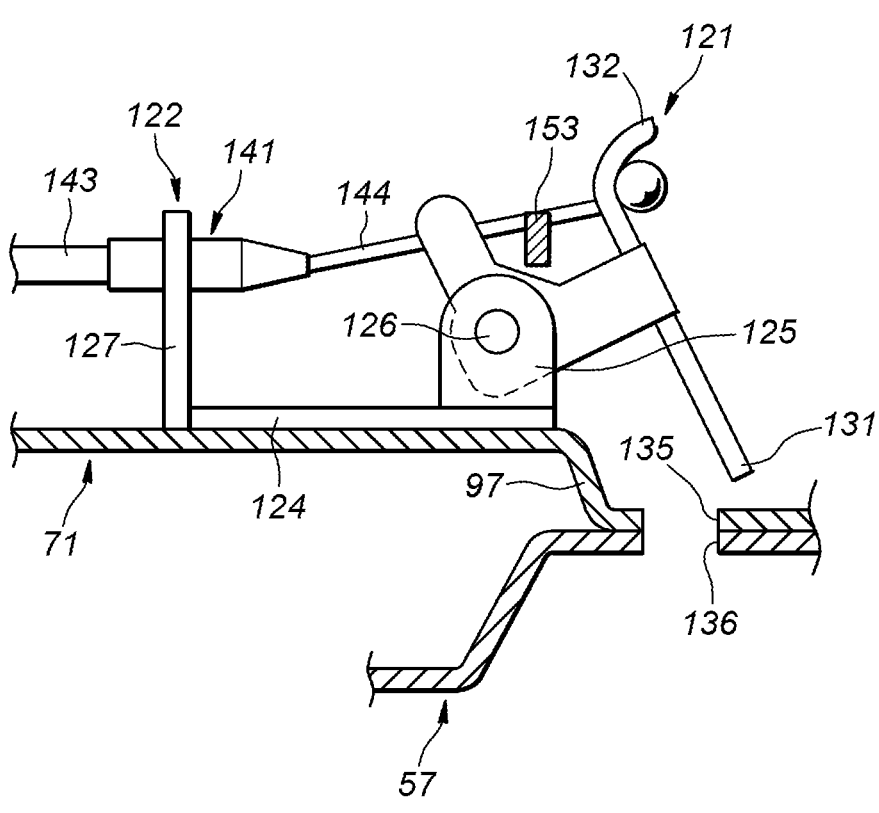
FIG. 13 is an explanatory view showing a released state of the rotation lock device.

The rotation lock device 54 selectively prevents the rotation of the rotatable portion 52 with respect to the base portion 51. As shown in FIGS. 11 to 13, the rotation lock device 54 includes a lock claw 121 movably supported by one of the base portion 51 and the rotatable portion 52. The lock claw 121 can be moved between a locked position for engaging with the other of the base portion 51 and the rotatable portion 52 and a released position for being displaced away from the other of the base portion 51 and the rotatable portion 52.

The rotation lock device 54 further includes a holder 122 that rotatably supports the lock claw 121. In this embodiment, the holder 122 is provided on the top surface of the rotatable plate 71. The holder 122 is coupled to the part of the upper surface of the rotatable plate 71 located between the second bulging portion 74 and the second bearing groove 82. The lock claw 121 and the holder 122 are made of sheet metal. The holder 122 includes a bottom plate 124 coupled to the rotatable plate 71, a pair of support walls 125 projecting upward from the bottom plate 124, a shaft 126 extending between the support walls 125, and a casing locking portion 127 projecting upward from the bottom plate 124. The lock claw 121 is rotatably supported on the shaft 126. The lock claw 121 is provided with at least one claw portion 131 and a cable locking portion 132.

The third bulging portion 97 of the rotatable plate 71 is provided with a plurality of first lock holes 135 through which the claw portions 131 of the lock claw 121 can pass. The center plate 57 of the base portion 51 is formed with a plurality of second lock holes 136 into which the claw portions 131 of the lock claw 121 can be fitted. As shown in FIG. 12, the claw portions 131 of the lock claw 121 pass through the first lock holes 135 and fit into the second lock holes 136, thereby restricting the rotation of the rotatable plate 71 with respect to the center plate 57. Thus, the rotation of the rotatable portion 52 with respect to the base portion 51 can be restricted. The second lock holes 136 are provided at rotationally symmetrical positions about the axis A.

The lock claw 121 is configured to rotate between a locked position where the claw portions 131 project into the first lock holes 135 and the second lock holes 136 and a release position where the claw portions 131 are removed from the first lock holes 135 and the second lock holes 136. In other words, the lock claw 121 can be displaced between the lock position for engaging with the base portion 51 and the release position for being released from the base portion 51. A biasing member 137 is provided between the lock claw 121 and the holder 122 to bias the lock claw 121 toward the lock position. In this embodiment, the biasing member 137 is a torsion coil spring.

Figure 14:
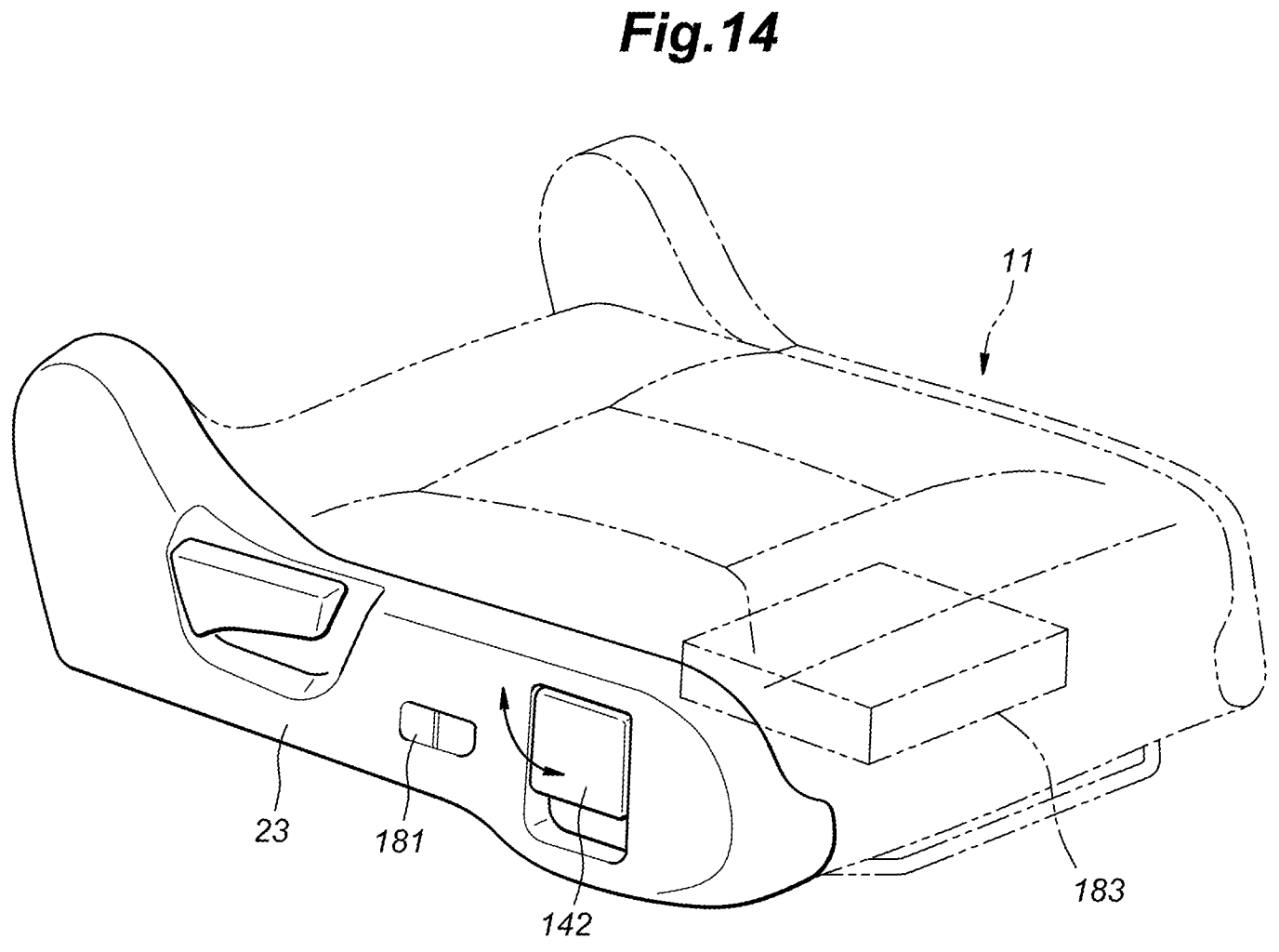
Figure 15:
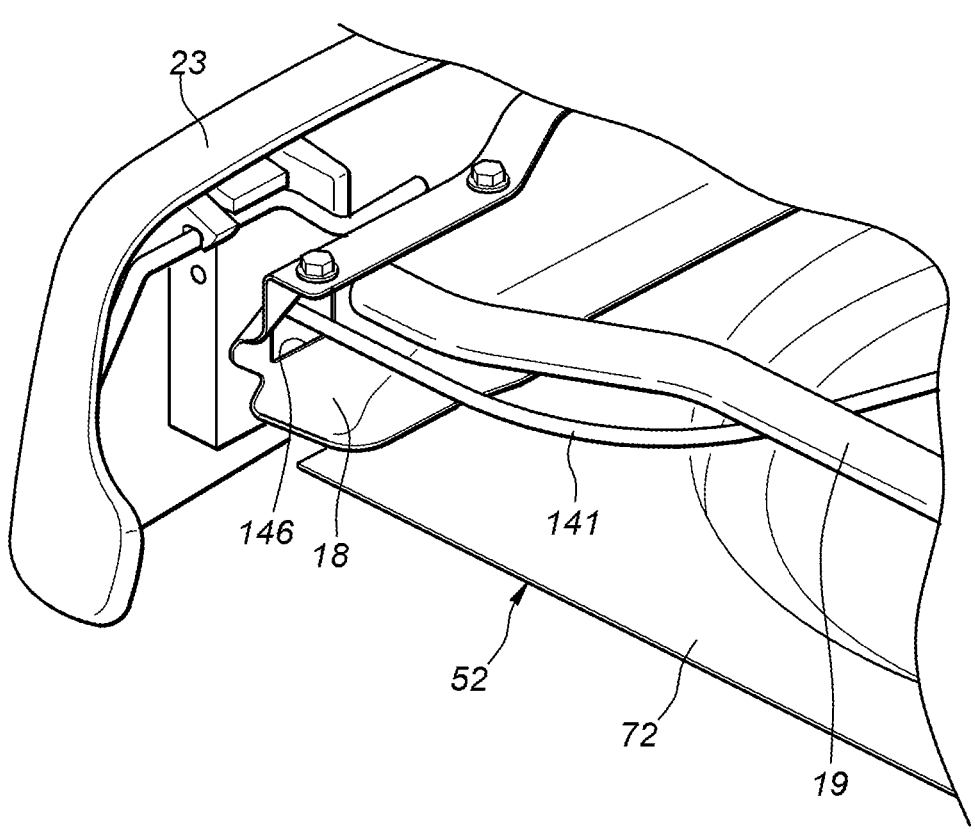
FIG. 15 is a perspective view of a front part of the seat cushion.

As shown in FIGS. 14 and 15, the lock claw 121 is connected to a manual operation lever 142 by a control cable 141. The control cable 141 includes a tubular outer casing 143 and an inner cable 144 movably received in the outer casing 143. One end of the outer casing 143 is fixed to the casing locking portion 127 of the holder 122. The other end of the outer casing 143 is fixed to the seat cushion frame 14 or the side cover 23. One end of the inner cable 144 is connected to the cable locking portion 132 of the lock claw 121. The other end of inner cable 144 is connected to the manual operation lever 142. The manual operation lever 142 is rotatably supported by the seat cushion frame 14 or the side cover 23. In this embodiment, the manual operation lever 142 and the other end of the outer casing 143 are supported by the side cover 23. As shown in FIG. 15, the seat cushion side member 18 is formed with an insertion hole 146 through which the control cable 141 passes.

As shown in FIG. 13, when the occupant pulls the manual operation lever 142, the control cable 141 pulls the lock claw 121 from the lock position to the release position. This allows the rotatable portion 52 to rotate with respect to the base portion 51. When the occupant releases the manual operation lever 142, the biasing force of the biasing member 137 moves the lock claw 121 from the release position to the locked position. Thus, the rotation lock device 54 can be manually moved between the locked state and the unlocked state by the occupant.

The rotation lock device 54 has an unlock actuator 151 that moves the lock claw 121 from the lock position to the release position. The unlock actuator 151 has an electric motor 152 and an arm 153 fixed to the output shaft of the electric motor 152. The arm 153 is engaged with the lock claw 121. The electric motor 152 may be supported by at least one of the holder 122 and the rotatable plate 71. When electric power is supplied to the electric motor 152 to drive the electric motor 152, the arm 153 rotates against the biasing force of the biasing member 137, and the arm 153 moves the lock claw 121 from the lock position to the release position. When the power supply to the electric motor 152 is stopped to stop the electric motor 152, the biasing force of the biasing member 137 moves the lock claw 121 from the release position to the locked position. At this time, the lock claw 121 pushes the arm 153 so as to cause the electric motor 152 to rotate.

When the lock claw 121 is moved from the lock position to the release position by the control cable 141, the unlock actuator 151 does not act as resistance because the lock claw 121 is separated from the arm 153.

As shown in FIG. 11, one of the base portion 51 and the rotatable portion 52 is provided with a lock claw sensor 156 for detecting the position of the lock claw 121. In this embodiment, the lock claw sensor 156 is supported by the holder 122. In another embodiment, the lock claw sensor 156 is provided on the rotatable plate 71. The lock claw sensor 156 has a sensor lever 157 that can be displaced by being pushed by the lock claw 121 and detects the position of the lock claw 121 based on the position of the sensor lever 157. The lock claw sensor 156 has a sensor case 158. The sensor lever 157 is rotatably provided on the sensor case 158. The sensor lever 157 rotates between an initial position and a rotated position. The sensor lever 157 is biased toward the initial position. The sensor case 158 accommodates a contact switch which establishes a contact according to the position of the sensor lever 157. The contact is turned off when the sensor lever 157 is at the initial position, and the contact is turned on when the sensor lever 157 is at the rotated position. The lock claw sensor 156 outputs a signal corresponding to the state of the contact.

When the lock claw 121 is at the lock position, the lock claw 121 and the sensor lever 157 are separated from each other, and the lock claw 121 is at the initial position. Therefore, the lock claw sensor 156 outputs an OFF signal. When the lock claw 121 rotates from the lock position to the release position, the sensor lever 157 is pushed by the lock claw 121 and moves to the rotated position. As a result, the lock claw sensor 156 outputs an ON signal.

As shown in FIGS. 5 and 16, a plurality of base-side peeling preventing portions 161 are provided on the upper surfaces of the left and right side plates 58. The base-side peeling preventing portions 161 are arranged at regular intervals in the circumferential direction about the axis A. In this embodiment, the base-side peeling preventing portions 161 are provided at four locations on the front and rear portions of the left and right side plates 58. The four base-side peeling preventing portions 161 are arranged around the axis A at intervals of 90 degrees. Each base-side peeling preventing portion 161 extends upward from the side plate 58. A base-side hook 162 is formed at the upper end of each base-side peeling preventing portion 161, and is provided with a downwardly facing tip end.

Figure 17:
FIG. 17 is a bottom view of the rotation device.
Figure 17:
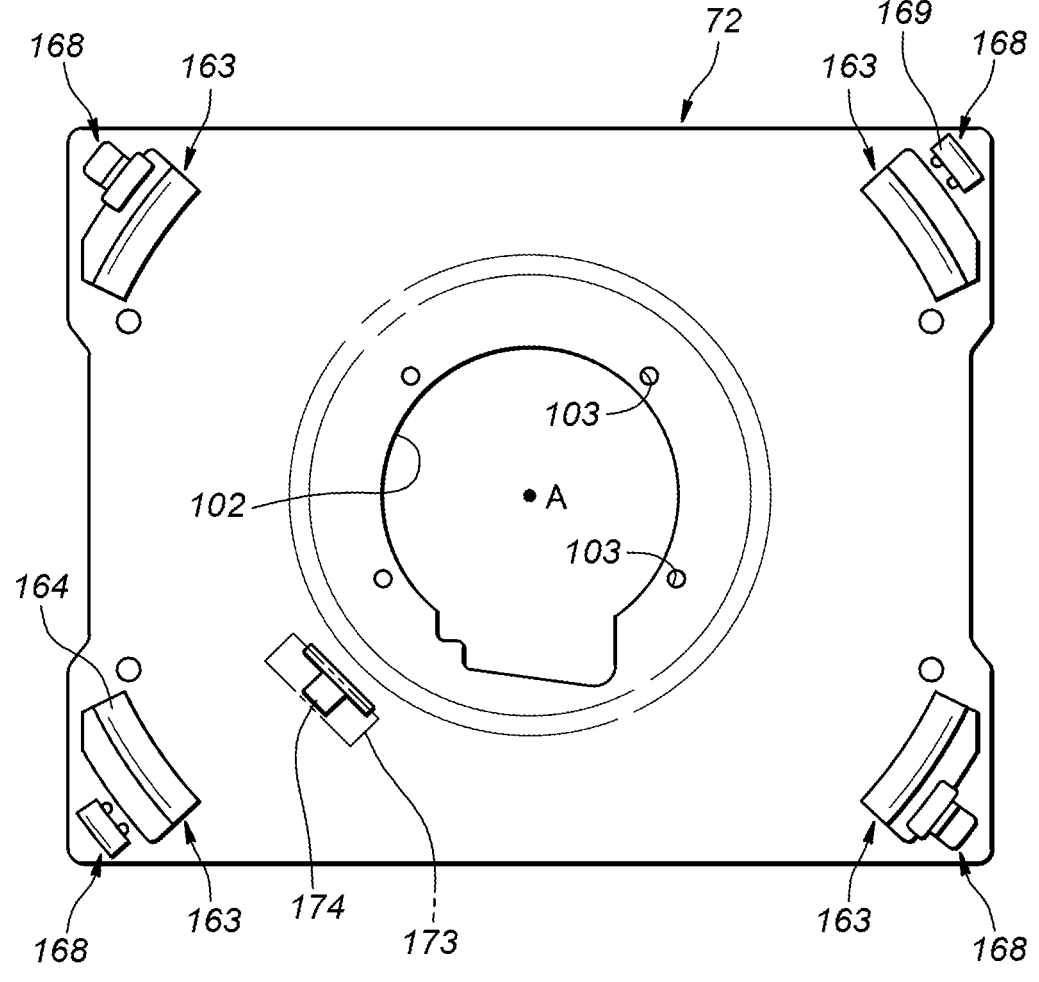

As shown in FIGS. 16 and 17, a plurality of rotating-side peeling preventing portions 163 are provided on the lower surface of the fixing bracket 72. The rotating-side peeling preventing portions 163 may be arranged in the circumferential direction around the axis A at equal intervals. In this embodiment, the rotating-side peeling preventing portions 163 are provided at four locations of the fixing bracket 72, namely, the front left portion, the front right portion, the rear left portion, and the rear right portion. The four rotating-side peeling preventing portions 163 are arranged around the axis A at intervals of 90 degrees. Each rotating-side peeling preventing portion 163 extends downward from the fixing bracket 72. The lower end of each rotating-side peeling preventing portion 163 is formed with a rotation-side hook 164 having an upwardly facing tip end.

The rotational position of the rotatable portion 52 when the seat cushion 11 faces the front of the vehicle is defined as a reference rotational position. When the rotatable portion 52 is at the reference rotational position, the base-side hooks 162 of the base-side peeling preventing portions 161 and the rotating-side hooks 164 of the corresponding rotating-side peeling preventing portions 163 oppose each other with a vertical gap defined therebetween. As a result, when a load is applied to the seat main body 3, the base-side hooks 162 of the base-side peeling preventing portions 161 and the rotating-side hooks 164 of the corresponding rotating-side peeling preventing portions 163 come to engaged with each other with the result that the rotatable portion 52 is prevented from being peeled away from the base portion 51.

Also when the rotatable portion 52 is rotated 90 degrees (+90 degrees) to the right, 90 degrees (−90 degrees) to the left, and 180 degrees (−180 degrees) to the left from the reference rotational position, the base-side hooks 162 of the peeling preventing portion 161 and the rotating-side hooks 164 of the corresponding rotating-side peeling preventing portion 163 oppose each other.

As shown in FIGS. 5 and 16, a plurality of base-side sliding contact portions 166 are provided on the upper surfaces of the left and right side plates 58. The base-side sliding contact portions 166 are preferably arranged at equal intervals in the circumferential direction around the axis A. In this embodiment, the base-side sliding contact portions 166 are provided at four locations, on the front and rear portions of each side plate 58. The four base-side sliding contact portions 166 are arranged around the axis A at intervals of 90 degrees. The base-side sliding contact portions 166 are preferably positioned radially outward of the corresponding base-side peeling preventing portions 161 with respect to the axis A. Each base-side sliding contact portion 166 extends upward from the corresponding side plate 58. A base-side plate 167 extends from the upper end of each base-side sliding contact portion 166 radially outward with respect to the axis A. Each base-side sliding contact portion 166 is preferably arranged radially outward of the corresponding base-side peeling preventing portion 161 with respect to the axis A.

As shown in FIGS. 16 and 17, a plurality of rotating-side sliding contact portions 168 are provided on the lower surface of the fixing bracket 72. The rotating-side sliding contact portions 168 are preferably arranged at equal intervals in the circumferential direction around the axis A. In this embodiment, the rotating-side sliding contact portions 168 are provided at four locations of the fixing bracket 72, namely, the front left portion, the front right portion, the rear left portion, and the rear right portion thereof. The four rotating-side sliding contact portions 168 are arranged around the axis A at intervals of 90 degrees. Each rotating-side sliding contact portion 168 is preferably positioned radially outward of the corresponding base-side peeling preventing portion 161 with respect to the axis A. Each rotating-side sliding contact portion 168 extends downward from the fixing bracket 72. A rotating-side plate 169 extends radially inward with respect to the axis A from the lower end of each rotating-side sliding contact portion 168. Each rotating-side sliding contact portion 168 is preferably positioned radially outward of the corresponding rotating-side peeling preventing portion 163 with respect to the axis A.

As shown in FIG. 16, a sliding contact member 171 is provided on at least one of the lower surface of each base-side plate 167 and the upper surface of the each rotating-side plate 169. The frictional coefficient of the sliding contact members 171 is lower than those of the lower surface of the base-side plate 167 and the upper surface of the rotating-side plate 169. The sliding contact members 171 are preferably made of, for example, a resin material.

When the rotatable portion 52 is at the reference rotating position, the lower surface of the base-side plate 167 of each base-side sliding contact portion 166 is in sliding contact with the upper surface of the corresponding rotating-side plate 169 via the corresponding sliding contact member 171. This prevents rattling of the rotatable portion 52 with respect to the base portion 51.

Also when the rotatable portion 52 is rotated 90 degrees (+90 degrees) to the right, 90 degrees (−90 degrees) to the left, and 180 degrees (−180 degrees) to the left from reference rotational position, the base-side plate 167 of each sliding contact portion 166 is in sliding contact with the rotating-side plate 169 of the corresponding rotating-side sliding contact portion 168 via the corresponding sliding contact member 171.

As shown in FIGS. 16 and 17, one of the rotatable portion 52 and the base portion 51 is provided with a detection piece 173 made of a magnetic material. A magnetic proximity sensor 174 that outputs a signal corresponding to the distance from the detection piece 173 is provided on the other of the rotatable portion 52 and the base portion 51. In this embodiment, the detection piece 173 is provided on the upper surface of the side plate 58 and the magnetic proximity sensor 174 is provided on the lower surface of the fixing bracket 72. The detecting portion of the magnetic proximity sensor 174 is preferably directed downward. For example, the detection piece 173 and the magnetic proximity sensor 174 may be aligned vertically when the rotatable portion 52 is at the reference rotational position. Accordingly, based on the signal from the magnetic proximity sensor 174, it can be detected that the rotatable portion 52 is at the reference rotational position.

Figure 3:
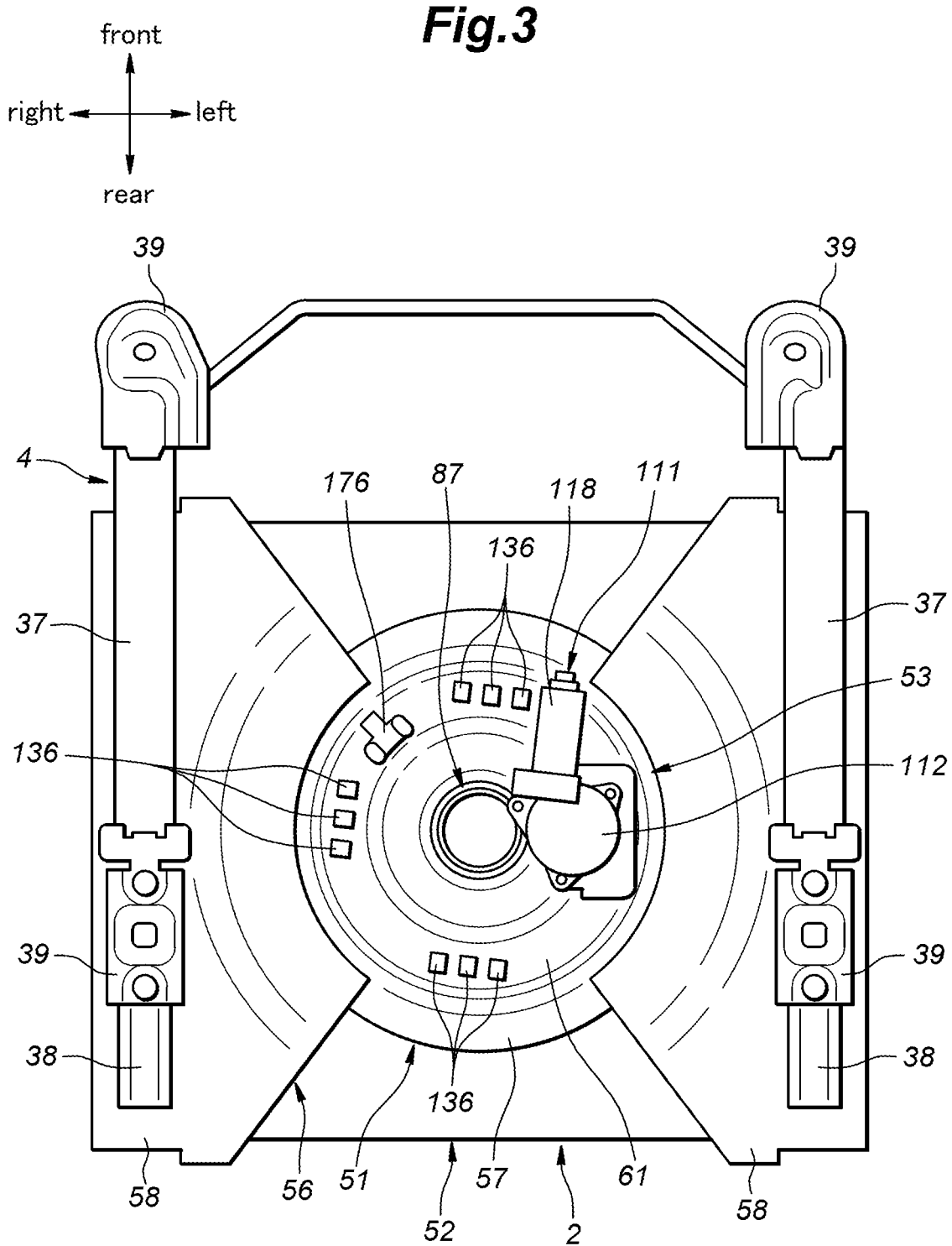
FIG. 3 is a bottom view of the rotation device.
Figure 10:
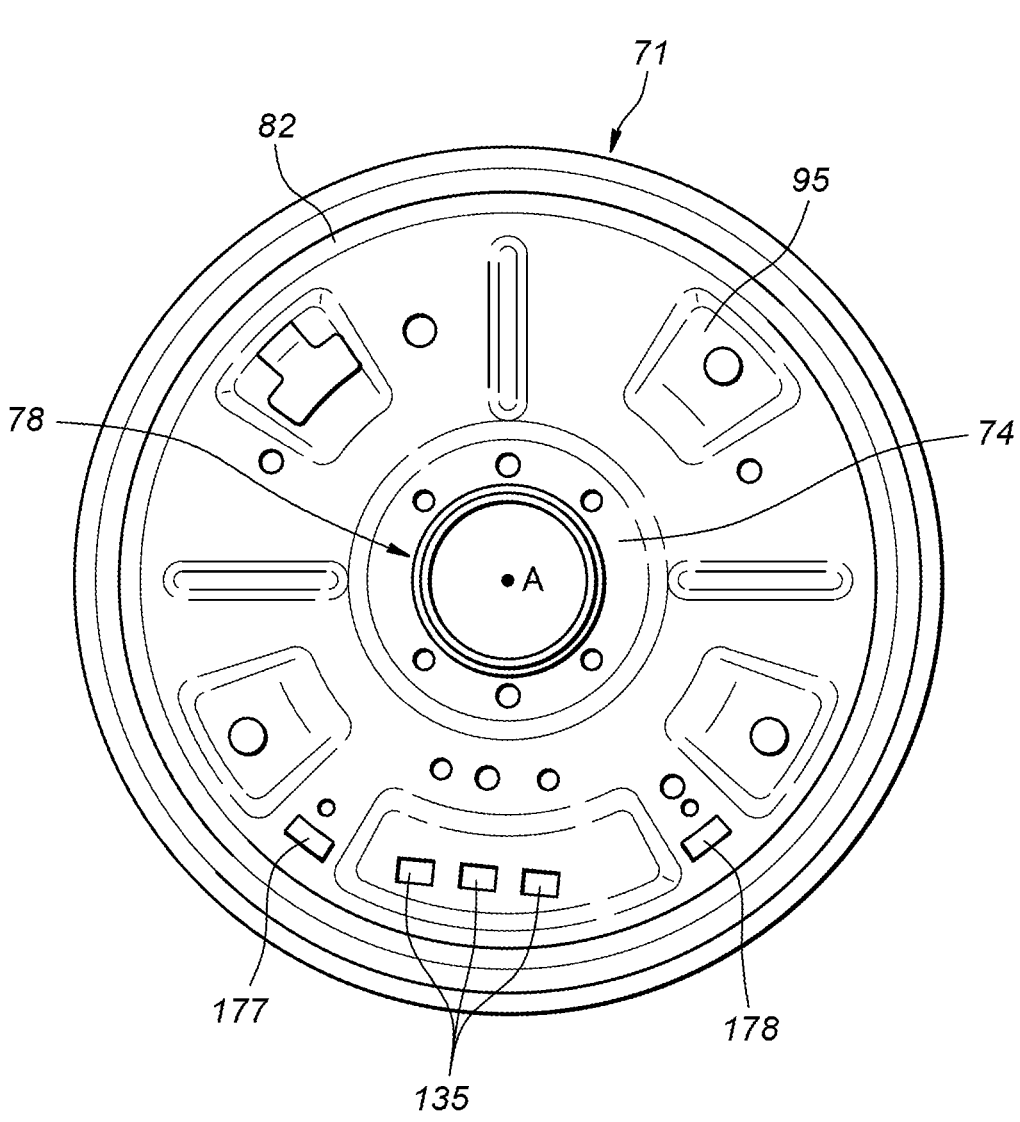
FIG. 10 is a bottom view of the rotatable plate.

As shown in FIGS. 3 and 10, a stopper mechanism 176, 177, 178 is provided between the base portion 51 and the rotatable portion 52 to restrict the rotational range of the rotatable portion 52 with respect to the base portion 51. The stopper mechanism (176, 177, 178) includes a base-side stopper 176 provided on the center plate 57, and a first rotating-side stopper 177 and a second rotating-side stopper 178 provided on the rotatable plate 71. The stoppers 176, 177, 178 are each formed by a piece of metal. The base-side stopper 176 protrudes upward from the center plate 57 through a through hole 119 formed in the center plate 57. The first rotating-side stopper 177 and the second rotating-side stopper 178 protrude downward from the rotatable plate 71, and are passed into through holes 119 formed in the rotatable plate 71, respectively. The base-side stopper 176, the first rotating-side stopper 177, and the second rotating-side stopper 178 are positioned on the same circumferential line centering on the axis A.

The rotational range of the rotatable portion 52 with respect to the base portion 51 is restricted by the contact of the base-side stopper 176 with the first rotating-side stopper

177 or the second rotating-side stopper 178. When the vehicle seat device 1 is applied to the right side seat of the vehicle, the base-side stopper 176 contacts the first rotating-side stopper 177 at the position where the rotatable portion 52 is rotated rightward by 90 degrees (+90 degrees) from the reference rotational position, and contacts the second rotating-side stopper 178 at the position where the rotatable portion 52 is rotated leftward by 90 degrees (−90 degrees) from the reference rotational position. Thus, the stoppers 176, 177, and 178 allow the rotatable portion 52 to rotate with respect to the base portion 51 from the reference rotational position where the seat cushion 11 faces forward of the vehicle to the inside rotation limit set to 180 degrees or less toward the inside of the vehicle, and the outside rotation limit set to 90 degrees or less toward the outside of the vehicle.

As shown in FIG. 14, the side cover 23 is provided with a rotation operation switch 181 for rotating the seat cushion 11. The rotation operation switch 181 outputs a signal to the control unit 183 according to the occupant's operation. The rotation operation switch 181 outputs a signal corresponding to the occupant's operation, for example, a first signal corresponding to a rightward rotation of 90 degrees, a second signal corresponding to a leftward rotation of 90 degrees, and a third signal corresponding to a leftward rotation of 180 degrees.

The control unit 183 is an electronic control unit and an arithmetic device having a microprocessor (MPU), nonvolatile memory, volatile memory, and an interface. The control unit 183 realizes various applications by having the microprocessor execute programs stored in the nonvolatile memory. The control unit 183 is connected to the electric motor 111 of the electric actuator 53, the electric motor 152 of the unlock actuator 151, the lock claw sensor 156 and the magnetic proximity sensor 174.

Upon receiving a signal from the rotation operation switch 181, the control unit 183 controls the electric motor 152 of the unlock actuator 151 so as to move the lock claw 121 from the lock position to the release position. When the lock claw 121 has moved to the release position, the lock claw sensor 156 detects that the lock claw 121 is at the release position. The control unit 183 acquires the position of the lock claw 121 based on the signal from the lock claw sensor 156. The control unit 183 drives the electric motor 111 of the electric actuator 53 to rotate the rotatable portion 52 with respect to the base portion 51 upon determining that the lock claw 121 is positioned at the release position. Thus, the electric actuator 53 is driven when the lock claw 121 is at the release position. The control unit 183 does not drive the electric motor 111 of the electric actuator 53 when the lock claw 121 is not at the release position. Owing to this control action, the electric actuator 53 is prevented from being overloaded.

Next, a method for manufacturing the vehicle seat device 1 will be described in the following. First, the support tube 87 is inserted into the second bearing hole 75 of the rotatable plate 71. In this state, the first annular rib 88 and the second annular rib 89 are formed in the support tube 87 by bulge forming. The rotatable plate 71 and the support tube 87 are coupled to each other by the first annular rib 88 and the second annular rib 89.

Next, the second gear 116, the bolts 96, the first rotating-side stopper 177 and the second rotating-side stopper 178 are assembled to the rotatable plate 71. The base-side stopper 176 and the bush 91 are assembled to the center plate 57. The slidable member 85 is assembled to the fixing member 66. The base-side peeling preventing portions 161, the base-side sliding contact portions 166, and the detection pieces 173 are assembled to the left and right side plates 58. The rotating-side peeling preventing portions 163, the rotating-side sliding contact portions 168, and the magnetic proximity sensor 174 are assembled to the fixing bracket 72.

Next, the bearing 78, the rotatable plate 71, and the fixing member 66 are placed on the center plate 57 in this order, and the center plate 57 is connected to the fixing member 66. At this time, the connecting pieces 69 of the fixing member 66 are bent under the center plate 57, and the center plate 57, the bearing 78 and the rotatable plate 71 are interposed between the inner flange 68 and the connecting pieces 69. In this manner, the center plate 57, bearings 78, rotatable plate 71, and fixing member 66 are integrally combined. At this time, the lower end of the support tube 87 passes through the first bearing hole 62 of the center plate 57 and protrudes below the center plate 57. The retaining ring 92 is attached to the lower end of the support tube 87, and the lower end of the support tube 87 is then crimped to form the enlarged diameter portion 93.

Next, the left and right side plates 58 are attached to the center plate 57. Also, the electric motor 111 of the electric actuator 53 is attached to the center plate 57, and the first gear 115 and the second gear 116 are meshed. The slide device 4 is then attached to the left and right side plates 58.

Next, the fixing bracket 72 is attached to the rotatable plate 71. Also, the rotation lock device 54 including the unlock actuator 151 and the lock claw sensor 156 are attached to the rotatable plate 71. A wire harness extending from the rotation lock device 54 and the lock claw sensor 156 is preferably drawn out below the rotatable plate 71 and the center plate 57 through the interior of the support tube 87.

Next, the seat main body 3 is attached to the fixing bracket 72. At this time, the end of the control cable 141 is engaged by the casing locking portion 127 and the cable locking portion 132. The vehicle seat device 1 is assembled in this manner.

Effects of the vehicle seat device 1 of the present embodiment described above will be discussed in the following. In this vehicle seat device 1, the electric actuator 53 allows the rotatable portion 52 to rotate with respect to the base portion 51 when the rotation lock device 54 is released and electric power is not supplied to the electric actuator 53. Therefore, when the rotation lock device 54 is released and electric power is not supplied to the electric actuator 53, the occupant can manually rotate the rotatable portion 52 with respect to the base portion 51. As a result, the occupant can manually adjust the rotational position of the seat cushion 11. The occupant can move the lock claw 121 to the release position by operating the manual operation lever 142. Since the electric actuator 53 does not have a self-locking mechanism, it can be rotated by receiving an external force. Therefore, the occupant can rotate the seat main body 3 by pushing or pulling the seat main body 3. In this embodiment, the electric actuator 53 does not have a worm speed reduction device, so that the electric actuator 53 allows the rotatable portion 52 to be rotated with respect to the base portion 51 by a load applied to the rotatable portion 52.

A second embodiment of the present invention will be described in the following with reference to the appended drawings. In the following description, "front and rear", "left and right" and "up and down" refer to the directions as seen from the passenger who is seated in the seat main body S and facing forward.

Figure 18:
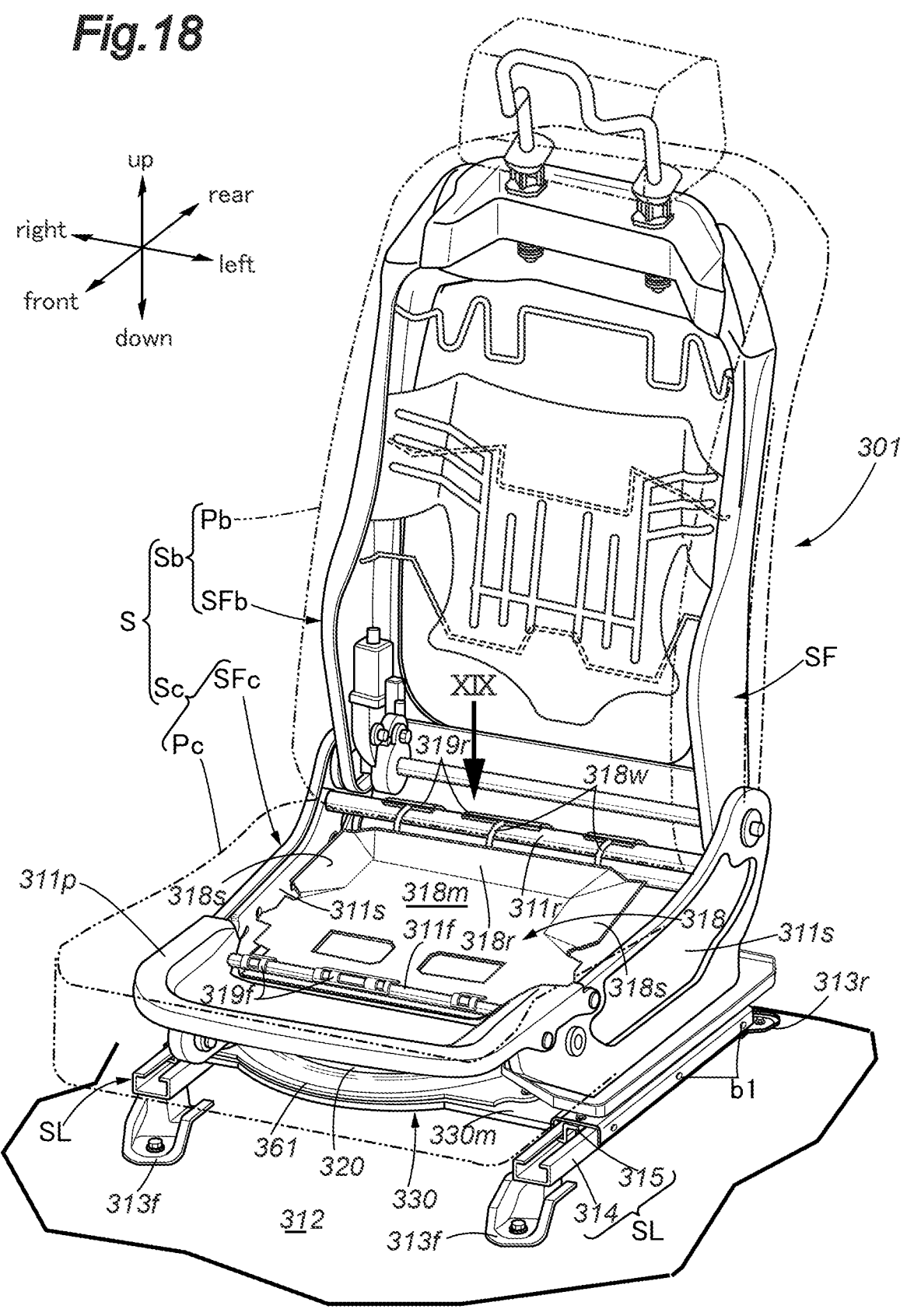
FIG. 18 is an overall perspective view of a vehicle seat device according to an embodiment of the present invention.
Figure 19:
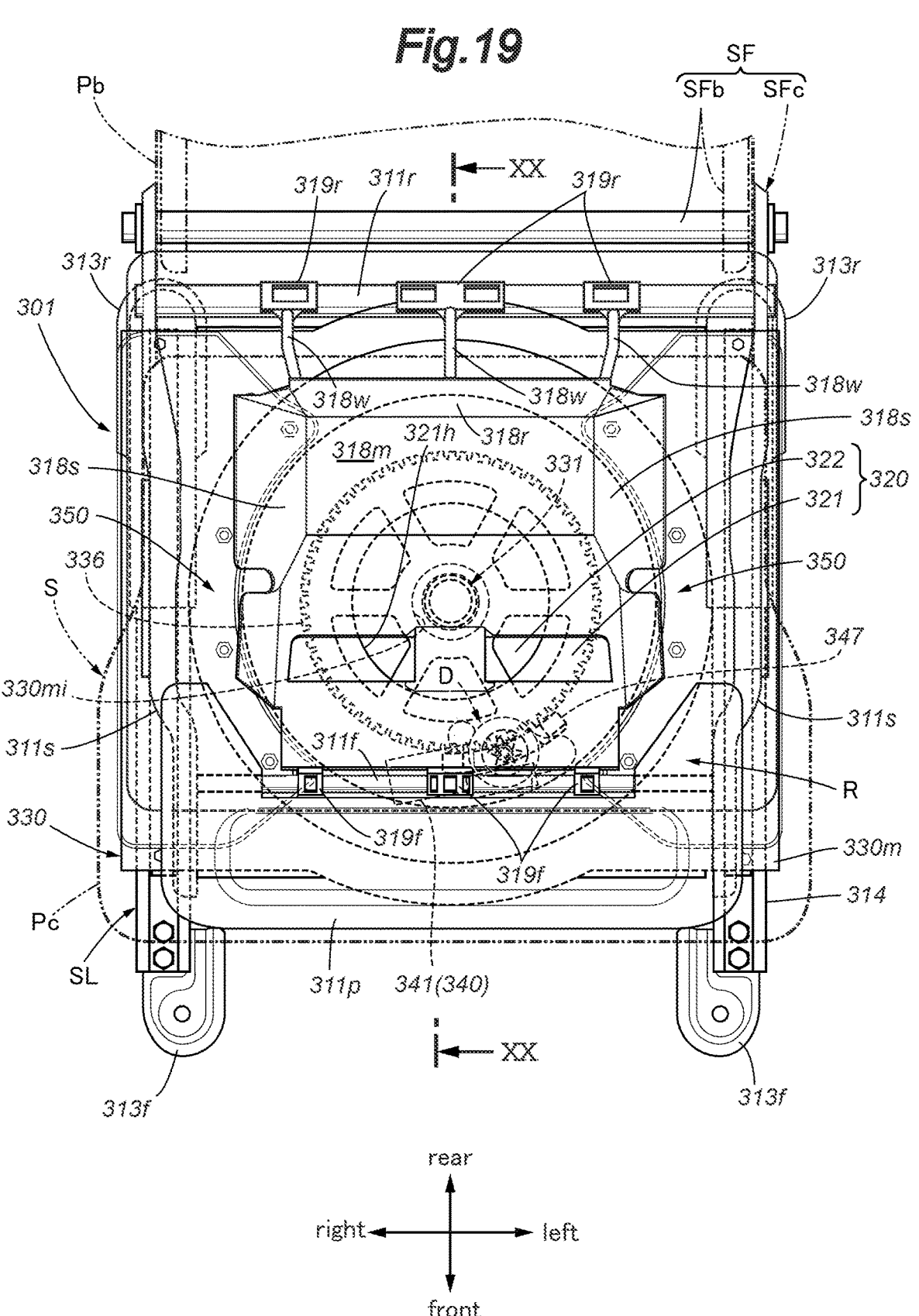
FIG. 19 is a top view showing an essential part of a seat cushion of a seat device, in particular the components thereof located under a pressure receiving part (as view from the direction indicated by XIX in FIG. 18)
Figure 20:
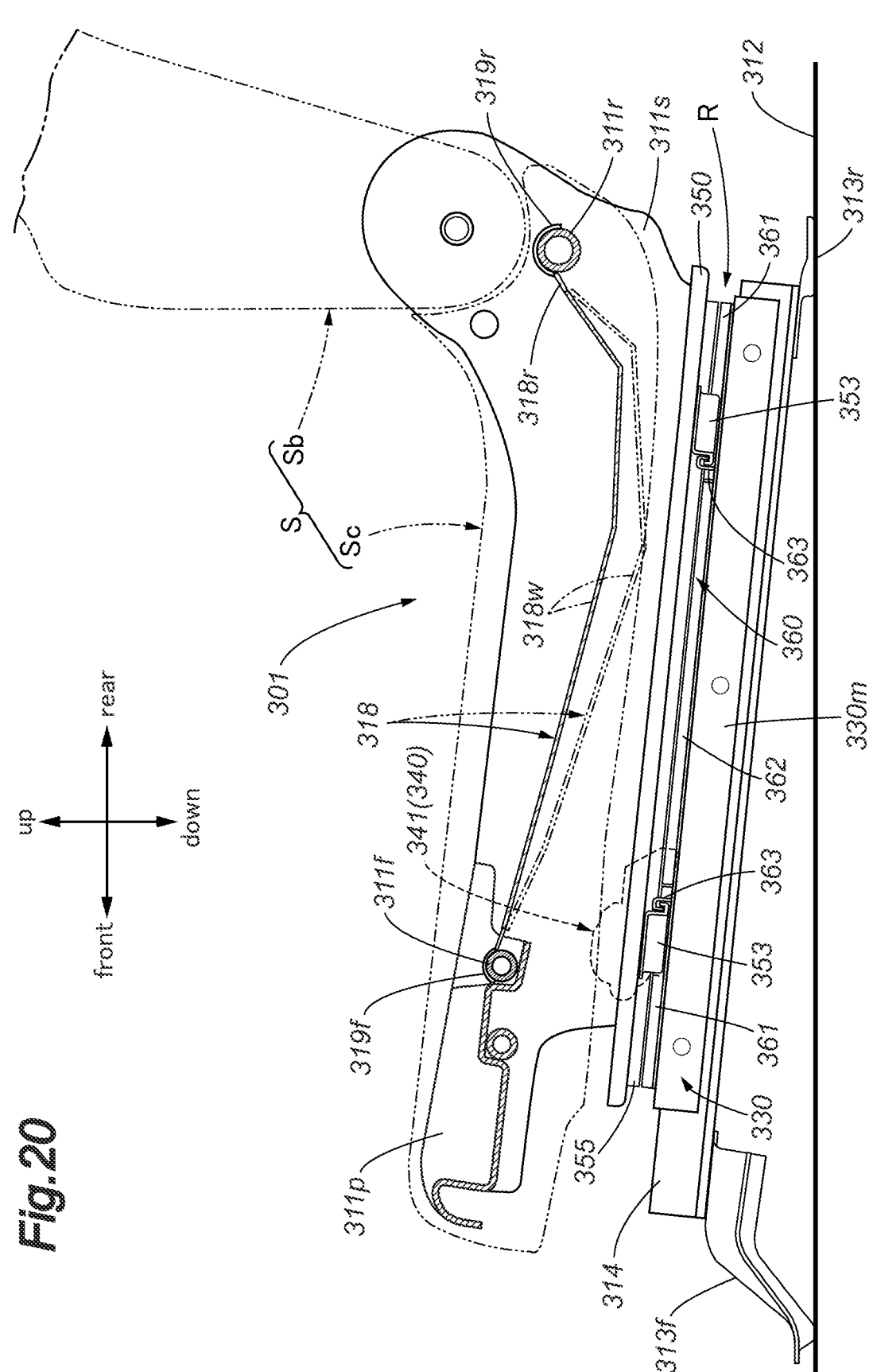
FIG. 20 is a side view of the seat device (with the interior of the seat cushion pad being in section taken along line XX-XX of FIG. 19)
Figure 21:
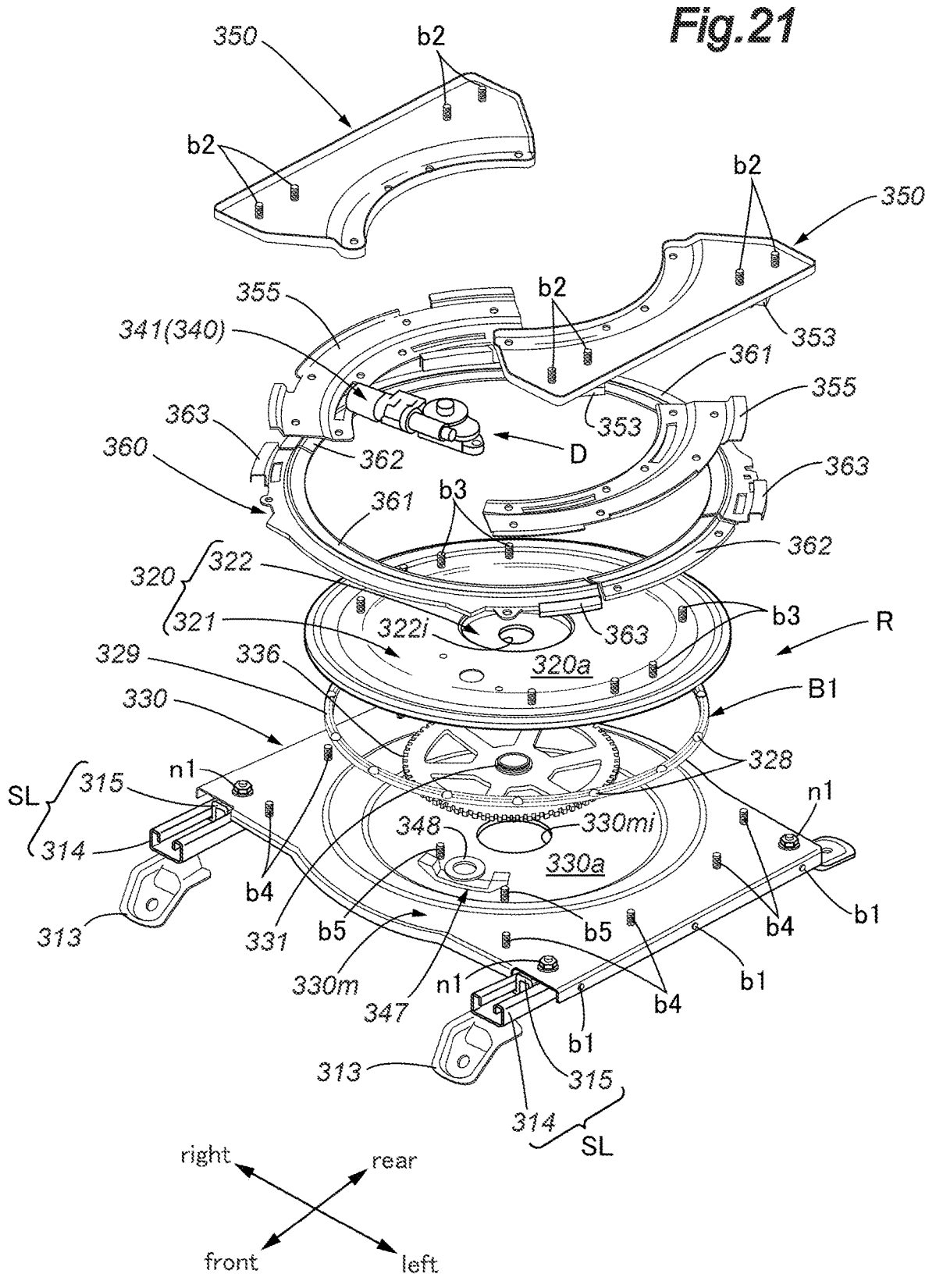
FIG. 21 is an exploded perspective view of various components interposed between a base and a rotatable disk.
Figure 22:
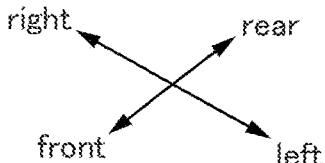
FIG. 22 is a perspective view of the various components in an assembled state.
Figure 23:
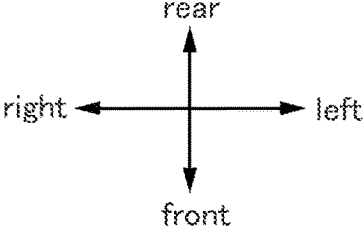
FIG. 23 is a top view of the assembly (as viewed in the direction indicated by XXIII in FIG. 22)

First, as shown in FIGS. 18 to 20, a seat device 301 mounted on a vehicle such as an automobile is provided with a seat main body S that includes a seat cushion Sc on which an occupant sits, and a seat back Sb that extends upward from a rear part of the seat cushion Sc to support the back and hip of the occupant.

The seat frame SF, which forms the skeletal structure of the seat main body S, includes a seat cushion frame SFc which forms the skeletal structure of the seat cushion Sc, and a seat back frame SFb which forms the skeletal structure of the seat back Sb. The seat cushion frame SFc is covered with a seat cushion pad Pc, and the seat back frame SFb is covered with a seat back pad Pb. The seat back frame SFb is pivotably supported at the rear end of the seat cushion frame SFc via an electric or manual reclining mechanism (which is per se known) so as to allow the reclining angle of the seat back frame SFb to be adjusted.

The seat cushion frame SFc includes a pair of side frames 311*s* that are laterally spaced apart from each other and extend in the fore and aft direction, a front cross member 311*f* that connects the front parts of the side frames to each other, a rear cross member 311*r* that connects the rear parts of the side frames 311*s* to each other, and a pan frame 311*p* that is connected to and extends across the front parts of the side frames 311*s* and has a substantially U-shape in top view. In the illustrated embodiment, the two ends of the front cross member 311*f* pass through and are fixed to the left and right inner sides of the pan frame 311*p*, respectively, and are directly connected to the front parts of the left and right side frames 311*s*. Alternatively, the front cross member 311*f* may be connected to the side frame 311*s* via the pan frame 311*p*.

A pressure receiving member 318 extends between the front cross member 311*f* and rear cross member 311*r* to receive the downward load from the occupant seated on the seat cushion Sc via the seat cushion pad Pc, and the front and rear ends of the pressure receiving member 318 are supported by the front cross member 311*f* and rear cross member 311*r*, respectively. In this embodiment, the pressure receiving member 318 is made of an elastically deformable sheet and includes a pressure receiving member main body 318*m* having a rectangular shape in top view, a pair of side slanted portions 318*s* extending laterally from the pressure receiving member main body 318*m* with an upward slant, and a rear inclined portion 318*r* extending rearward from the pressure receiving member main body 318*m* with an upward slant. The pressure receiving member 318 may be made of a synthetic resin sheet or sheet metal. At least one through hole is provided in the pressure receiving member main body 318*m* as required.

A plurality of metal wires 318*w* extending in the fore and aft direction are bonded or insert-molded to the bottom of the pressure receiving member 318 to reinforce the pressure receiving member 318. The rear ends of the wires 318*w* protruding from the rear edge of the pressure receiving member 318 are coupled to corresponding rear locking claws 319*r* which are hooked onto the rear cross member 311*r*. The front edge of the pressure receiving member 318 and the front ends of the metal wires 318*w* are connected to a plurality of rear locking claws 319*f* that are hooked onto the front cross member 311*f*.

The pressure receiving member 318 that receives the downward load from the occupant via the seat cushion pad Pc may also consist of a plurality of metal wires extending in the fore and aft direction in a zig zag pattern in a laterally spaced apart relationship, instead of the rectangular spring sheet of the illustrated embodiment.

Since the configuration of the seat back Sb is not essential to the gist of the present invention, only an example thereof is shown in FIG. 18, and the description thereof is omitted in the following disclosure.

The vehicle seat device 301 includes a fore and aft slide mechanism SL that supports the seat main body S on the floor portion 312 of the vehicle body so as to be movable in the fore and aft direction, and a seat rotation mechanism R which is located on top of the fore and aft slide mechanism SL to support the seat main body S so as to be rotatable around the vertical axis. The mechanisms SL and R are mostly or wholly made of metal. Next, an example of the fore and aft slide mechanism SL and the seat rotation mechanism R will be described in the following with reference to FIGS. 21 to 28 as well.

The fore and aft slide mechanism SL includes a pair of fixed rails 314 that are fixed to the floor portion 312 laterally next to each other via a front and rear mounting bracket 313f, 313r and extend in the fore and aft direction, and a pair of movable rails 315 engaged and supported by the respective fixed rails 314 so as to be slidable in the fore and aft direction. The fixed rails 314 of the illustrated embodiment are fixed on the floor portion 312 with a front end up slant, but may also be fixed in a horizontal orientation.

The upper sides of the left and right movable rails 315 are fixed to the lateral side portions of the lower surfaces of a base 330 by bolts b1 and nuts n1 via rail fixing brackets 316, respectively. The base 330 has a rectangular shape in top view, and extends across the movable rails 315, and serves as a support member for the seat main body S. Thus, the base 330 and hence the seat main body S can be moved in the fore and aft direction by sliding the movable rails 315 relative to the fixed rails 314.

Figure 25:
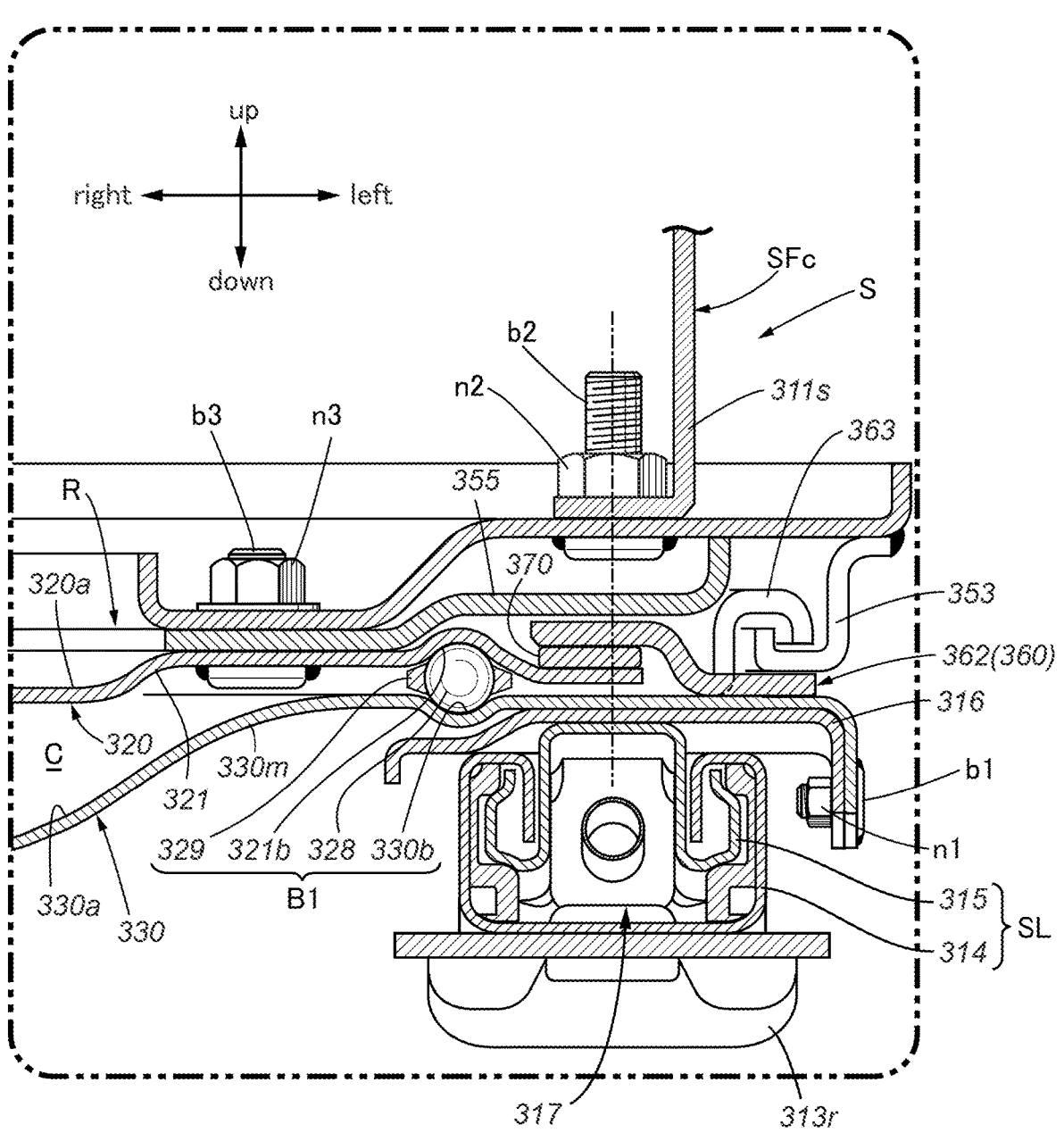
FIG. 25 is a magnified sectional view as viewed from the direction indicated by XXV in FIG. 24.

A per se known fore and aft position adjusting mechanism 317 (only a part of which is shown in FIG. 25) is provided between the movable rails 315 and the fixed rail 314s to allow the fore and aft position of the movable rails 315 (hence the base 330 and the seat main body S) to be adjusted by manually operating an operation lever (not shown in the drawings) which is operatively connected to the fore and aft position adjusting mechanism 317 and extends forward from under the seat cushion Sc. It should be noted that the fore and aft slide mechanism SL and the fore and aft position adjusting mechanism 317 may be omitted. In such a case, the base 330 is fixed on the floor portion 312 of the vehicle body so that the fore and aft position thereof cannot be adjusted.

Next, the seat rotation mechanism R will be described in the following. The seat rotation mechanism R includes, in addition to the base 330 mentioned above, a rotatable disk 320 that is connected to the seat cushion Sc of the seat main body S so as to support the seat cushion Sc and integrally rotate with the seat cushion Sc and is positioned on the base 330, a first and a second bearing B1, B2 for freely rotatably supporting the rotatable disk 320 on the base 330 around the vertical axis, and a drive device D for rotating the rotatable disk 320 with respect to the base 330.

The first bearing B1 rotatably supports an outer peripheral part of the rotatable disk 320 on an outer peripheral part of the base 330, and the second bearing B2 which is retained by a bearing tubular portion 331 projecting upright from the center of the base 330 rotatably supports an inner peripheral part of the rotatable disk 320.

The rotatable disk 320 is formed with a circular first annular recess 320a which is formed concentrically therewith and recessed downward relative to the outer peripheral edge part thereof. In this disclosure, the term "outer peripheral edge part" covers not only the outer peripheral edge part, but also a radially outer region extending radially inward by a certain distance from the outer peripheral edge part (For example, the parts fixed by the bolts b3, which will be described later, belong to the outer peripheral edge part).

Meanwhile, the base 330 is formed with a circular second annular recess 330a which is recessed downward relative to the outer peripheral end part of the base 330 so as to correspond to the first annular recess 320a. The second annular recess 330a is concentric to the first annular recess 320a, and has the same diameter as the first annular recess 320a. The second annular recess 330a is located between the left and right fore and aft slide mechanisms SL so as to partly overlap with the fore and aft slide mechanisms SL in side view.

The rotatable disk 320 includes a disk-shaped rotatable disk main body 321 having a large circular hole 321h in the central part thereof, and a circular bearing ring plate portion 322 having an outer peripheral edge part 3220 which is fixedly fitted (for example, welded) into the circular hole 321h of the rotatable disk main body 321. The first bearing B1 (ball bearing) is formed by an upper bearing surface 321b formed on the lower surface of the outer peripheral part of the rotatable disk main body 321 in the shape of an annular groove, a lower bearing surface 330b formed on the upper surface of the outer peripheral part of the base 330 in the shape of an annular groove so as to oppose the upper bearing surface 321b, a plurality of balls 328 interposed between the upper and lower bearing surfaces 321b, 330b for a rolling movement, and an annular retainer 329 interposed between the upper and lower bearing surfaces 321b, 330b without contacting them to ratably retain the balls 328 in a mutually spaced manner along the circumferential direction.

Figure 26:
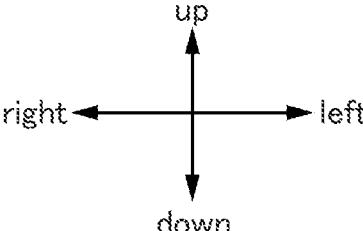
FIG. 26 is a magnified sectional view as viewed from the direction indicated by XXVI in FIG. 24.
Figure 26:
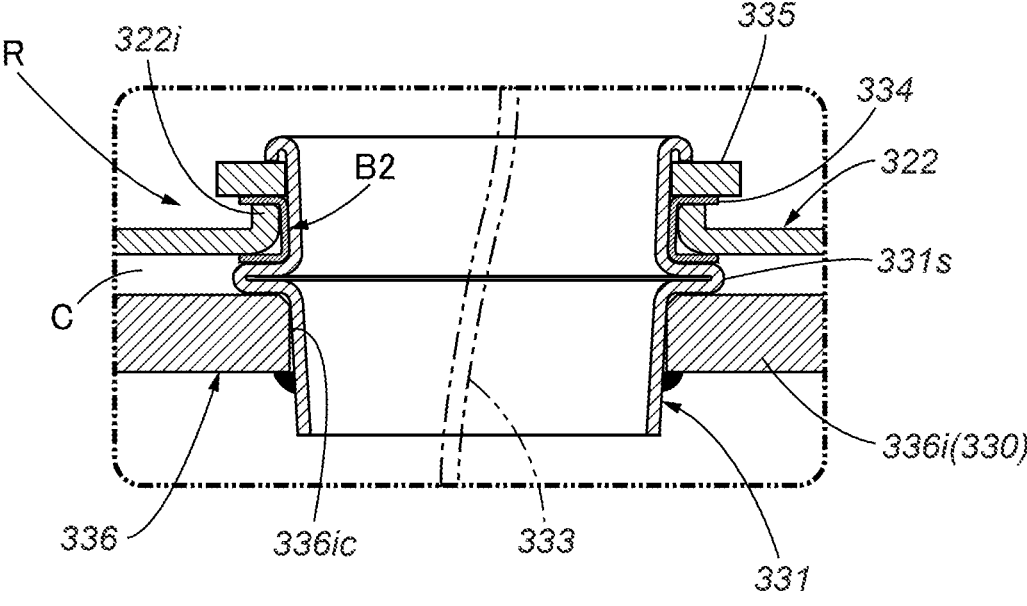
Figure 27:
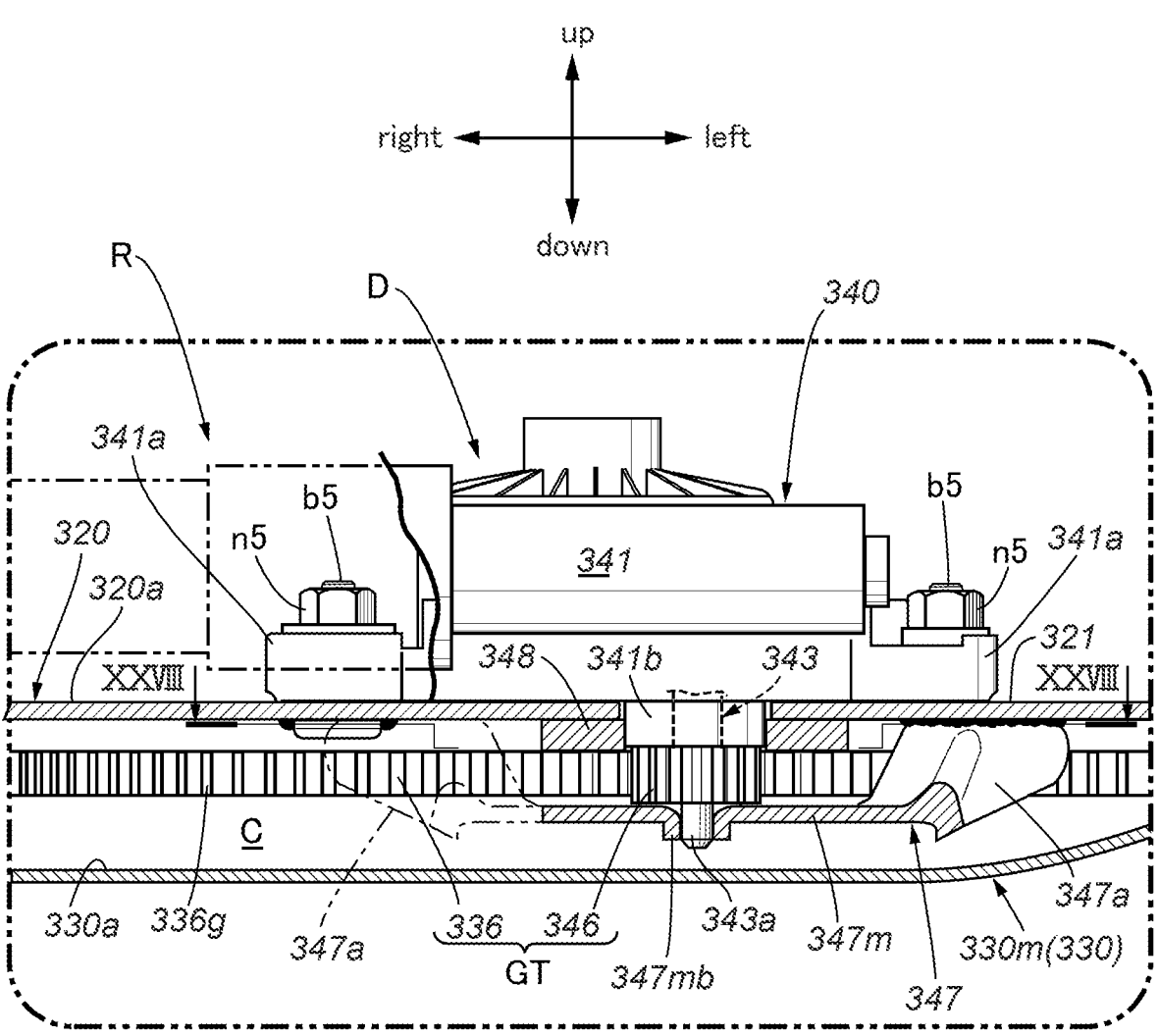
FIG. 27 is a magnified sectional view taken along line XXVII-XXVII of FIG. 23.
Figure 28:
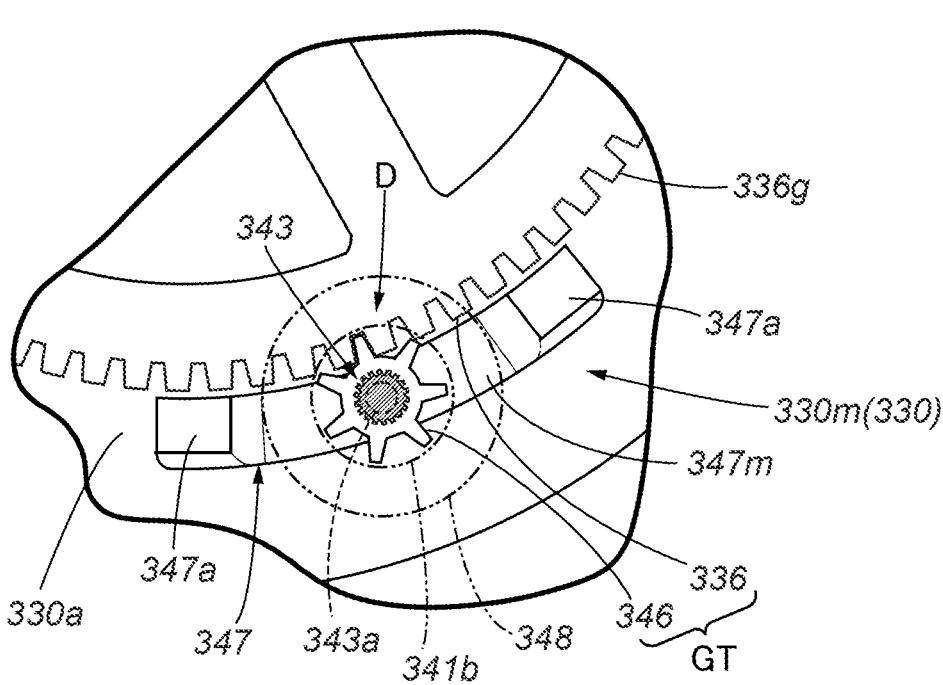
FIG. 28 is a magnified sectional view taken along line XXVIII-XXVIII of FIG. 27.
Figure 28:
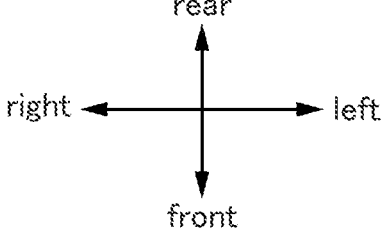

As can be seen from FIG. 26, the outer circumference of the lower half of the bearing tubular portion 331 is fitted and fixed (for example, by welding) in the center hole of the base 330 (more specifically, the center hole of a fixed gear 336, which will be described later). An annular intermediate stepped portion 331s projecting from the outer circumference of an intermediate portion of the bearing tubular portion 331 is engaged with the upper surface of the central portion of the base 330. In particular, the bearing tubular portion 331 of the illustrated embodiment is formed in a hollow cylindrical shape with open upper and lower ends. Electric wires 333 (for example, a wire harness) for supplying electric power to electrical equipment are passed through the hollow interior of the bearing tubular portion 331. Therefore, even when the seat main body S is rotated, the electric wires 333 can extend through bearing tubular portion 331 without being excessively extended or twisted, so that the durability of the electric wires can be improved.

In addition, the inner peripheral edge part 322i of the bearing ring plate portion 322 is formed with an upright flange over the entire periphery thereof, and is rotatably fitted onto the outer periphery of the upper half part of the bearing tubular portion 331 via the second bearing B2. The second bearing B2 is formed by a bearing bush 334 having a U-shaped cross section and covering the inner peripheral surface and upper and lower surfaces of the inner peripheral edge part 322i of the bearing ring plate portion 322. The bearing bush 334 and the inner peripheral edge part 322i of the bearing ring plate portion 322 are interposed between a retaining ring 335 covering them from above and the intermediate stepped portion 331s of the bearing tubular portion 331, and the retaining ring 335 is fixed to the upper end of the bearing tubular portion 331 by crimping.

Since the rotatable disk 320 is divided into the rotatable disk main body 321 and the bearing ring plate portion 322, the bottom surface of the first annular recess 320*a* is formed as an annular stepped recessed surface so that the bearing ring plate portion 322 is lower than the rotatable disk main body 321 by one step. Optionally, the bearing ring plate portion 322 may be formed integrally with the rotatable disk main body 321.

In the illustrated embodiment, the second bearing B2 is interposed between the inner peripheral edge part 322*i* of the bearing ring plate portion 322 and the bearing tubular portion 331. In an alternate embodiment, the inner periph- eral edge part 322*i* is fixedly fitted onto the outer periphery of the bearing tubular portion 331 (by welding of the like), and a second bearing B2 (for example, a component similar to the bearing bush 334) is interposed between the outer peripheral edge part 3220 of the bearing ring plate portion 322 and the inner periphery of the circular hole 321*h* of the rotatable disk main body 321 so that the outer peripheral edge part 3220 of the bearing ring plate portion 322 fixed to the bearing tubular portion 331 is rotatably fitted into the circular hole 321*h* of the rotatable disk main body 321.

A pair of fixing brackets 350 are fixedly attached to the respective side parts of the upper surface of the rotatable disk 320, as viewed when the seat main body S is facing forward with respect to the base 330 (see FIGS. 18 to 23), via reinforcing plates 355. The outer peripheral edge part of each fixing bracket 350 is integrally formed with an upright flange for reinforcement.

With the seat main body S facing forward, the outer edge of each fixing bracket 350 extends linearly along the later- ally outer edge of the base 330, and the inner edge thereof extends along the periphery of the first annular recess 320*a* of the rotatable disk 320 along an arcuate line. The lower sides of the left and right side frames 311*s* of the seat cushion frame SFc are fastened to the left and right fixing brackets 350, respectively, with a plurality of sets of bolts b2 and nuts n2.

Meanwhile, the outer peripheral edge part of each rein- forcing plate 355 extends along an arcuate line so as to correspond to the outer peripheral edge part of the rotatable disk 320, and the inner edge of the reinforcing plate 355 extends along an arcuate line so as to correspond to the peripheral edge part of the first annular recess 320*a* of the rotatable disk 320. These reinforcing plates 355 support the corresponding fixing brackets 350 from below to increase the rigidity thereof, and are fixed to the outer periphery of the rotatable disk 320 together with the fixing brackets 350 by a plurality of sets of bolts b3 and nuts n3. Further, an actuator 340 of the drive device D, which will be described later, is positioned between the left and right fixing brackets 350 in the circumferential direction of the rotatable disk 320.

The reinforcing plate 355 consisted of a separate compo- nent from the fixing bracket 350 in the illustrated embodi- ment, but the reinforcing plate 355 may also be omitted as a structure for imparting sufficient rigidity to the fixing bracket 350.

As can be seen from FIG. 25, the upper surface of the outer peripheral edge part of the rotatable disk 320 (particu- larly, the part thereof that is radially outward of the first bearing B1) is retained to the lower surface of the upper fixing member 360 which extends under the left and right fixing brackets 350 and reinforcing plates 355 and is formed in an annular shape so as to surround the rotatable disk 320, via an annular slider 370. As a result, the upper fixing member 360 prevents the rotatable disk 320 from being lifted from the base 330.

In the illustrated embodiment, the upper fixing member 360 is divided into a plurality of fixing member elements 361 and 362 arranged along the circumference of the rotat- able disk 320. Among them, the two comparatively long fixing member elements or the first fixing member elements 361 are positioned so as to oppose each other in the fore and aft direction with the seat main body S facing forward, and the two comparatively short fixing member elements or the second fixing member elements 362 are positioned so as to oppose each other in the lateral direction with the seat main body S facing forward. Thus, the first and second fixing member elements 361 and 362 are alternately arranged in the circumferential direction, and the outer peripheral edge parts of the fixing member element 361 and 362 are secured to the left and right sides of the base 330 by a plurality of sets of bolts b4 and nuts n4.

A plurality of rotating-side peeling preventing portions 353 extending along the outer periphery of the rotatable disk 320 are fixed (for example, by welding) to the lower surfaces of the front and rear portions of the left and right fixing brackets 350. Meanwhile, a plurality of fixed-side peeling preventing portions 363 extending along the outer periphery of the rotatable disk 320 are fixed (for example, by welding, integral molding, etc.) to the upper fixing member 360 (in the illustrated embodiment, the left and right side edges of the front and rear first fixing member elements 361) so as to correspond to the rotating-side peeling preventing portions 353.

The rotating-side peeling preventing portions 353 are each formed in a hook-like shape with the tip end thereof facing upward, and the fixed-side peeling preventing por- tions 363 are each formed with a hook-like shape with the tip end thereof facing downward and positioned so as to engage with the corresponding rotating-side peeling pre- venting portion 353 with the seat main body S facing forward. Therefore, when an excessive load is applied to the seat main body S, the rotating-side peeling preventing portions 353 and the fixed-side peeling preventing portions 363 are engaged with each other, so that peeling of the seat main body S from the base 330 can be prevented.

The drive device D includes an actuator 340 having an output shaft 343 extending downward beyond the rotatable disk 320 and fixed on the rotatable disk 320 (more specifi- cally, the rotatable disk main body 321), and a gear trans- mission mechanism GT that converts the rotation of the output shaft 343 into the rotational motion of the rotatable disk 320 with respect to the base 330.

Figure 24:
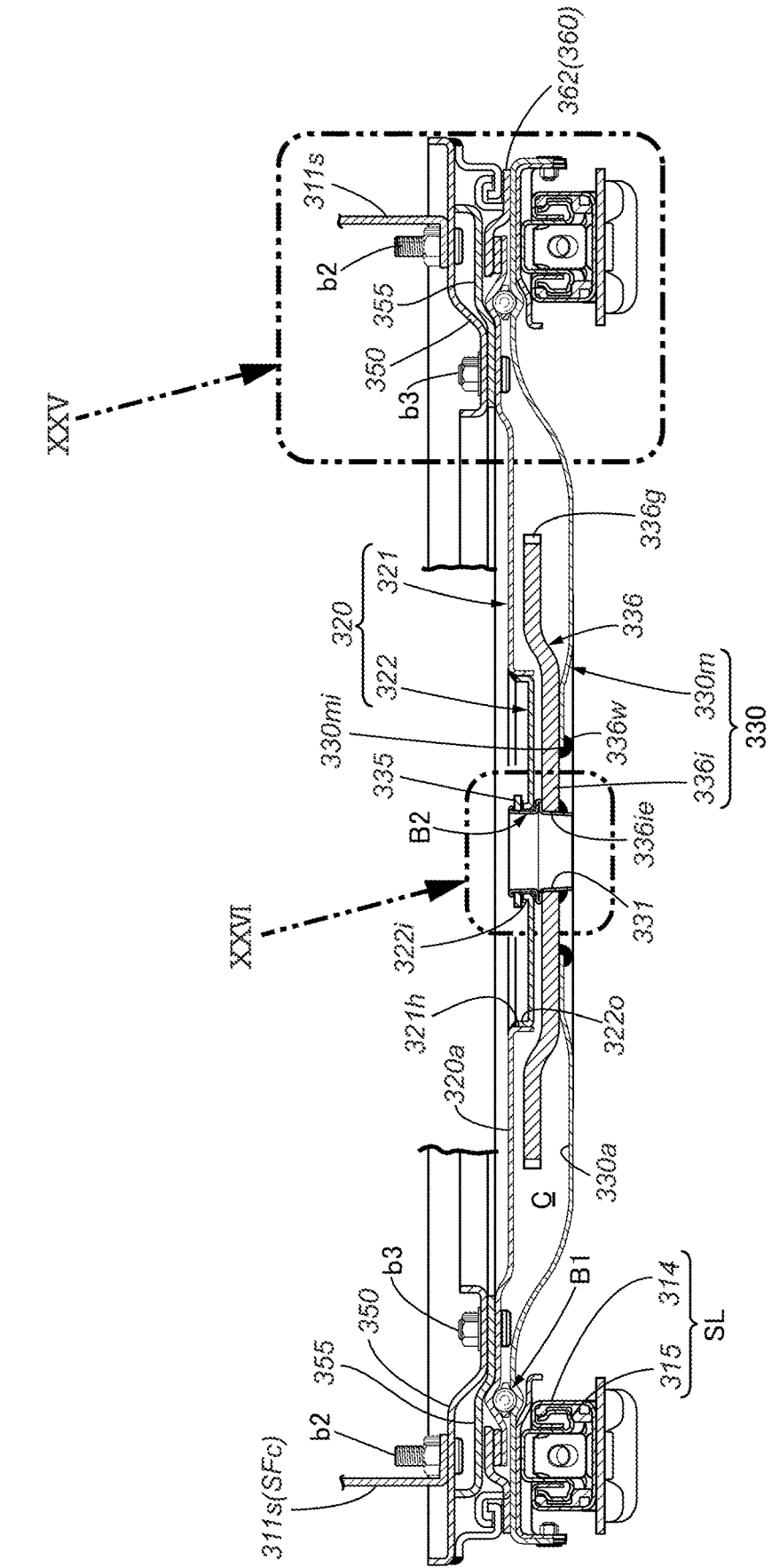
FIG. 24 is a magnified sectional view taken along line XXIV-XXIV of FIG. 23.

As can be seen from FIG. 24, between the rotatable disk 320 (in particular, the lower surface of the first annular recess 320*a*) and the base 330 (in particular the second annular recess 330*a*) is defined as a vertically flat circular space C in top view which receives the gear transmission mechanism GT therein. The radially outer side of the space C is covered by the above-mentioned first bearing B1 to prevent the gear meshing noise from being emitted radially outward from the space C. The inner side is closed by the bearing tubular portion 331 which was mentioned earlier.

The actuator 340 primarily consists of an electric motor (not shown in the drawings) that serves as a power source and an actuator case 341 that houses the motor. The actuator case 341 also internally receives therein a gear mechanism (not shown in the drawings) for rotating the output shaft 343 of the actuator 340 in response to the rotation of the motor shaft. This gear mechanism may consist of a per se known gear mechanism that has a self-locking mechanism or that locks the rotation of the output shaft 343 when the motor is not operating.

The actuator case 341 is integrally fitted with a plurality of (two in this embodiment) mounting arm portions 341*a* that are spaced apart from each other. The mounting arm portions 341a are fixed to the rotatable disk main body 321 (in particular the bottom surface of the first annular recess 320a) by bolts b5 and nuts n5.

As shown in FIGS. 23, 24, 27, and 28, the gear transmission mechanism GT includes a fixed gear 336 fixed to the base 330 concentric to the rotatable disk 320 and provided with outer teeth 336g on the outer periphery thereof, and a drive gear 346 concentrically fixed to the output shaft 343 under the rotatable disk 320 and meshing with the fixed gear 336 in the space C.

An intermediate portion of the output shaft 343 of the actuator 340 is rotatably fitted into a bearing boss 341b projecting from the lower surface of the actuator case 341 into the space C via a through hole of the rotatable disk main body 321. The lower end portion 343a of the output shaft 343 extends downward beyond the drive gear 346 to be rotatably supported by a bearing member 347 attached to the lower surface of the rotatable disk 320. The bearing member 347 is located in the space C and extends in the circumferential direction of the fixed gear 336.

The bearing member 347 of this embodiment includes a bearing member main body 347m which extends along an arcuate line along the outer teeth 336g of the fixed gear 336 at a same elevation as the lower end portion 343a of the output shaft 343 and a pair of mounting arms 347a having a large thickness and integrally connected to the two ends of the bearing member main body 347m, respectively. The two mounting arms 347a are fixed (for example, by welding, using bolts, etc.) to the lower surface of the rotatable disk 320 (in particular, the rotatable disk main body 321). An intermediate portion of the bearing member main body 347m is integrally formed with a bearing tubular portion 347mb that rotatably receives and supports the lower end portion 343a of the output shaft 343 immediately under the drive gear 346.

Thus, during the operation of the gear transmission mechanism GT, the bearing member 347 can firmly support the meshing reaction force that is applied to the drive gear 346 as it meshes with the fixed gear 336, so that the two gears 336 and 346 are allowed to mesh smoothly and quietly. Moreover, since the bearing member 347 of this embodiment extends along the circumferential direction of the fixed gear 336 within the second annular recess 330a of the base 330, and the two circumferential ends thereof are fixed to the rotatable disk 320, the bearing member 347 (and hence the output shaft 343 of the actuator 340) can be stably and firmly fixed to the lower surface of the rotatable disk 320 while ensuring a long support span for the fixed gear 336 in the circumferential direction.

A circular ring-shaped vibration damping member 348 is fitted on the bearing boss 341b of the actuator case 341. This vibration damping member 348 is interposed between the fixed gear 336 and rotatable disk 320, and made of a vibration damping material (such as non-woven fabric, rubber material, etc.) exhibiting a vibration damping property. By thus damping the vibration of the actuator 340 with the vibration damping member 348, the vibration is prevented from being transmitted from the actuator 340 to the base 330 and the rotatable disk 320 during the operation of the actuator 340.

In this embodiment, the intermediate portion of the output shaft 343 is rotatably received and supported by the bearing boss 341b projecting from the lower surface of the actuator case 341, but the bearing boss 341b may be omitted. In this case, the damping member 348 will be directly fitted to the outer periphery of the intermediate portion of the output shaft 343.

The base 330 is composed of a plate-like base main body 330m having a rectangular shape in top view and having the second annular recess 330a in the center and a part of the fixed gear 336 (or the inner peripheral portion of the fixed gear 336). More specifically, the inner peripheral edge part 330mi of the base main body 330m (or the opening edge of the central hole of the second annular recess 330a) is connected (for example, by welding) to a part of the lower surface of the fixed gear 336 near the inner peripheral edge part thereof, and the base 330 is formed by a base main body 330m and a radially inner part 336i of the fixed gear 336 which is radially inward of the connected portion (or the welded portion 336w) connecting the base main body 330m thereto. Thus, a part of the base 330 can be shared by a part of the fixed gear 336 (or the radially inner part 336i mentioned above) so that the structure can be simplified.

The fixed gear 336 is formed to be thicker than the plate thickness of the base main body 330m as a whole, and the relatively thick inner peripheral edge part 336ie of the fixed gear 336 is fitted and fixed (for example, welded) to the outer periphery of the lower half of the bearing tubular portion 331. Therefore, when fitting the inner peripheral edge part of the base 330 into the bearing tubular portion 331, the relatively thick inner peripheral edge part 336ie of the fixed gear 336 can be connected to the bearing tubular portion 331 so that the connecting strength can be increased.

In this embodiment, by forming the inner peripheral edge part 330mi of the base main body 330m to have a larger diameter than the bearing tubular portion 331 and connecting the inner peripheral edge part 330mi to the part of the lower surface of the fixed gear 336 near the inner peripheral edge part thereof, the inner peripheral edge part 330mi is connected to the bearing tubular portion 331 via the radially inner part 336i of the fixed gear 336. Alternatively, the inner peripheral edge part 330mi of the base main body 330m may be directly connected (for instance, by welding) to the bearing tubular portion 331.

As can be seen from FIGS. 19 and 20, the actuator 340 of the drive device D at least partly overlaps with the pressure receiving member 318 in top view, but is positioned so as not to interfere with the pressure receiving member 318 even when the pressure receiving member 318 is deflected downward under the downward pressure applied by the occupant via the seat cushion pad Pc. The actuator 340 of this embodiment only partly overlaps with the pressure receiving member 318 in top view, but may also entirely overlap with the pressure receiving member 318.

In this embodiment, the front end of the pressure receiving member 318 is engaged with and supported by the front cross member 311f of the seat cushion frame SFc, and the actuator 340 is positioned so as to at least partly overlap with the front cross member 311f in top view. Moreover, as shown in FIG. 19, the actuator 340 is positioned on and attached to the first annular recess 320a of the rotatable disk main body 321 such that the longitudinal direction thereof substantially aligns with the front cross member 311f (in other words, the longitudinal direction thereof substantially aligns with the tangential direction of the first annular recess 320a).

Next, the mode of operation of this embodiment will be described in the following. The seat device 301 is placed in such a state that the seat main body S faces forward while the automobile is traveling.

When the automobile is parked and the passenger operates an operating device (not shown in the drawings), the drive device D (more specifically, the actuator 340) of the seat rotation mechanism R is operated so as to rotationally drive the output shaft 343 and hence the drive gear 346. In this case, the drive gear 346 receives a meshing reaction force from the fixed gear 336 that meshes therewith and is positioned on the base 330, so that the drive gear 346 rotates and revolves along the teeth 336g of the fixed gear 336. Owing to this revolving movement, the rotatable disk 320 (hence, the seat main body S) that fixedly carries the actuator 340 is rotationally driven.

Further, when the actuator 340 is stopped and the output shaft 343 ceases rotating, the seat main body S on the rotatable disk 320 can be placed at a desired rotational position. At this time, the rotational position is locked by the self-locking function of the gear mechanism of the actuator 340 as described above.

When the occupant sits on the seat main body S, the weight of the occupant applies a downward load to the pressure receiving member 318 of the seat cushion Sc via the seat cushion pad Pc. In this case, as shown in FIG. 20, the pressure receiving member 318 is elastically deformed from the solid line position where the occupant is not seated on the seat to the chain line position where the pressure receiving member 318 receives a downward load and deflects downward. This deflection increases with an increase with the downward load.

Thus, in the seat device 301 of this embodiment, the drive device D for rotationally driving the rotatable disk 320 includes an actuator 340 fixed on the rotatable disk 320 and having an output shaft 343 extending downward beyond the rotatable disk 320, and a gear transmission mechanism GT for converting the rotation of the output shaft 343 into the rotational motion of the rotatable disk 320, and the gear transmission mechanism GT is located in the space C which is covered by the rotatable disk 320 from above and by the base 330 from below, and is covered by the first bearing B1 from the outer periphery, the first bearing B1 supporting the outer peripheral part of the rotatable disk 320 on the outer peripheral part of the base 330.

As a result, the gear transmission mechanism GT is received in the space C which is interposed between the base 330 and the rotatable disk 320 and surrounded by the first bearing B1 so that the gear meshing noise generated in the gear transmission mechanism GT during the operation of the actuator 340 (or when the seat main body S is rotating) is less likely to leak out of the seat main body S, and an improved noise reduction can be achieved with respect to the gear transmission mechanism GT. Moreover, the fact that the rotatable disk 320, the base 330, and the first bearing B1 can additionally demonstrate the function of reducing noises contributes to the simplification of the structure of the seat device and the cost reduction in addition to the original functions thereof. Although the first bearing B1 does not completely seal off the space C due to the presence of gaps therein, owing to the arrangement discussed above, a certain noise reduction performance can be expected.

In this embodiment, a first annular recess 320a that is recessed downward is formed concentrically in the rotatable disk 320d, and a second annular recess 330a that is recessed downward so as to correspond to the first annular recess 320a is formed in the base 330. The actuator 340 is fixed on the bottom surface of the first annular recess 320a, and the gear transmission mechanism GT is positioned between the rotatable disk 320 and the second annular recess 330a. As a result, the heights of the actuator 340 and the gear transmission mechanism GT located above and below the rotatable disk 320, respectively, can be reduced without requiring a part of the gear transmission mechanism GT to protrude below the base 330 so that the interference between the actuator 340 and the pressure receiving member 318 which deflects and deforms downward due to the downward load from the occupant can be easily avoided, and the gear meshing noise from the gear transmission mechanism GT can be made less likely to reach the ears of the occupant, on top of the effect of the accommodating the gear transmission mechanism GT in the space C.

Further, in this embodiment, the left and right fore and aft slide mechanisms SL are interposed between the floor portion 312 and the base 330, and the second annular recess 330a is located between the left and right fore and aft slide mechanisms SL so as to partly overlap with the fore and aft slide mechanism SL in side view. Thus, the dead space located between the left and right fore and aft slide mechanisms SL can be utilized to allow the second annular recess 330a to have a sufficient depth. Since the gear transmission mechanism GT can be housed at a low position owing to the above-mentioned arrangement, it is possible to make the gear meshing noise less likely to reach the ears of the occupants, on top of the effect of the accommodating the gear transmission mechanism GT in the space C.

Further, in the gear transmission mechanism GT of this embodiment, although the fixed gear 336 consists of an external gear and the meshing point of the drive gear 346 is therefore located at a radially outer part, since the gear transmission mechanism GT is placed in the space C, the meshing noise of the gear transmission mechanism GT is less likely to reach the ears of the occupant.

Further, in this embodiment, the bearing tubular portion 331 positioned concentrically with the rotatable disk 320 is fixed to the central portion of the base 330, the second bearing B2 that supports the inner peripheral portion of the rotatable disk 320 is retained by the bearing tubular portion 331, and the radially inner part of the space C is closed by the bearing tubular portion 331. As a result, not only the outer peripheral edge part portion of the rotatable disk 320 is supported by the base 330 via the first bearing B1, but also the rotatable disk 320 can be rotatably supported on the base 330 in a both stable and smooth manner by additionally utilizing the simple structure in which the inner peripheral portion of the rotatable disk 320 is supported by the bearing tubular portion 331 via the second bearing B2, so that the durability of the gear transmission mechanism GT can be improved. Moreover, since the radially inner side of the space C can be closed with a simple structure using the bearing tubular portion 331, the meshing noise of the gear transmission mechanism GT can be made even less likely to reach the ears of the occupant.

In this embodiment, the actuator 340 for rotating the seat is positioned such that at least a part thereof overlaps with the pressure receiving member 318 of the seat main body S in top view. As a result, the actuator 340 is prevented from projecting outward from the seat in the radial direction, and this contributes to the size reduction of the seat main body S in the radial direction. Further, since the actuator 340 is positioned in such a manner as not to interfere with the pressure receiving member 318 even when the pressure receiving member 318 deflects downward due to the downward load received from the occupant, even though the pressure receiving member 318 and the actuator 340 are positioned so as to vertically overlap each other, mutual interference between the pressure receiving member 318 and the actuator 340 can be avoided when the pressure receiving member 318 is deflected downward.

Further, the front end of the pressure receiving member 318 of this embodiment is engaged with and supported by the front cross member 311*f* of the seat cushion frame SFc, and at least a part of the actuator 340 overlaps with the front cross member 311*f* in top view. As a result, the actuator 340 can be positioned directly under the part of the pressure receiving member 318 located near the front cross member 311*f* (or the part that undergoes a relatively small bending deformation when the pressure receiving member 318 receives a downward load from the occupant). As a result, the height of the pressure receiving member 318 (and the height of the seat main body S) is not required to be increased in order to avoid the interference with the actuator 340. In addition, since the actuator 340 is positioned on the rotatable disk 320 in such a manner that the longitudinal direction of the actuator 340 substantially aligns with the front cross member 311*f*, even if the actuator 340 is long, a most part of the actuator 340 can be placed directly under a part of the pressure receiving member 318 close to the front cross member 311*f* (or a part where the amount of bending deformation of the pressure receiving member 318 under a downward load from the occupant is comparatively small) so that the above mentioned advantages can be adequately achieved.

In the gear transmission mechanism GT of this embodiment, since the fixed gear 336 fixed to the base 330 is an external gear, the engagement position with the drive gear 346 is radially outward, so that the actuator 340 can be placed directly under the part of the pressure receiving member 318 where the amount of bending deformation when receiving a load from the occupant is comparatively small. As a result, the height of the pressure receiving member 318 (or the height of the seat main body S) is not required to be particularly large in order to avoid the interference due to the bending deformation thereof.

Further, the actuator 340 of this embodiment is fixed to the bottom surface of the second annular recess 330*a* such that the longitudinal direction thereof substantially aligns with the tangential direction of the first annular recess 320*a*. As a result, even if the actuator 340 is long, by placing the actuator 340 substantially along the tangential direction of the first annular recess 320*a*, the actuator 340 can be placed on the bottom surface of the first annular recess 320*a* without causing the actuator 340 to excessively protrude upward so that the mutual interference between the actuator 340 and the pressure receiving member 318 can be easily avoided.

In this embodiment, when the seat main body S is fixed at the normal forward facing position with respect to the base 330, the left and right fixing brackets 350 are fixed to the upper surfaces of the rotatable disk 320 with the left and right reinforcing plates 355 interposed therebetween, the left and right sides of the rotatable disk 320 are fastened to the seat main body S via the left and right fixing brackets 350, respectively, and the actuator 340 is positioned between the left and right fixing brackets 350 of the rotatable disk 320 in the circumferential direction. As a result, interference between the actuator 340 and the fixing brackets 350 fixed to the rotatable disk 320 to secure the rotatable disk 320 to the seat main body S can be avoided, and the actuator 340 can be appropriately secured to the rotatable disk 320 at the lowest possible position.

The upper surface of the outer peripheral edge part of the rotatable disk 320 is retained, via a slider 370, on the lower surface of the upper fixing member 360 which is passed under the left and right fixing brackets 350 and fixedly secured to the outer peripheral portion of the base 330. As a result, the rotatable disk 320 is held down from above by the upper fixing member 360 fixed to the outer peripheral portion of the base 330 while maintaining a smooth rotation capability thereof.

Moreover, since the upper fixing member 360 is composed of a plurality of fixing member elements 361 and 362 arranged in the circumferential direction of the rotatable disk 320, the individual fixing member elements 361 and 362 can be made lighter and smaller for easier handling than in the case where the upper fixing member 360 is composed of an annular integral member. In addition, even when the upper fixing member 360 is provided with other functional parts (for example, the fixed-side peeling preventing portions 363), complication of the manufacturing process can be avoided.

Further, in this embodiment, the rotating-side peeling preventing portions 353 are fixed to the fixing bracket 350, and the fixed-side peeling preventing portions 363 are fixed to the upper fixing member 360 so as to correspond to the rotating-side peeling preventing portions 353. Therefore, when an excessive load acts on the seat main body S, the seat main body S is prevented from being peeled off from the base 330 owing to the engagement between the rotating-side peeling preventing portions 353 and the fixed-side peeling preventing portions 363. Thus, the fixing brackets 350 that secure the rotatable disk 320 to the seat main body S and the upper fixing members 360 that prevent the lifting of the rotatable disk 320 additionally serve as a means for preventing the peeling of the seat main body S away from the base 330 so that the structure can be simplified and the cost can be reduced.

The present invention has been described above in terms of specific embodiment, but is not limited thereto, and can be modified in various ways without departing from the scope of the present invention.

For example, in the above-described embodiment, the seat cushion frame SFc (side frame 311*s*) was directly fixed to the fixing brackets 350 on the rotatable disk 320, and the seat device 301 was fitted with a seat main body S that cannot be tilted only as an example, and the present invention is equally applicable to a seat device 301 including an electrically operated or manually operated tilt mechanism provided between the fixing bracket 350 and the seat cushion frame SFc (the side frames 311*s*) to allow the seat cushion frame SFc (hence, the seat main body S) to be tilted or reclined.

| LIST OF REFERENCE NUMERALS | |
| --- | --- |
| 1: vehicle seat device | 2: rotation device |
| 3: seat main body | 4: slide device |
| 5: floor | 11: seat cushion |
| 12: seat back | 41: slide operation lever |
| 51: base portion | 52: rotatable portion |
| 53: electric actuator | 54: rotation lock device |
| 56: base plate | 57: center plate |

-continued

| LIST OF REFERENCE NUMERALS | |
| --- | --- |
| 58: side plate | 62: first bearing hole |
| 66: fixing member | 71: rotatable plate |
| 72: fixing bracket | 75: second bearing hole |
| 76: edge wall | 85: slidable member |
| 87: support tube | 88: first annular rib |
| 89: second annular rib | 91: bush |
| 92: retaining ring | 93: enlarged diameter portion |
| 111: electric motor | 112: reduction gear mechanism |
| 121: lock claw | 122: holder |
| 131: claw portion | 135: first lock hole |
| 136: second lock hole | 137: biasing member |
| 141: control cable | 142: manual operation lever |
| 151: lock release actuator | 156: lock claw sensor |
| 157: sensor lever | 161: base-side peeling preventing portion |
| 163: rotating-side peeling preventing portion | |
| 166: base-side sliding contact part | 168: rotating-side sliding contact part |
| 173: detection piece | 174: magnetic proximity sensor |
| 176: base-side stopper | 177: first rotating-side stopper |
| 178: second rotating-side stopper | |

The invention claimed is:

1. A vehicle seat device having a rotation device provided between a floor and a seat cushion to rotatably support the seat cushion relative to the floor, the rotation device comprising, a base portion provided on the floor;

a rotatable portion provided on the seat cushion and rotatably supported by the base portion;

an electric actuator for rotating the rotatable portion with respect to the base portion; and a rotation lock device for selectively prohibiting rotation of the rotatable portion with respect to the base portion, wherein the rotation lock device is configured to be manually switched between a locked state and a released state, and the electric actuator is configured to allow rotation of the rotatable portion with respect to the base portion when the rotation lock device is released and electric power is not supplied to the electric actuator, the rotation lock device is movably supported by one of the base portion and the rotatable portion, and is provided with a lock claw that is movable between a lock position for engaging another of the base portion and the rotatable portion and a release position for disengaging from the other of the base portion and the rotatable portion, and one of the base portion and the rotatable portion is provided with a lock claw sensor that detects a position of the lock claw, the electric actuator being configured to be driven when the lock claw is at the release position, the base portion is provided with a base plate having a vertically facing major plane, the rotatable portion is provided with a rotatable plate rotatably supported on an upper surface of the base plate, and in plan view, the lock claw and the lock claw sensor are disposed radially inward of an outer peripheral edge of the rotatable plate.

2. The vehicle seat device according to claim 1, wherein the electric actuator does not include a worm reduction gear.

3. The vehicle seat device according to claim 1, wherein the lock claw sensor is provided with a lever configured to be displaced by being pushed by the lock claw, and detect a position of the lock claw based on a position of the lever.

4. The vehicle seat device according to claim 1, wherein one of the rotatable portion and the base portion is provided with a detecting piece made of a magnetic material, and another of the rotatable portion and the base portion is provided with a magnetic proximity sensor that outputs a signal corresponding to a distance from the detecting piece.

5. The vehicle seat device according to claim 1, wherein a stopper is provided between the base portion and the rotatable portion for limiting a rotational range of the rotatable portion with respect to the base portion so that the rotatable portion is rotatable relative to the base portion between an inner rotational limit which is displaced by 180 degrees or less in an inboard direction from a reference rotational position defined as a position of the seat cushion facing forward and an outer rotational limit which is displaced by 90 degrees or less in an outboard direction from the reference rotational position.

6. A vehicle seat device having a rotation device provided between a floor and a seat cushion to rotatably support the seat cushion relative to the floor, the rotation device comprising, a base portion provided on the floor;

a rotatable portion provided on the seat cushion and rotatably supported by the base portion;

an electric actuator for rotating the rotatable portion with respect to the base portion; and a rotation lock device for selectively prohibiting rotation of the rotatable portion with respect to the base portion, wherein the rotation lock device is configured to be manually switched between a locked state and a released state, and the electric actuator is configured to allow rotation of the rotatable portion with respect to the base portion when the rotation lock device is released and electric power is not supplied to the electric actuator, and the base portion is provided with a base plate having a vertically facing major plane, and a fixing member having a ring-shape and extending upward from the base plate, and the rotatable portion is provided with a rotatable plate rotatably supported on an upper surface of the base plate, the fixing member extending above an outer peripheral part of the rotatable plate, a slidable member being positioned between an upper surface of the rotatable plate and the fixing member.

7. The vehicle seat device according to claim 6, wherein the fixing member presses the rotatable plate toward the base plate via the slidable member.

8. The vehicle seat device according to claim 6, wherein a first bearing hole is formed in a central part of the base plate, a second bearing hole is formed in a central part of the rotatable plate, a vertically extending support tube is passed through the first bearing hole and the second bearing hole, and an outer circumference of the support tube is provided with a radially outwardly bulging annular ribs that prevent a vertical movement of the rotatable plate.

9. The vehicle seat device according to claim 8, wherein an enlarged diameter portion is provided in a lower end of the support tube, and the base plate is restricted from vertical movement by one of the annular ribs and the enlarged diameter portion.

10. A method for manufacturing a vehicle, wherein a seat device has a rotation device provided between a floor and a seat cushion to rotatably support the seat cushion relative to the floor, the rotation device comprising, a base portion provided on the floor;

a rotatable portion provided on the seat cushion and rotatably supported by the base portion;

an electric actuator for rotating the rotatable portion with respect to the base portion; and a rotation lock device for selectively prohibiting rotation of the rotatable portion with respect to the base portion, the rotation lock device is configured to be manually switched between a locked state and a released state, and the electric actuator is configured to allow rotation of the rotatable portion with respect to the base portion when the rotation lock device is released and electric power is not supplied to the electric actuator, the rotation lock device is movably supported by one of the base portion and the rotatable portion, and is provided with a lock claw that is movable between a lock position for engaging another of the base portion and the rotatable portion and a release position for disengaging from the other of the base portion and the rotatable portion, and one of the base portion and the rotatable portion is provided with a lock claw sensor that detects a position of the lock claw, the electric actuator being configured to be driven when the lock claw is at the release position, the base portion is provided with a base plate having a vertically facing major plane, and the rotatable portion is provided with a rotatable plate rotatably supported on an upper surface of the base plate, the method comprising the step of:

disposing the lock claw and the lock claw sensor, in plan view, radially inward of an outer peripheral edge of the rotatable plate.

* * * * *